(12) United States Patent
Konno et al.

(10) Patent No.: US 8,894,486 B2
(45) Date of Patent: *Nov. 25, 2014

(54) HANDHELD INFORMATION PROCESSING APPARATUS AND HANDHELD GAME APPARATUS

(75) Inventors: Hideki Konno, Kyoto (JP); Ryuji Umezu, Kyoto (JP); Kenichi Sugino, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 58 days.

This patent is subject to a terminal disclaimer.

(21) Appl. No.: 13/006,055

(22) Filed: Jan. 13, 2011

(65) Prior Publication Data
US 2012/0108328 A1    May 3, 2012

(30) Foreign Application Priority Data

Jan. 14, 2010  (JP) ................. 2010-005955
Mar. 12, 2010  (JP) ................. 2010-056513
Dec. 28, 2010  (JP) ................. 2010-294096

(51) Int. Cl.
*A63F 9/24* (2006.01)
*H04N 13/04* (2006.01)
*H04N 13/00* (2006.01)
*G06F 3/0488* (2013.01)
*G06F 3/0485* (2013.01)

(52) U.S. Cl.
CPC ....... *H04N 13/0497* (2013.01); *H04N 13/0022* (2013.01); *G06F 3/0488* (2013.01); *G06F 3/0485* (2013.01); *A63F 2300/1075* (2013.01); *A63F 2300/203* (2013.01); *A63F 2300/204* (2013.01); *A63F 2300/301* (2013.01); *G06F 2203/04806* (2013.01)

USPC .................. 463/31; 463/36; 348/56

(58) Field of Classification Search
CPC ................................. A63F 2300/301
USPC ................. 463/30, 31, 32; 345/173
See application file for complete search history.

(56) References Cited

U.S. PATENT DOCUMENTS 5,684,529 A   11/1997   Yoshimi et al.
5,964,830 A   10/1999   Durrett
(Continued)

FOREIGN PATENT DOCUMENTS

EP   1 720 131   11/2006
EP   2 157 545   2/2010
(Continued)

OTHER PUBLICATIONS

Oct. 1, 2012, European Search Report for EP 11150625.9, 9 pages.
(Continued)

*Primary Examiner* — Paul A D'Agostino
(74) *Attorney, Agent, or Firm* — Nixon & Vanderhye, P.C.

(57) ABSTRACT

A game apparatus includes a stereoscopic image display device configured to display a stereoscopic image, which is stereoscopically visible by the naked eye, and a planar image display device configured to display a planar image. A touch panel is provided on a screen of the planar image display device. An image of a silhouette of an object in a virtual space is displayed on the planar image display device. The game apparatus causes the object in the virtual space to move according to a touch operation performed on the image of the silhouette displayed on the screen of the planar image display device, and stereoscopically displays the object on the stereoscopic image display device.

28 Claims, 33 Drawing Sheets

(56) References Cited

U.S. PATENT DOCUMENTS

| | | |
|---|---|---|
| 6,020,891 A | 2/2000 | Rekimoto |
| 6,057,833 A | 5/2000 | Heidmann et al. |
| 6,160,574 A | 12/2000 | Oba et al. |
| 6,252,624 B1 | 6/2001 | Yuasa et al. |
| 6,313,864 B1 | 11/2001 | Tabata et al. |
| 6,325,287 B1 | 12/2001 | Nakajima et al. |
| 6,342,900 B1 | 1/2002 | Ejima et al. |
| 6,384,859 B1 | 5/2002 | Matsumoto et al. |
| 6,474,819 B2 | 11/2002 | Yoder et al. |
| 6,708,046 B1 | 3/2004 | Takagi |
| 6,820,056 B1 | 11/2004 | Harif |
| 6,897,865 B2 | 5/2005 | Higashiyama |
| 7,374,490 B2 | 5/2008 | Tahara et al. |
| 7,519,218 B2 | 4/2009 | Takemoto et al. |
| 7,843,429 B2 * | 11/2010 | Pryor ................... 345/158 |
| 8,115,814 B2 | 2/2012 | Iwase et al. |
| 8,189,038 B2 | 5/2012 | DeCusatis et al. |
| 8,202,094 B2 | 6/2012 | Spector |
| 8,305,428 B2 | 11/2012 | Hu |
| 8,384,770 B2 * | 2/2013 | Konno et al. ............. 348/51 |
| 8,456,466 B1 | 6/2013 | Reisman et al. |
| 8,512,152 B2 * | 8/2013 | Ehara et al. ............. 463/46 |
| 2001/0019946 A1 | 9/2001 | Okuda |
| 2002/0008906 A1 | 1/2002 | Tomita |
| 2002/0078291 A1 | 6/2002 | Sutton et al. |
| 2003/0174204 A1 | 9/2003 | Otani et al. |
| 2004/0223049 A1 | 11/2004 | Taniguchi et al. |
| 2005/0078108 A1 | 4/2005 | Swift et al. |
| 2005/0239521 A1 | 10/2005 | Harada et al. |
| 2005/0253924 A1 | 11/2005 | Mashitani |
| 2005/0270368 A1 | 12/2005 | Hashimoto |
| 2006/0038833 A1 | 2/2006 | Mallinson et al. |
| 2006/0060463 A1 | 3/2006 | Tokusashi |
| 2006/0119597 A1 | 6/2006 | Oshino |
| 2006/0171582 A1 | 8/2006 | Eichhorn |
| 2006/0192776 A1 | 8/2006 | Nomura et al. |
| 2006/0203085 A1 | 9/2006 | Tomita |
| 2007/0001003 A1 | 1/2007 | Lee et al. |
| 2007/0111803 A1 | 5/2007 | Moro et al. |
| 2007/0273644 A1 | 11/2007 | Natucci |
| 2008/0070684 A1 | 3/2008 | Haigh-Hutchinson |
| 2008/0071559 A1 | 3/2008 | Arrasvuori |
| 2008/0100620 A1 | 5/2008 | Nagai et al. |
| 2008/0199046 A1 | 8/2008 | Sasagawa et al. |
| 2008/0222555 A1 | 9/2008 | Coyne |
| 2008/0225007 A1 * | 9/2008 | Nakadaira et al. ........... 345/173 |
| 2008/0240549 A1 | 10/2008 | Koo et al. |
| 2008/0284842 A1 | 11/2008 | Hu |
| 2009/0027330 A1 | 1/2009 | Aida |
| 2009/0059497 A1 | 3/2009 | Kuwahara et al. |
| 2009/0060490 A1 | 3/2009 | Kuwahara et al. |
| 2009/0070476 A1 | 3/2009 | Brackx et al. |
| 2009/0224999 A1 | 9/2009 | Kuwahara et al. |
| 2009/0275366 A1 * | 11/2009 | Schilling ................... 455/566 |
| 2009/0278764 A1 | 11/2009 | Kuwahara et al. |
| 2009/0278974 A1 | 11/2009 | Kuwahara et al. |
| 2009/0285484 A1 | 11/2009 | Mallinson et al. |
| 2009/0295743 A1 * | 12/2009 | Nakajoh ................... 345/173 |
| 2010/0020222 A1 | 1/2010 | Jones et al. |
| 2010/0033429 A1 | 2/2010 | Olivan Bescos |
| 2010/0048290 A1 | 2/2010 | Baseley et al. |
| 2010/0115455 A1 | 5/2010 | Kim |
| 2010/0257252 A1 | 10/2010 | Dougherty et al. |
| 2010/0316367 A1 | 12/2010 | Kuwahara et al. |
| 2011/0034103 A1 | 2/2011 | Fong et al. |
| 2011/0157159 A1 | 6/2011 | Chen et al. |
| 2011/0175928 A1 | 7/2011 | Hashimoto |
| 2011/0185299 A1 | 7/2011 | Hinckley et al. |
| 2011/0209102 A1 | 8/2011 | Hinckley et al. |
| 2011/0209104 A1 | 8/2011 | Hinckley et al. |
| 2011/0221750 A1 | 9/2011 | Sato et al. |

FOREIGN PATENT DOCUMENTS

| | | |
|---|---|---|
| EP | 2 172 252 | 4/2010 |
| EP | 2 187 295 | 5/2010 |
| JP | 04-180180 | 6/1992 |
| JP | 06-339155 | 12/1994 |
| JP | 9-74573 | 3/1997 |
| JP | H09-074573 | 3/1997 |
| JP | 09-192349 | 7/1997 |
| JP | 09-201472 | 8/1997 |
| JP | 10-51711 | 2/1998 |
| JP | 2000-69404 | 3/2000 |
| JP | 2000-148904 | 5/2000 |
| JP | 2001-165144 | 6/2001 |
| JP | 2001-251396 | 9/2001 |
| JP | 2001-251398 | 9/2001 |
| JP | 2001-251399 | 9/2001 |
| JP | 2002-223458 | 8/2002 |
| JP | 2002-230586 | 8/2002 |
| JP | 2002-281526 | 9/2002 |
| JP | 2003-067784 | 3/2003 |
| JP | 2003-107603 | 4/2003 |
| JP | 2003-264851 | 9/2003 |
| JP | 2003-348621 | 12/2003 |
| JP | 2004-7214 | 1/2004 |
| JP | 2004-109330 | 4/2004 |
| JP | 2004-287902 | 10/2004 |
| JP | 2005-20559 | 1/2005 |
| JP | 2005-073038 | 3/2005 |
| JP | 2005-110120 | 4/2005 |
| JP | 2005-151162 | 6/2005 |
| JP | 2005-165776 | 6/2005 |
| JP | 2005-218779 | 8/2005 |
| JP | 2005-250950 | 9/2005 |
| JP | 2005-286714 | 10/2005 |
| JP | 2006-024175 | 1/2006 |
| JP | 2006-33476 | 2/2006 |
| JP | 2006-060516 | 3/2006 |
| JP | 2006-72667 | 3/2006 |
| JP | 2006-86099 | 3/2006 |
| JP | 2006-129929 | 5/2006 |
| JP | 2006-271663 | 10/2006 |
| JP | 2007-12025 | 1/2007 |
| JP | 2007-256960 | 10/2007 |
| JP | 2008-502206 | 1/2008 |
| JP | 2008-068060 | 3/2008 |
| JP | 2008-77437 | 4/2008 |
| JP | 2008-510254 | 4/2008 |
| JP | 2008-146109 | 6/2008 |
| JP | 2008-521110 | 6/2008 |
| JP | 4260215 | 2/2009 |
| JP | 2009-070370 | 4/2009 |
| JP | 2009-089435 | 4/2009 |
| JP | 4358181 | 8/2009 |
| JP | 2009-205556 | 9/2009 |
| JP | 2009-223904 | 10/2009 |
| JP | 2009-278456 | 11/2009 |
| JP | 2010-170316 | 8/2010 |
| JP | 2010-532120 | 9/2010 |
| JP | 2010-239568 | 10/2010 |
| JP | 2010-244575 | 10/2010 |
| WO | 03/105450 | 12/2003 |
| WO | 2008/013352 | 1/2008 |

OTHER PUBLICATIONS

Explanation of Circumstances concerning Accelerated Examination in Japanese Application No. 2011-68400 dated Apr. 18, 2011.

Wu, et al., "Picking and Snapping for 3D Input Devices," Proceedings of the XVI Brazilian Symposium on Computer Graphics and Image Processing (SIBGRAPI'03), 2003 (8 pages).

Office Action issued in U.S. Appl. No. 12/946,248 dated Nov. 9, 2012 (40 pages).

Notice of Allowance issued in U.S. Appl. No. 13/006,039 dated Jun. 11, 2012 (16 pages).

Report on Nintendo DS Lite Hardware, Mar. 2, 2006, download from the internet, with a partial English translation (13 pages).

Report on Nintendo DS Lite Hardwire, Mar. 2, 2006, http://pc.watch.impress.co.jp/docs/2006/0302/nintendo.htm, (5 pages).

(56) References Cited

OTHER PUBLICATIONS

Office Action issued in U.S. Appl. No. 12/862,119 dated Sep. 20, 2012 (31 pages).
U.S. Appl. No. 12/862,119, filed Aug. 24, 2010, Shinji Kitahara et al.
U.S. Appl. No. 13/030,499, filed Feb. 18, 2011, Yui Ehara et al.
U.S. Appl. No. 13/158,824, filed Jun. 13, 2011, Yuichiro Ito.
U.S. Appl. No. 13/158,939, filed Jun. 13, 2011, Yuichiro Ito.
U.S. Appl. No. 13/158,736, filed Jun. 13, 2011, Yuichiro Ito.
U.S. Appl. No. 13/006,039, filed Jan. 13, 2011, Hideki Konno et al.
U.S. Appl. No. 13/243,622, filed Sep. 23, 2011, Yuichiro Ito et al.
Kato, et al., "An Augmented Reality System and its Calibration based on Marker Tracking," Transactions of the Virtual Reality Society of Japan, vol. 4, No. 4, 1999, pp. 607-616 (10 pages).
Kato, et al., "Marker Tracking and HMD Calibration for a Video-Based Augmented Reality Conferencing System," iwar, pp. 85, $2^{nd}$ IEEE and ACM International Workshop on Augmented Reality, 1999 (10 pages).
Yokoya, et al., "Stereo Vision Based Video See-through Mixed Reality," Mixed Reality, Merging Real and Virtual Worlds, Proceedings of International Symposium on Mix Reality, Merging Real and Virtual Worlds, Jan. 1, 1999, pp. 131-145 (15 pages).
European Search Report issued in Application No. 11168392.6 dated Aug. 29, 2011 (9 pages).
Yoon, et al., "Interactive Training for Synthetic Characters," American Association for Artificial Intelligence, 1999 (6 pages).
Office Action issued in U.S. Appl. No. 12/946,248 dated Mar. 29, 2013 (40 pages).
Office Action issued in U.S. Appl. No. 12/862,119 dated Apr. 25, 2013 (31 pages).
Office Action issued in U.S. Appl. No. 13/158,736 dated May 23, 2013 (41 pages).
U.S. Appl. No. 12/946,248, filed Nov. 15, 2010.
Andrew Bookholt, "MacBook Pro 15," Unibody Mid 2010 LCD Replacement, ifixit.com, Apr. 13, 2010, pp. 1-27, XP-002722878.
"MacBook Pro," Wikepedia, Jun. 9, 2010, pp. 1-19, XP-002722879.
Jasan Chen, "Open Gal," gizmodo.com, Apr. 20, 2010, pp. 1-17, XP-002722880.
Andrew Liszewski, "Hands-On With the Nintendo DSI," ohgizmo.com, May 6, 2010, pp. 1-8, XP-002722881.
"Nintendo DS," Wikepedia, Jun. 10, 2010, pp. 1-13, XP-002722882.
"How to Repair DS Hinge and Shell," youtube.com, Mar. 11, 2005. https://www.youtube.com/watch?v=HxHpQTxCcT0.

\* cited by examiner

Fig.25
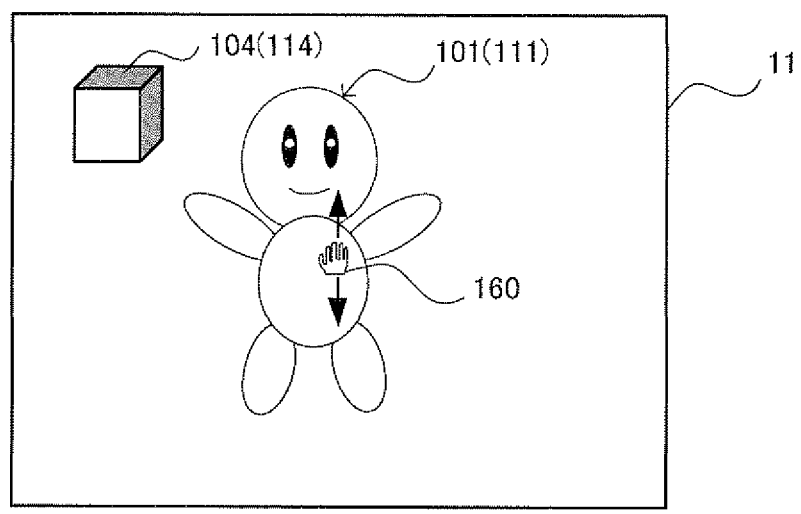
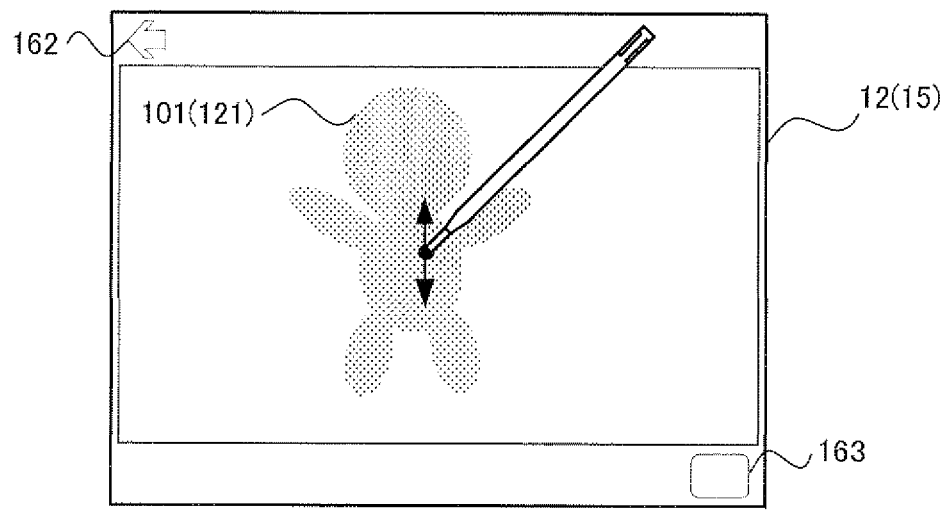

Fig.29
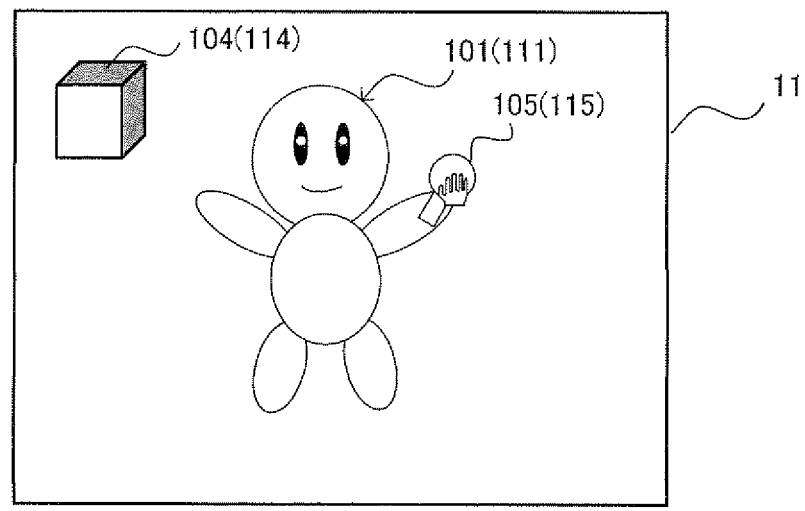
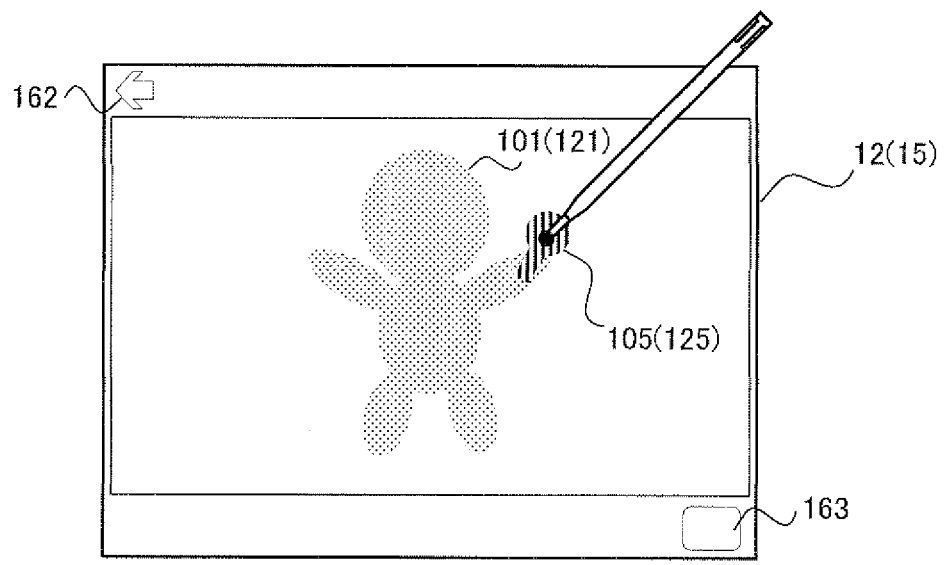

HANDHELD INFORMATION PROCESSING APPARATUS AND HANDHELD GAME APPARATUS

CROSS REFERENCE TO RELATED APPLICATION

The disclosure of Japanese Patent Application No. 2010-294096, filed on Dec. 28, 2010, Japanese Patent Application No. 2010-056513, filed on Mar. 12, 2010, and Japanese Patent Application No. 2010-005955, filed on Jan. 14, 2010, are incorporated herein by reference.

FIELD OF THE INVENTION

Certain exemplary embodiments of the present invention relate to a handheld information processing apparatus and a handheld game apparatus, which includes a display device configured to display a stereoscopic image.

BACKGROUND AND SUMMARY

Conventionally, there have been handheld information processing apparatuses which include two display sections, and display a display object on one of the two display sections while displaying an image for operation on the other of the two display sections in a planner manner. For example, Japanese Laid-Open Patent Publication No. 2005-218779 (hereinafter, referred to as Patent Literature 1) discloses a game apparatus which displays on an upper screen an image of part of a game space obliquely viewed from above while displaying on a lower screen an image of the entirety of the game space viewed from above. A player plays the game by performing an operation on the lower screen.

The game apparatus disclosed in Patent Literature 1, however, displays respective images on the two display sections both in the planner manner and does not display stereoscopic images. It is concerned to employ a stereoscopic image display section which stereoscopically displays an image, in order to provide users with an image which is realistic and has stereoscopic effects. In such case, the apparatus needs to be configured to include a stereoscopic image display section in a manner which does not hinder the operability of the apparatus and visibility of the stereoscopic image.

Therefore, an aspect of certain exemplary embodiments to providing a handheld information processing apparatus and a heldheld game apparatus which have excellent operability and visibility of a stereoscopic image in an apparatus including a stereoscopic image display section which displays a stereoscopic image.

In order to achieve this aspect, certain exemplary embodiments of the present invention employ the following features.

An embodiment of the present invention is a handheld information processing apparatus including a stereoscopic image display section, a planar image display section, a touch panel, and control means. The stereoscopic image display section displays a stereoscopic image, which is stereoscopically visible by the naked eye, by using a right-eye image and a left-eye image. The planar image display section displays a planar image with which a user performs an input operation on the information processing apparatus. The touch panel is provided on a screen of the planar image display section. The control means executes a predetermined process, based on a touch position detected by the touch panel.

Further, in another embodiment of the present invention, the control means may change the stereoscopic image displayed on the stereoscopic image display section, based on the touch position detected by the touch panel.

Further, in another embodiment of the present invention, the planar image display section may display a planar image for operating a virtual object in a virtual space. The control means changes the virtual object, based on the touch position detected by the touch panel. The stereoscopic image display section displays the stereoscopic image by using the right-eye image and the left-eye image which are obtained by taking images, by using a virtual stereo camera, of the virtual object changed by the control means.

Further, in another embodiment of the present invention, the touch panel is not provided on a screen of the stereoscopic image display section.

Further, in another embodiment of the present invention, the handheld information processing apparatus may further include a switch for switching ON/OFF of stereoscopic presentation of the stereoscopic image display section. The stereoscopic image display section displays the stereoscopic image only when the stereoscopic presentation is switched ON by the switch.

Further, in another embodiment of the present invention, the switch may be a slider the position of which is adjustable. The handheld information processing apparatus further includes virtual camera setting means for setting, according to the position of the slider, a distance between two virtual cameras, which are components of the virtual stereo camera and which are set in the virtual space. The stereoscopic image display section displays the stereoscopic image by using the right-eye image and the left-eye image taken, of the virtual space, by using the virtual stereo camera set by the virtual camera setting means.

Further, in another embodiment of the present invention, the handheld information processing apparatus may further include mode selection means for selecting either of a first mode in which a real right-eye image and a real left-eye image taken of an actual space are used; and a second mode in which the right-eye image and the left-eye image taken, of the virtual space, by the virtual stereo camera are used. In a case where the first mode is selected by the mode selection means, the stereoscopic image display section displays the stereoscopic image by using the real right-eye image and the real left-eye image taken of the actual space. Also, in a case where the second mode is selected by the mode selection means, the stereoscopic image display section displays the stereoscopic image by using the right-eye image and the left-eye image taken, of the virtual space, by the virtual stereo camera.

Further, in another embodiment of the present invention, the handheld information processing apparatus may further include a stereo camera for taking images of the actual space. The stereoscopic image display section displays the stereoscopic image by using the real right-eye image and the real left-eye image taken by the stereo camera.

Further, in another embodiment of the present invention, the planar image display section may display an adjustment bar for adjusting relative positions of the real right-eye image and the real left-eye image. The control means sets a position of a slider of the adjustment bar, based on the touch position detected by the touch panel, and adjusts the relative positions of the real right-eye image and the real left-eye image, according to the position of the slider. The stereoscopic image display section displays the stereoscopic image by using the real right-eye image and the real left-eye image which are adjusted by the control means.

Further, in another embodiment of the present invention, the handheld information processing apparatus may be configured of a first housing and a second housing joined together so as to be foldable. The stereoscopic image display section is provided in the first housing. The planar image display section is provided in the second housing.

Further, in another embodiment of the present invention, the first housing may be arranged above the second housing in a state where the handheld information processing apparatus is open.

According to an embodiment of the present invention, an information processing apparatus including a stereoscopic image display section configured to display a stereoscopically visible image and a planar image display section having provided a touch panel on a screen can be provided. A user performs a touch operation on an image displayed on the planar image display section, thereby easily performing an operation on the information processing apparatus.

These and other features, aspects and advantages will become more apparent from the following detailed description when taken in conjunction with the accompanying drawings.

BRIEF DESCRIPTION OF THE DRAWINGS

FIG. 25 is a diagram showing a state in which when the user touches a child object image 121 displayed on the planar image display device 12 to perform the predetermined operation, respective images displayed on the stereoscopic image display device 11 and the planar image display device 12 change;

FIG. 29 is a diagram illustrating how the respective images displayed on the stereoscopic image display device 11 and the planar image display device 12 change when an item 105 is given to the child object 101;

DESCRIPTION OF THE PREFERRED EMBODIMENTS

First Embodiment

Figure 1:
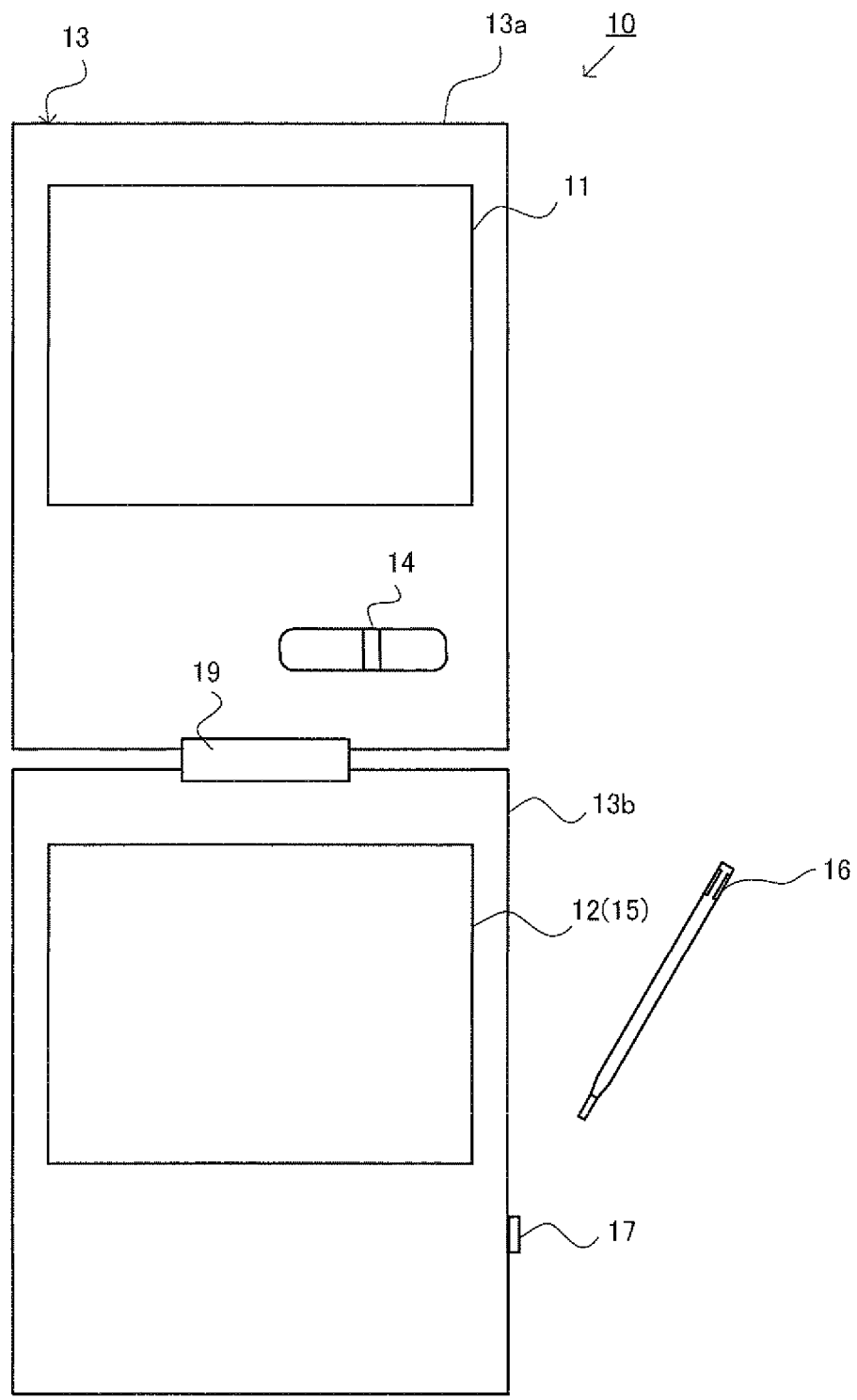
FIG. 1 is an external view of a handheld image display apparatus according to an embodiment of the present invention.

An image display apparatus according to a first embodiment of the present invention will be described, with reference to the accompanying drawings. FIG. 1 is an external view of a handheld image display apparatus according to the embodiment of the present invention.

(Description of Image Display Apparatus)

In FIG. 1, an image display apparatus 10 includes the stereoscopic image display device 11 capable of displaying a stereoscopic image, and a planar image display device 12 capable of displaying a two-dimensional planner image. A housing 13 is configured of an upper housing 13a and a lower housing 13b. The stereoscopic image display device 11 is accommodated in the upper housing 13a, and the planar image display device 12 is accommodated in the lower housing 13b. The respective screens of stereoscopic image display device 11 and the planar image display device 12 have the same size and a predetermined resolution (256 dots×192 dots, for example). Although a liquid crystal display is used as a display device in the present embodiment, any other display device, such as a display device using an EL (Electro Luminescence), or the like may be used. In addition, a display device having any resolution may be used.

The stereoscopic image display device 11 is a display device capable of displaying an image which is stereoscopically visible by the naked eye, and a lenticular lens type display device or a parallax barrier type display device is used. In the present embodiment, the stereoscopic image display device 11 of a parallax barrier type is used. The stereoscopic image display device 11 displays an image having a stereoscopic effect by using a left-eye image and a right-eye image. That is, the stereoscopic image display device 11 allows a user to view the image for a left eye with her/his left eye, and the image for a right eye with her/his right eye by utilizing a parallax barrier so that a stereoscopic image (a stereoscopically visible image) exerting a stereoscopic effect on a user can be displayed.

A touch panel 15, which is a designated coordinate detection device, is mounted on the screen of the planar image display device 12. The touch panel 15 may be of any type such as a resistive film type, an optical type (infrared type), or a capacitive coupling type. In the present embodiment, the touch panel 15 is of the resistive film type. The touch panel 15 detects a position on the screen of the planar image display device 12 in response to the user touching the screen of the planar image display device 12 by using a stick 16. The position detected by the touch panel 15 corresponds to the position on the screen of the planar image display device 12. The user can designate the position on the screen not only by the stick 16 but also by a finger. In the present embodiment, the touch panel 15 has the same resolution (detection accuracy) as that of the planar image display device 12. However, the resolution of the touch panel 15 may not necessarily be the same as the resolution of the planar image display device 12.

A hardware slider 14 described below is provided on the upper housing 13a. A shutter button 17 is provided on a side surface of the lower housing 13b for use in taking an object to be imaged by a stereo camera 18 described below. The upper housing 13a and the lower housing 13b are connected via a hinge portion 19. The upper housing 13a and the lower housing 13b are connected to each other via the hinge portion 19 so as to be openable and closable (foldable).

Figure 2:
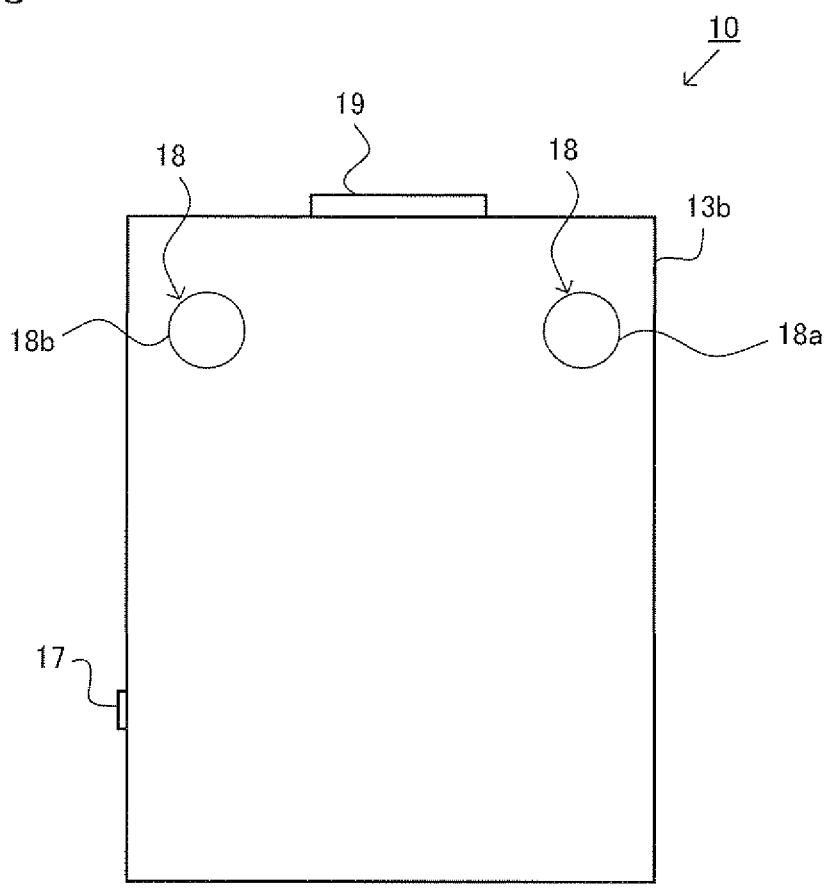
FIG. 2 is a diagram illustrating a lower housing 13b viewed from a rear side thereof in a state in which an upper housing 13a and the lower housing 13b are folded.

FIG. 2 is a diagram illustrating the lower housing 13b viewed from a rear side thereof in a state in which the upper housing 13a and the lower housing 13b are folded. As shown in FIG. 2, a stereo camera 18 is provided in the rear side of the lower housing 13b. The stereo camera 18 includes a left-eye image imaging section 18a and a right-eye image imaging section 18b. The distance between the left-eye image imaging section 18a and the right-eye image imaging section 18b is set, for example, to an average distance (65 mm, for example) between the left and right human eyes. Each of the left-eye image imaging section 18a and the right-eye image imaging section 18b includes an imaging device, such as a CCD image sensor or a CMOS image sensor, having a predetermined resolution, and a zoom lens. The left-eye image imaging section 18a takes the left-eye image, and the right-eye image imaging section 18b takes the right-eye image. The left-eye image imaging section 18a and the right-eye image imaging section 18b take the left-eye image and the right-eye image, respectively, in response to pressing the shutter button 17 by the user. The user can press the shutter button 17, while viewing the screens of the stereoscopic image display device 11 and the planar image display device 12 in a state in which the upper housing 13a and the lower housing 13b are in an open state as shown in FIG. 1. That is, the left-eye image and the right-eye image, when the image of the object to be imaged is taken by the stereo camera 18, are displayed on the screen of the planar image display device 12, and the then stereoscopic image is displayed on the stereoscopic image display device 11. This allows the user to take the image of the object to be imaged, while verifying the image displayed on the screen.

Figure 3:
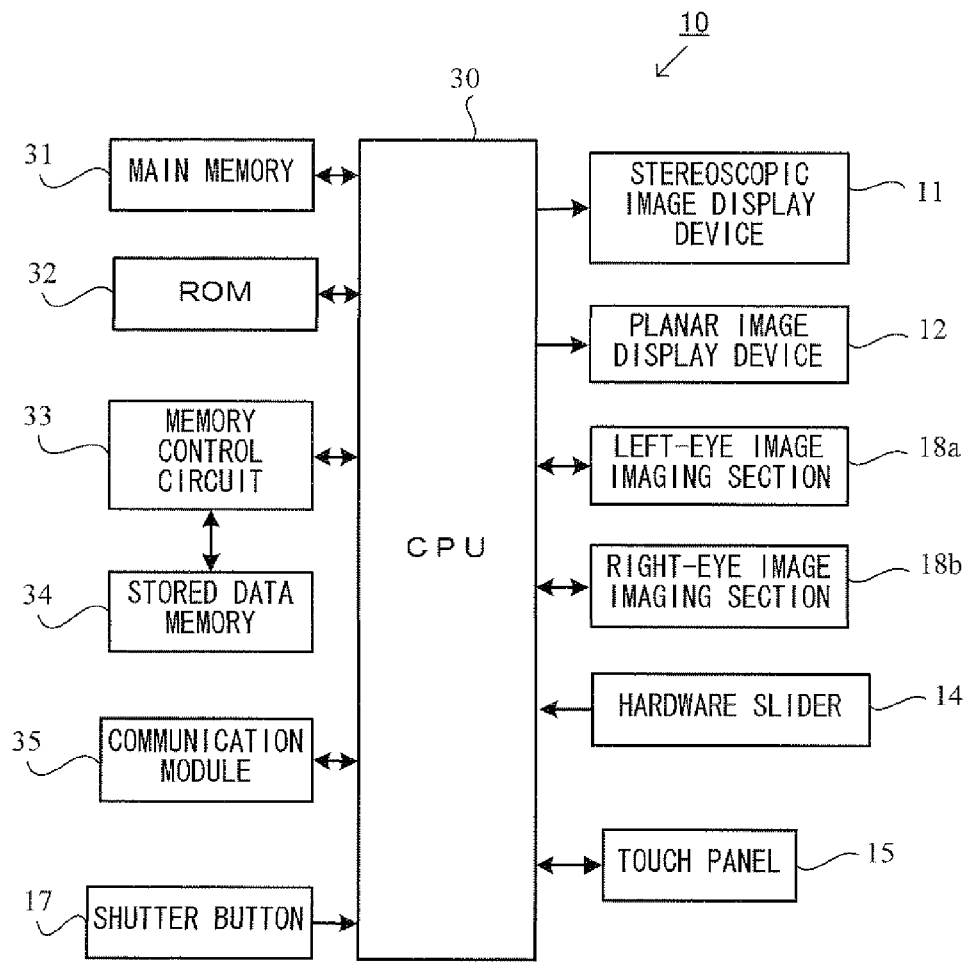
FIG. 3 is a block diagram illustrating an internal configuration of the image display apparatus 10.

FIG. 3 is a block diagram illustrating an internal configuration of the image display apparatus 10. As shown in FIG. 3, other components included in the image display apparatus 10 are a CPU 30, a main memory 31, a ROM 32, a memory control circuit 33, a stored data memory 34, and a communication module 35. These electronic components are mounted on an electronic circuit substrate and accommodated in the lower housing 13b (or the upper housing 13a).

The CPU 30 is information processing means for executing a predetermined program. In the present embodiment, the predetermined program is stored in the ROM 32 of the image display apparatus 10, and a display control process described below is executed by the CPU 30 executing the predetermined program.

The main memory 31, the ROM 32, and the memory control circuit 33 are connected to the CPU 30. The stored data memory 34 is connected to the memory control circuit 33. The main memory 31 is a readable/writable semiconductor memory. The main memory 31 includes an area for temporarily storing the predetermined program, areas for temporarily storing the left-eye image and the right-eye image, and a work area and a buffer area of the CPU 30. That is, the main memory 31 stores various types of data used for the display control process described below, stores the predetermined program stored in the ROM 32, and the like. The ROM 32 is a non-volatile memory and used for storing the predetermined program. The stored data memory 34 is storage means for storing data of the images taken by the left-eye image imaging section 18a and the right-eye image imaging section 18b, and the like. The stored data memory 34 is implemented as a non-volatile storage medium and, for example, a NAND flash memory is used. The memory control circuit 33 is a circuit for controlling reading of data from the stored data memory 34 or writing of data to the stored data memory 34, in accordance with an instruction from the CPU 30.

The program executed by the CPU 30 may be stored in advance in the ROM 32, may be obtained from the stored data memory 34, or may be obtained from another apparatus by means of communication with the another apparatus via the communication module 35.

The communication module 35 has a function of performing wired or wireless communication with the another apparatus. The communication module 35 has a function of performing, for example, infrared communication with the another apparatus. The communication module 35 may have a function of connecting to a wireless LAN in a method based on, for example, IEEE 802.11.b/g standard, or have a function of performing communication with the another apparatus by means of the Bluetooth (registered trademark) technology. Furthermore, the communication module 35 may also have a function of connecting to a mobile communication network by means of a communication scheme used for mobile phones, and the like.

The touch panel 15 is connected to the CPU 30. The touch panel 15 is connected to an interface circuit (not shown), and the interface circuit generates a predetermined form of touch position data, based on a signal outputted from the touch panel 15, and outputs the touch position data to the CPU 30. For example, the touch position data represents a coordinate of a position, on which an input is made, on an input surface of the touch panel 15. The interface circuit reads a signal outputted from the touch panel 15, and generates the touch position data every predetermined time. The CPU 30 acquires the touch position data via the interface circuit to recognize the position on which the input is made on the touch panel 15.

The shutter button 17 and the imaging devices (the left-eye image imaging section 18a and the right-eye image imaging section 18b) are connected to the CPU 30. In response to pressing the shutter button 17, the CPU 30 transmits an instruction for taking images to the left-eye image imaging section 18a and the right-eye image imaging section 18b. The left-eye image imaging section 18a and the right-eye image imaging section 18b take images, according to the instruction from the CPU 30, and output data of the respective taken images to the CPU 30.

The stereoscopic image display device 11 and the planar image display device 12 are connected to the CPU 30. The stereoscopic image display device 11 and the planar image display device 12 display images, according to respective instructions from the CPU 30. As described, above, the stereoscopic image is displayed on the stereoscopic image display device 11, and the planar image is displayed on the planar image display device 12.

The hardware slider 14 is connected to the CPU 30. The hardware slider 14 is a slide switch and adjustable at any position (or a predetermined position) in a horizontal direction. The hardware slider 14 outputs to the CPU 30 a signal according to the adjusted position.

Figure 4:
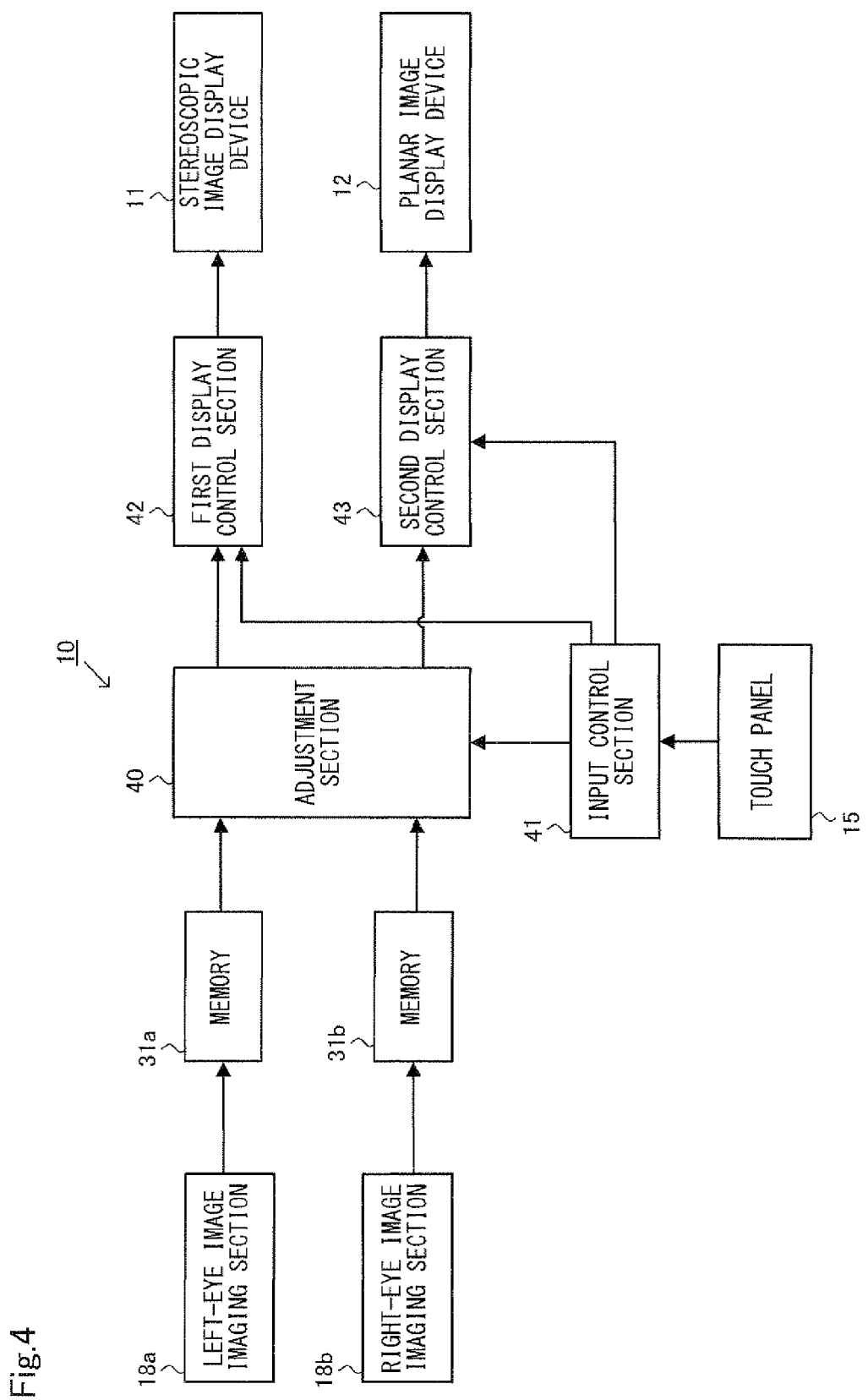
FIG. 4 is a block diagram illustrating a functional structure of the image display apparatus 10.

Next, a functional structure of the image display apparatus 10 will be described, with reference to FIG. 4. FIG. 4 is a block diagram illustrating the functional structure of the image display apparatus 10. As shown in FIG. 4, the image display apparatus 10 includes memories 31a and 31b, an adjustment section 40, an input control section 41, a first display control section 42, and a first display control section 43. The memories 31a and 31b are parts of the storage area of the main memory 31. The adjustment section 40, the input control section 41, the first display control section 42, and the second display control section 43 are achieved by the CPU 30 executing the predetermined program.

The memories 31a and 31b temporarily store the images taken by the left-eye image imaging section 18a and the right-eye image imaging section 18b, respectively. The left-eye image taken by the left-eye image imaging section 18a is stored in the memory 31a, and the left-eye image taken by the right-eye image imaging section 18b is stored in memory 31b.

According to the signal outputted from the input control section 41, the adjustment section 40 adjusts the relative positions, relative sizes, and relative rotations of the left-eye image and the right-eye image when displayed on the display device. The position of each of the left-eye image and the right-eye image is represented as a coordinate value (which is internally set in XY coordinate system) of the center of the each image. An X-axis direction in the XY coordinate system corresponds to the horizontal direction of the screens (of the stereoscopic image display device 11 and the planar image display device 12), and a Y-axis direction corresponds to the vertical direction of the screens. The relative positions of the left-eye image and the right-eye image are adjusted by changing the coordinate value of the center of each image in the horizontal direction (X direction) and/or the vertical direction (Y direction). For example, the adjustment section 40 adjusts the relative positions of the left-eye image and the right-eye image by moving the left-eye image and/or the right-eye image in the horizontal direction. Furthermore, the adjustment section 40 adjusts the relative sizes of the left-eye image and the right-eye image by changing the size of the left-eye image and/or the right-eye image. For example, the adjustment section 40 enlarges the left-eye image, thereby making the size of the left-eye image large relative to the right-eye image. Furthermore, the adjustment section 40 rotates the left-eye image and/or the right-eye image about the center of the image, thereby adjusting the relative rotations (angles of rotations) of the left-eye image and the right-eye image. For example, the adjustment section 40 rotates the left-eye image by a predetermined angle, thereby adjusting the relative rotations of the left-eye image and the right-eye image.

The input control section 41 outputs to the adjustment section 40 a control signal, according to the position detected by the touch panel 15. That is, according to the position detected by the touch panel 15, the input control section 41 detects operations on the left-eye image and the right-eye image (such as an operation on the position adjustment bar 54 described below (see FIG. 5), a rotation operation or an enlargement or reduction operation on the left-eye image or the right-eye image), which are performed by the user, and outputs the detected data to the adjustment section 40 as the control signal. Furthermore, according to the position detected by the touch panel 15, the input control section 41 adjusts the position of the position adjustment bar 54 displayed on the planar image display device 12, a position of the slider 55 of the position adjustment bar 54, and a position of the slider 57 of the zoom adjustment bar 56. In addition, the input control section 41 scrolls or zooms the stereoscopic image displayed on the stereoscopic image display device 11, according to the position detected by the touch panel 15 (the detail will be described below).

The first display control section 42 performs a display control for the stereoscopic image display device 11. The first display control section 42 displays the stereoscopic image on the stereoscopic image display device 11 by synthesizing the left-eye image and the right-eye image adjusted by the adjustment section 40. For example, if the respective positions of the left-eye image and the right-eye image are shifted by the adjustment section 40 in the left-right direction by a predetermined amount, the first display control section 42 shifts the respective positions of the left-eye image and the right-eye image in the left-right direction by the predetermined amount. The first display control section 42 then synthesizes the shifted two images to generate the stereoscopic image. For example, the first display control section 42 divides each of the two shifted images into rectangle-shaped images each having one line of pixels aligned in the vertical direction, and alternately aligns the rectangle-shaped images of each image, thereby synthesizing the two images. The first display control section 42 then outputs data of the synthesized image to the stereoscopic image display device 11. When viewed through the parallax barrier in the stereoscopic image display device 11, the image is displayed such that presentation viewed only with the right eye and presentation only viewed with the left eye are alternately displayed line by line. Therefore, the right-eye image is viewed with the right eye and the left-eye image is viewed with the user's left eye. This allows the stereoscopic image to be displayed on the stereoscopic image display device 11. Furthermore, the first display control section 42 zooms or scrolls the stereoscopic image displayed on the stereoscopic image display device 11, according to the signal outputted from the input control section 41.

The second display control section 43 performs the display control for the planar image display device 12. The second display control section 43 superimposes the left-eye image and the right-eye image one on the other, which are adjusted by the adjustment section 40, and displays a planar image, which is obtained by the superimposition, on the planar image display device 12. For example, if the respective positions of the left-eye image and the right-eye image are shifted by the adjustment section 40 in the left-right direction by the predetermined amount, the second display control section 43 shifts the respective positions of the left-eye image and the right-eye image in the left-right direction by the predetermined amount. The second display control section 43 then makes the shifted two images semi-transparent and superimposes one on the other, and displays a resulting superimposed image on the planar image display device 12 in a planar manner. Therefore, the user can view both the left-eye image and the right-eye image, and easily recognize an extent of how much the left-eye image and the right-eye image are shifted. Also, the second display control section 43 controls the display of each of the position adjustment bar 54 and the zoom adjustment bar 56, based on the signal outputted from the input control section 41.

(Adjustment Operation on Stereoscopic Image)

Figure 5:
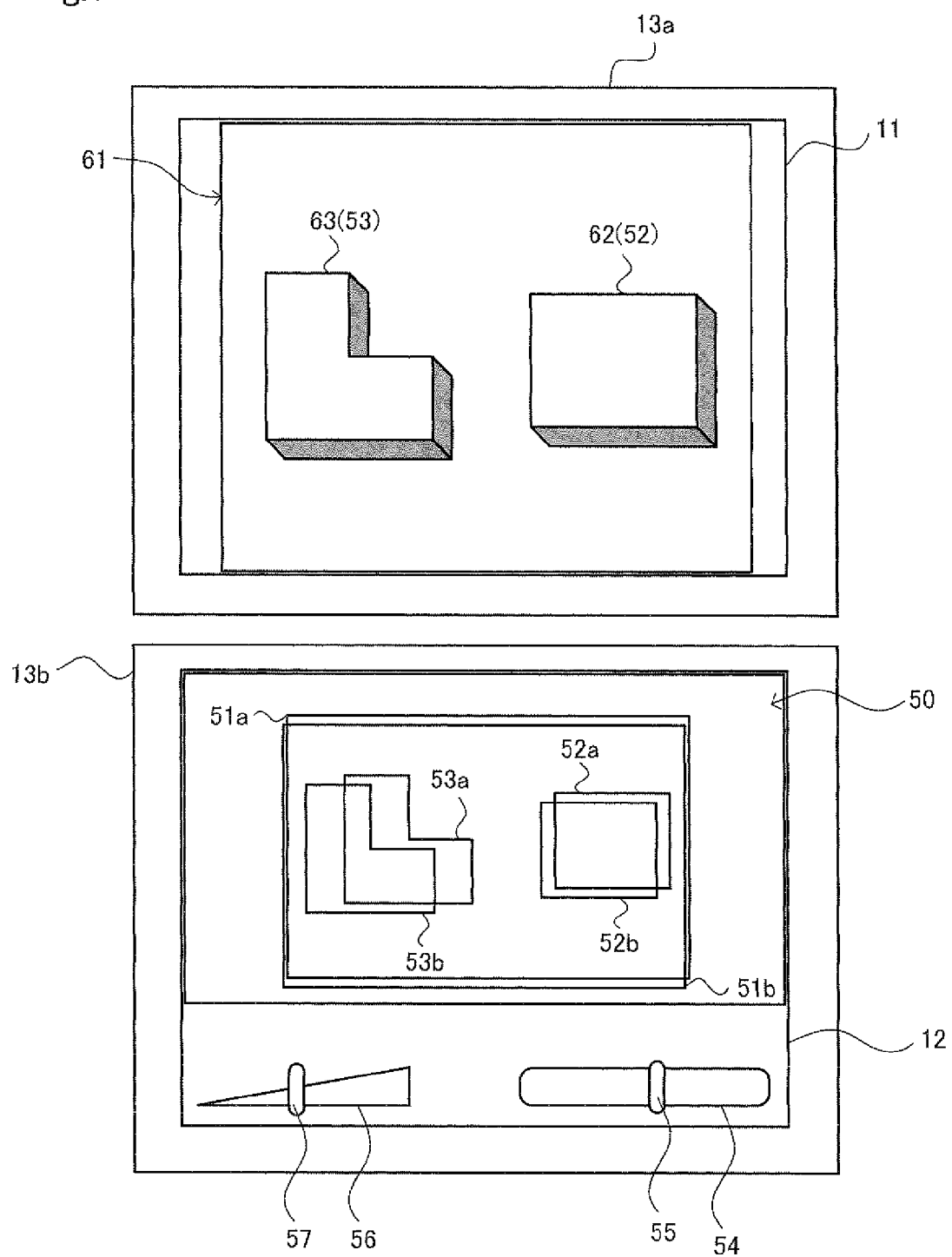
FIG. 5 is a diagram illustrating an example of images displayed on respective screens of a stereoscopic image display device 11 and a planar image display device 12.

Next, the adjustment of the stereoscopic image will be described, with reference to FIG. 5 to FIG. 12. FIG. 5 is a diagram illustrating an example of images displayed on the screens of the stereoscopic image display device 11 and the planar image display device 12. In FIG. 5 to FIG. 12, components generally ancillary to the described embodiment are omitted and additionally, the screens of the stereoscopic image display device 11 and the planar image display device 12 are represented relatively large in size as compared to the actual sizes.

As shown in FIG. 5, the image display region 50 is provided in the screen of the planar image display device 12. A left-eye image 51a and a right-eye image 51b are displayed in the image display region 50. As shown in FIG. 5, a ratio of the width of the image display region 50 in an aspect ratio (a ratio of the length in the horizontal direction (width) to the length in the vertical direction (height)) is greater than a ratio of the width of the left-eye image 51a to the right-eye image 51b in the aspect ratio. That is, the image display region 50 is an area horizontally longer than the width of each of the left-eye image 51a and the right-eye image 51b.

The left-eye image 51a is an image taken by the left-eye image imaging section 18a. An object image 52a and an object image 53a are included in the left-eye image 51a. The object image 52a and the object image 53a are images obtained by the left-eye image imaging section 18a taking images of the objects to be imaged 52 and 53 which exist in actual space. Also, the right-eye image 51b is an image taken by the right-eye image imaging section 18h, and the object image 52b and the object image 53b are included in the right-eye image 51b. The object image 52b and the object image 53b are images obtained by taking the images of the objects to be imaged 52 and 53, which exist in actual space, by the right-eye image imaging section 18b. That is, the object image 52a and the object image 52b are images taken of the same the object to be imaged 52. However, the left-eye image 51a and the right-eye image 51b have parallax therebetween, and therefore the object image 52a and the object image 52b are not exactly the same images as each other. Similarly, although the object image 53a and the object image 53b are images taken of the same object to be imaged 53, the left-eye image 51a and the right-eye image 51b has parallax, and therefore the object image 53a and the object image 53b are not exactly the same images as each other.

As shown in FIG. 5, the left-eye image 51a and the right-eye image 51b displayed on the screen the planar image display device 12 are made semi-transparent and superimposed one on the other for display. The position adjustment bar 54 and the slider 55 are displayed on the screen of the planar image display device 12. The zoom adjustment bar 56 and the slider 57 are also displayed on the screen of the planar image display device 12.

On the other hand, the stereoscopic image 61 is displayed on the screen of the stereoscopic image display device 11. The stereoscopic image 61 is the image obtained by synthesizing the left-eye image 51a and the right-eye image 51b. The stereoscopic image 61 is stereoscopically visible when seen by the user. The object image 62 and the object image 63 are included in the stereoscopic image 61. The object image 62 is an image taken of the object to be imaged 52, which exists in actual space, and an image stereoscopically visible to the user, as shown in FIG. 5. The object image 62 is an image obtained by synthesizing the object image 52a of the left-eye image 51a with the object image 52b of the right-eye image 51b. Similarly, the object image 63 is an image taken of the object to be imaged 53, which exists in actual space, and an image stereoscopically visible to the user, as shown in FIG. 5. The object image 63 is an image obtained by synthesizing the object image 53a of the left-eye image 51a with the object image 53b of the right-eye image 51b.

The position adjustment bar 54 is a user interface for the user to adjust the respective positions of the left-eye image 51a and the right-eye image 51b in the horizontal direction and the vertical direction of the screen. The user slides the slider 55 of the position adjustment bar 54 in the horizontal direction, while touching the slider 55 by using the stick 16, thereby adjusting an amount of shift (the relative positions) of the left-eye image 51a and the right-eye image 51b in the horizontal direction. Also, the user touches the predetermined position of the position adjustment bar 54 by using the stick 16 to move the slider 55 to the touch position, thereby adjusting the amount of shift (the relative positions) of the left-eye image 51a and the right-eye image 51b in the horizontal direction. This adjustment changes the stereoscopic effect of the stereoscopic image displayed on the stereoscopic image display device 11 and the detail thereof will be described below.

In FIG. 5, the left-eye image 51a and the right-eye image 51b are displayed being shifted in the up-down and the left-right directions for the purpose of explanation and, in fact, the respective positions of the left-eye image 51a and the right-eye image 51b coincide with each other (the center of the left-eye image 51a coincides with the center of the left-eye image 51a). However, the position of the object image 52a included in the left-eye image 51a differs from the position of the object image 52b included in the right-eye image 51b. Specifically, when the two images are made semi-transparent and superimposed one on the other, the object image 52a included in the left-eye image 51a is shifted rightward, as compared to the object image 52b included in the right-eye image 51b. That is, the object image 52a included in the left-eye image 51a is positioned relatively rightward, and the object image 52b included in the right-eye image 51b is positioned relatively leftward. Therefore, the object image 62 displayed on the stereoscopic image display device 11 appears to be positioned closer to the user than the screen of the stereoscopic image display device 11 (see FIG. 7 described below) is. The object image 53a included in the left-eye image 51a is further shifted rightward, as compared to the object image 53b included in the right-eye image 51b. That is, the object image 53a included in the left-eye image 51a is shifted rightward, and the object image 53b included in the right-eye image 51b is shifted leftward. The amount of shift of the object image 53a and the object image 53b is larger than the amount of shift of the object image 52a and the object image 52b. Therefore, the object image 63 displayed on the stereoscopic image display device 11 appears to be positioned even closer to the user than the object image 62 (see FIG. 7 described below) is.

Figure 6:
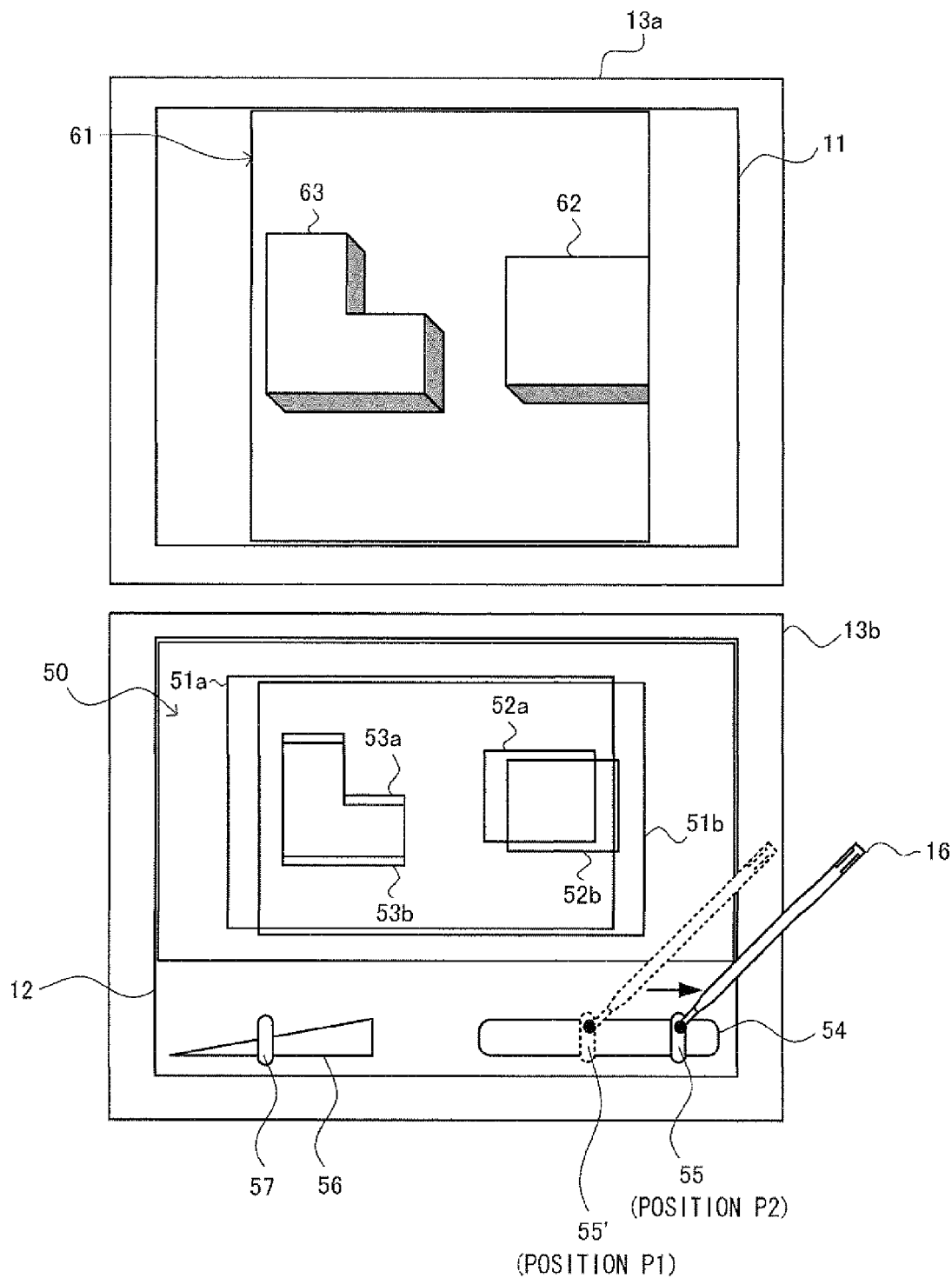
FIG. 6 is a diagram illustrating a state in which a user adjusts a slider 55 of a position adjustment bar 54 by using a stick 16.

Next, the adjustment of the left-eye image 51a and the right-eye image 51b in the horizontal direction will be described, with reference to FIG. 6. FIG. 6 is a diagram illustrating a state in which the user adjusts the slider 55 of the position adjustment bar by using the stick 16. In FIG. 6, a slider 55', which is indicated by a dotted line, is the slider 55 prior to adjustment (being moved in the right direction of the screen) by the user, and the slider 55, which is indicated by a solid line, is after the adjustment by the user. In accordance with the slider 55 being moved from a position P1 to a position P2, the left-eye image 51a and the right-eye image 51b displayed in the image display region 50 of the planar image display device 12 each move in the horizontal direction of the screen. Specifically, the left-eye image 51a moves in the leftward direction of the screen, and the right-eye image 51b moves in the rightward direction of the screen. That is, when the slider 55 of the position adjustment bar 54 moves in the horizontal direction, the left-eye image 51a and the right-eye image 51b move away from each other (shift) in the horizontal direction by an amount according to an amount of movement of the slider 55, and therefore the amount of shift of the left-eye image 51a and the right-eye image 51b changes. The amount of shift of the left-eye image 51a and the right-eye image 51h may be changed by either of the left-eye image 51a and the right-eye image 51b moving according to the amount of movement of the slider 55.

When the slider 55 of the position adjustment bar 54 is positioned at a predetermined position (the center of a range of movement, for example), the amount of shift of the left-eye image 51a and the right-eye image 51b becomes zero (the position at the center of the left-eye image 51a coincides with the position at the center of the right-eye image 51b). For example, in accordance with the slider 55 being slid rightward from the center, the amount of shift between the images becomes large such that the left-eye image 51a moves leftward and the right-eye image 51h moves rightward. This allows the object image 62 and the object image 63 displayed on the stereoscopic image display device 11 to appear to moving in the depth direction of the screen, as described below. On contrary, in accordance with the slider 55 being slid leftward from the center, an absolute value of the amount of shift between the images becomes large such that the left-eye image 51a moves rightward and the right-eye image 51b moves leftward (a value of the amount of shift in this case becomes negative). This allows the object image 62 and the object image 63 displayed on the stereoscopic image display device 11 to appear to moving in the frontward direction of the screen, as described below.

On the other hand, the stereoscopic image 61 displayed on the screen of the stereoscopic image display device 11 also changes according to the movement of the slider 55. When the slider 55 moves, the respective positions in the horizontal direction of the left-eye image 51a viewed with the user's left eye and the right-eye image 51b viewed with the user's right eye, which are displayed on the screen of the stereoscopic image display device 11, also change. That is, in similar to the left-eye image 51a and the right-eye image 51b displayed on the planar image display device 12, the left-eye image 51a and the right-eye image 51b displayed on the stereoscopic image display device 11 also move in the horizontal direction by the amount according to the amount of movement of the slider 55. As a result, when the user views the stereoscopic image 61 after the slider 55 has moved (the position P2), the object image 62 and the object image 63 included in the stereoscopic image 61 appear to be positioned in the depth direction of the screen, as compared to before the slider 55 moves (the position P1). That is, the movement of the slider 55 causes the object image 62 and the object image 63 included in the stereoscopic image 61 to appear to have moved in the depth direction of the screen.

Figure 7:
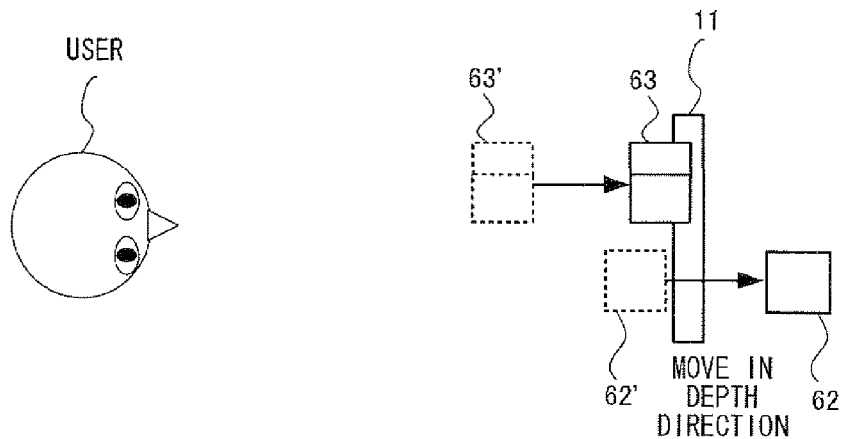
FIG. 7 is a diagram illustrating a state in which respective positions of an object image 62 (52) and an object image 63 (53), of which the user feels an experience, are changed depending on the adjustment of the slider 55 of a position adjustment bar 54.

FIG. 7 is a diagram illustrating a state in which the respective positions of the object image 62 (52) and the object image 63 (53), of which the user feels an experience, are changed depending on the adjustment of the slider 55 of the position adjustment bar 54. FIG. 7 is the diagram illustrating the user, the stereoscopic image display device 11, and the objects to be imaged 52 and 53 (the object image 62 and 63) viewed from the above, and illustrates the positional relationship thereof felt by the user as an experience. Before the slider 55 moves, the user feels an experience as if the object image 62 and the object image 63 are positioned in front of the screen of the stereoscopic image display device 11 (closer to the user side than the screen is) (appear to be positioned at positions 62' and 63', respectively). More specifically, in similar to the positional relationship between the object to be imaged 52 and the object to be imaged 53, which exist in actual space, the user feels an experience as if the object image 63' exists at a position in the frontward direction of the screen (a position closer to the user), as compared to the object image 62'. On the other hand, in accordance with the movement of the slider 55, it appears to the user as if the object image 62 and the object image 63 move in the depth direction (a direction perpendicular to the screen, and the viewing direction of the user) of the screen of the stereoscopic image display device 11 (in other words, it appears as if the screen of the stereoscopic image display device 11 moves toward the user). More specifically, after the slider 55 has moved, the user feels an experience as if the object image 62 is positioned in the depth direction of the screen, and the object image 63 is positioned near the screen. As described above, when the user moves the slider 55 in the right direction of the screen of the planar image display device 12, it appears as if the object image 62 (and 63) included in the stereoscopic image 61 has moved in the depth direction of the screen of the stereoscopic image display device 11 (as if moves away in the depth direction of the screen). On contrary, when the user moves the slider 55 in the left direction, it appears as if the object image 62 (and 63) included in the stereoscopic image 61 has moved in the frontward direction of the screen (to jump out from the screen). That is, when the user adjusts the slider 55 of the position adjustment bar 54 in the horizontal direction, it appears to the user as if the position of the object to be imaged included in the stereoscopic image 61 has changed. Therefore, the user can change the appearance of the stereoscopic image 61 by moving the slider 55 of the position adjustment bar 54 in the horizontal direction.

Furthermore, by moving the slider 55 of the position adjustment bar 54 in the horizontal direction, the user can display a desired object to be imaged included in the stereoscopic image 61 so as to be easily seen by the user. For example, as shown by the dotted line in FIG. 7, before the slider 55 is moved, the position of the object image 63 which is viewed by the user is frontward to the screen and the position (position 63') spaced a predetermined distance away from the screen. On the other hand, the position of the object image 62 which is viewed by the user is frontward to and near the screen (position 62'). In this case, it is easy for the user to view the object image 62 stereoscopically, but difficult for the user to view the object image 63 stereoscopically. This is because the image is displayed actually on the screen and thus, the user focuses the eyes on the screen to see the image. The object image 62' prior to movement, which is viewed near the screen, is easily viewed stereoscopically, because the position recognized by the user in the direction perpendicular to the screen is near the position on which the eyes are focused. On the other hand, the object image 63' prior to movement is poorly viewed stereoscopically because the position recognized by the user in the direction perpendicular to the screen is different from the position on which the eyes are focused (if the object image 63' prior to movement is seen when the eyes are focused on the screen, the image appears blurred or is unrecognizable stereoscopically). In this case, the user moves the slider 55 in the horizontal direction, and thereby moves the object image 63 in the depth direction of the screen, and moves the object image 63 to near the screen. Therefore, by moving the slider 55 in the horizontal direction, the user can display the desired object to be imaged (the object image 63) included in the stereoscopic image 61 so as to be easily seen by the user.

The stereoscopic image 61 after the adjustment of the amount of shift (the position) thereof in the horizontal direction as shown in FIG. 6 becomes such as the stereoscopic image 61 shown in FIG. 5 in which the both sides of the stereoscopic image 61 prior to adjustment are cut off (see FIG. 6). Therefore, part of the object image 62 shown in FIG. 6 is not displayed. This is because the left-eye image 51a and the right-eye image 51b are shifted in the horizontal direction, and which has caused non-overlapping portion of the two images, respectively. If the stereoscopic image including the portions of the left-eye image 51a and the right-eye image 51b, which are not superimposed (non-overlapping area) one on the other, is displayed on the stereoscopic image display device 11, part of the stereoscopic image becomes an image having the stereoscopic effect, while the other part becomes an image having no stereoscopic effect, and which is a state in which "what should be visible is invisible" or "what should be invisible is visible" for the viewer. Therefore, the image, as a whole, ends up causing a sense of discomfort for the user. Therefore, merely the respective positions of the left-eye image 51a and the right-eye image 51b, which, are superimposed (superimposing area) one on the other, are synthesized and displayed on the screen of the stereoscopic image display device 11.

Figure 8:
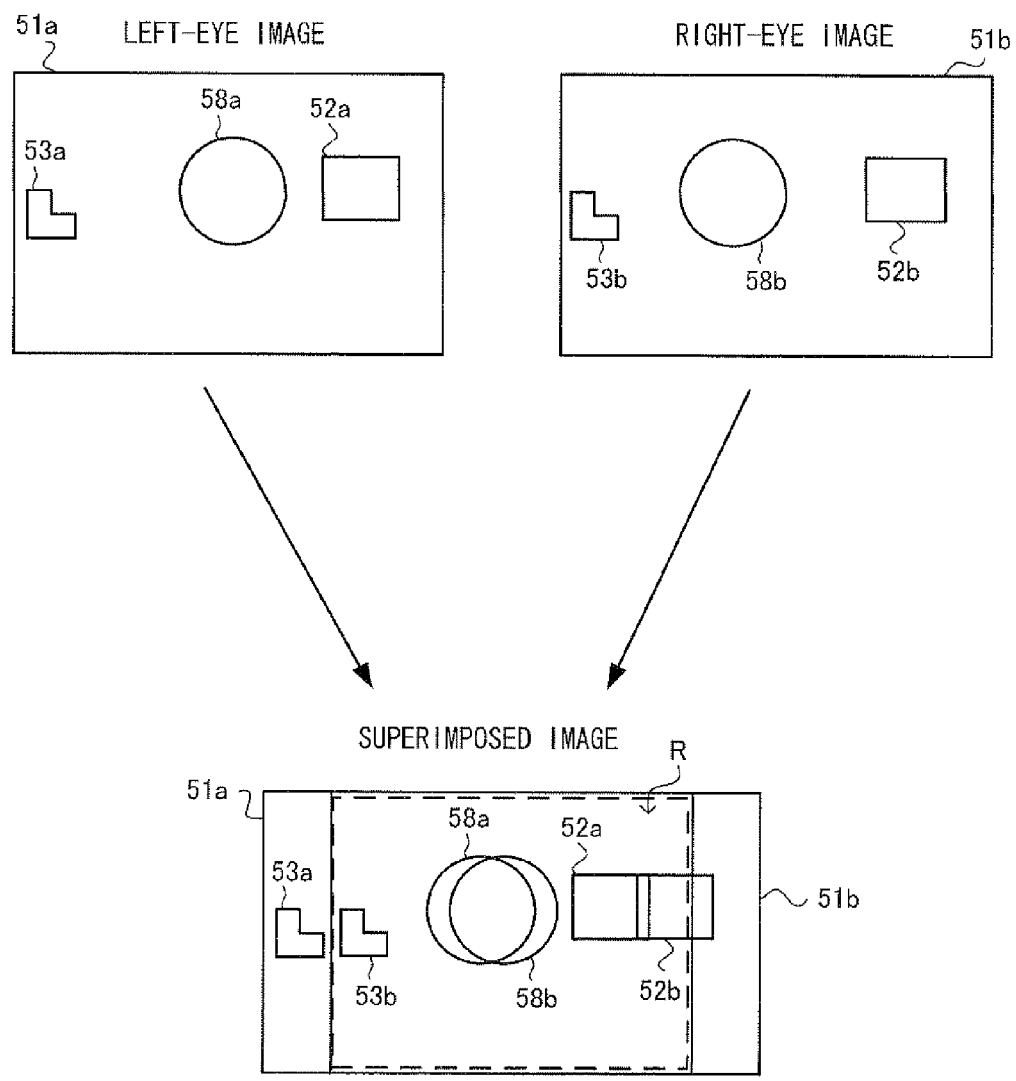
FIG. 8 is a diagram illustrating a superimposed portion and a non-overlapping portion of a left-eye image 51a and a right-eye image 51b being superimposed one on the other.

Here, the "superimposing area" and the "non-overlapping area" of the two images will be described, with reference to FIG. 8. FIG. 8 is a diagram illustrating the superimposed portion and non-overlapping portion of the left-eye image 51a and the right-eye image 51b being superimposed one on the other. As shown in FIG. 8, the object images 52a, 53a, and 58a are included in the left-eye image 51a. Similarly, the object images 52b, 53b, and 58b are included in the right-eye image 51b. Shifting these two images in the horizontal direction and superimposing one on the other cause the superimposed portion and the non-overlapping portion (non-overlapping area) of the two images (superimposing area). The superimposed portion is indicated by an area R of the superimposed image, which is surrounded by the dotted line. The non-overlapping portion is an area other than the area R of the superimposed image. Merely the area R is displayed on the screen of the stereoscopic image display device 11. In this case, when the user sees the screen of the stereoscopic image display device 11, the user can view the object image 58a with the left eye, and view the object image 58b with the right eye. As a result, the user can recognize the object image 58 stereoscopically. The object image 53b included in the right-eye image 51b is included in the area R, and therefore displayed on the screen of the stereoscopic image display device 11. On the other hand, the object image 53a included in the left-eye image 51a is not included in the area R, therefore not displayed on the screen of the stereoscopic image display device 11. Therefore, when the user sees the screen of the stereoscopic image display device 11, the user cannot view the object image 53a with the left eye, and can view the object image 53b with the right eye. This is a natural appearance for the user. That is, even when the user sees the actual space, there is the parallax between the right eye and the left eye and therefore, a certain object may be seen solely with one eye. For example, in the case where the user sees the outside view from a window, for example, there are portions of the object which cannot be seen with the right eye, but can be seen with the left eye, depending on a window frame. However, if the non-overlapping portion is included and displayed on the screen, portions (53a of FIG. 8) invisible to the user's eye (the left eye in the example shown in FIG. 8) becomes visible, thus causing the sense of discomfort for the user. Therefore, merely the superimposed portion is displayed on the stereoscopic image display device 11, thereby displaying the image which causes no sense of discomfort for the user.

On the other hand, the entirety of the left-eye image 51a and the entirety of the right-eye image 51b are displayed in the image display region 50 of the planar image display device 12 prior to and after the adjustment. More specifically, the superimposed portion and the non-overlapping portion of the left-eye image 51a and the right-eye image 51b are displayed in the image display region 50 of the planar image display device 12. As described above, in the stereoscopic image display device 11, merely the superimposed portion of the two images is displayed so as to make the stereoscopic image cause no sense of discomfort for the user. On the other hand, the left-eye image 51a and the right-eye image 51b displayed on the planar image display device 12 are viewed by both eyes of the user, and therefore the user can recognize the two images as different images. Therefore, even if the non-overlapping portion of the two images is displayed in addition to the superimposed portion, the image causes no sense of discomfort for the user. Rather, when the non-overlapping portion is included and displayed, the user can recognize the two images as different images, thereby allowing the easy recognition of the positional relationship of the two images. Therefore, the user can easily recognize the position of the object image included in the two images. Furthermore, because the non-overlapping portion is included and displayed on the planar image display device 12, the user can view an object to be imaged (this object to be imaged is not displayed on the stereoscopic image display device 11, or, even if displayed on the stereoscopic image display device 11, viewed with merely one eye of the user), which exists in the non-overlapping portion. For example, the object image 53*a* shown in FIG. 8, which is included in the left-eye image 51*a*, exists in the non-overlapping portion, and is not viewed with the user's left eye. In the case where the left-eye image 51*a* is moved in order to allow such object image 53*a* to be viewed with the user's left eye, it is difficult for the user to make adjustment, while seeing the stereoscopic image 61 displayed on the stereoscopic image display device 11. That is, the object image 53*a* is not displayed on the stereoscopic image display device 11, and therefore the user cannot recognize the position of the object image 53*a*. However, the non-overlapping portion is also displayed on the planar image display device 12, and therefore the user can adjust the position of the object image 53*a*, while viewing the object image 53*a* included in the non-overlapping portion. Therefore, the user can adjust the position of the object to be imaged which exists in the non-overlapping portion, and easily display the desired object to be imaged stereoscopically.

Furthermore, the user can adjust the respective positions of the left-eye image 51*a* and the right-eye image 51*b*, while seeing the stereoscopic image 61 displayed on the stereoscopic image display device 11, and therefore the user can easily adjust the stereoscopic image. As described above, when the user sees the stereoscopic image 61 displayed on the stereoscopic image display device 11, it may be difficult for the user to stereoscopically view the object image 63' shown in FIG. 7. If the user cannot view the object image 63' stereoscopically, it is difficult to determine the direction in which the left-eye image 51*a* and the right-eye image 51*b* should be adjusted by merely seeing the stereoscopic image display device 11 (determination of a position, to which the object image 63' should be moved in the direction perpendicular to the screen, cannot be made). On the other hand, the left-eye image 51*a* and the right-eye image 51*b* are made semi-transparent and superimposed one on the other, and displayed on the planar image display device 12. This allows the user to easily recognize how far the object images 53*a* and 53*b*, which are included in the two images, are apart from each other, by seeing the planar image display device 12. Therefore, the user may adjust the respective positions of the left-eye image 51*a* and the right-eye image 51*b* so as to make the object images 53*a* and 53*b* closer to each other (so that the object images 53*a* and 53*b* are superimposed one on the other), while seeing the left-eye image 51*a* and the right-eye image 51*b* displayed on the planar image display device 12.

Furthermore, the user can adjust the respective positions (the amount of shift in the horizontal direction) of the left-eye image 51*a* and the right-eye image 51*b*, while viewing the entirety of both the left-eye image 51*a* and the right-eye image 51*b* (the entirety of the image including the superimposed portion and the non-overlapping portion). Therefore, the positional relationship of the two images is easily recognizable to the user, thereby being adjusted easily. The user can easily adjust the two images, for example, even in the case where the user adjusts the two images to view a certain object to be imaged stereoscopically, and thereafter adjusts the two images to view another object to be imaged stereoscopically. That is, the entirety of both the left-eye image 51*a* and the right-eye image 51*b* are displayed on the planar image display device 12 and thus, even after the respective positions of the two images are adjusted, the positional relationship of the two images can be easily recognized. Therefore, the two images are easily adjusted.

As described above, the slider 55 of the position adjustment bar 54 is moved in the horizontal direction, and thereby the images displayed on the stereoscopic image display device 11 and the planar image display device 12 change. Specifically, by adjusting the respective positions of the left-eye image 51*a* and the right-eye image 51*b* in the horizontal direction, the user can display the object to be imaged, which is included in the stereoscopic image, so that the object to be imaged is moved in the direction perpendicular to the screen. This allows the user to adjust the respective positions of the left-eye image 51*a* and the right-eye image 51*b* displayed on the planar image display device 12, while seeing the stereoscopic image 61 displayed on the stereoscopic image display device 11. Therefore, the user can easily adjust the appearance of the stereoscopic image.

Figure 9:
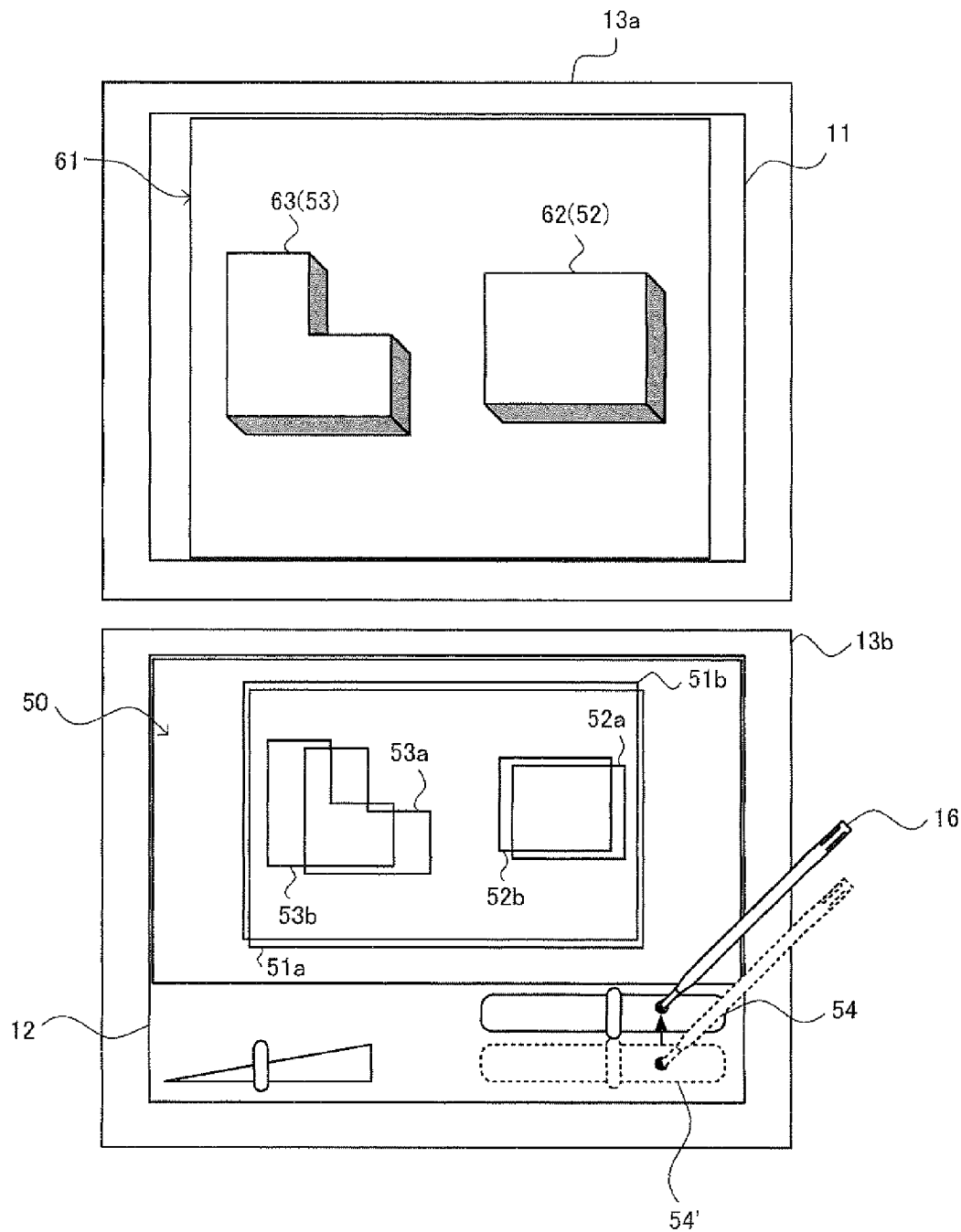
FIG. 9 is a diagram illustrating a state in which the user adjusts the respective positions of the left-eye image 51a and the right-eye image 51b in the vertical direction by using the position adjustment bar 54.

Next, the adjustment of the respective positions of the left-eye image 51*a* and the right-eye image 51*b* in the vertical direction will be described, with reference to FIG. 9. FIG. 9 is a diagram illustrating a state in which the user adjusts the respective positions of the left-eye image 51*a* and the right-eye image 51*b* in the vertical direction by using the position adjustment bar 54.

As shown in FIG. 9, if the user moves the stick 16 in the upward direction of the screen of the planar image display device 12 by using the stick 16, while touching the position adjustment bar 54 by using the stick 16, the position adjustment bar 54 also moves in the upward direction, according to the movement of the touch position. The position adjustment bar 54 can be moved in the vertical direction (the up-down directions) of the screen, the range of movement (a range in which the position adjustment bar 54 moves) of the position adjustment bar 54 is previously determined. The range of movement of the position adjustment bar 54 in the vertical direction is set smaller than the range of movement of the slider 55 of the position adjustment bar 54 in the horizontal direction.

When the position adjustment bar 54 moves in the vertical direction, the left-eye image 51*a* and/or the right-eye image 51*b* displayed in the image display region 50 of the planar image display device 12 also move in the vertical direction (the up-down directions). For example, when the position adjustment bar 54 is moved in the upward direction of the screen, the left-eye image 51*a* (or the right-eye image 51*b*) also moves in the upward direction of the screen, according to an amount of movement of the position adjustment bar 54 in the upward direction. According to the movement of the position adjustment bar 54 in the vertical direction, the left-eye image 51*a* and the right-eye image 51*b* displayed on the image display region 50 may be moved away from each other in the vertical direction, or merely an image selected by the stick 16 may be moved in the vertical direction.

On the other hand, according to the movement the position adjustment bar 54 in the vertical direction, the appearance of the stereoscopic image 61 displayed on the screen of the stereoscopic image display device 11 also changes. For example, if the left-eye image 51*a* and the right-eye image 51*b* are shifted from each other to a large extent in the vertical direction of the screen, and when the user sees the object image 62 included in the stereoscopic image 61, the object image 62 may appear different in shape, as compared to the actual object to be imaged 52, or appear poorly visible as stereoscopic image. However, the easy-to-see image which exerts the stereoscopic effect on the user can be displayed on the stereoscopic image display device 11 by the user adjusting the amount of the shift of the left-eye image 51*a* and the right-eye image 51*b* in the vertical direction.

As described above, by moving the position adjustment bar 54 in the vertical direction (the up-down directions) of the screen of the planar image display device 12, the amount of shift of the respective positions of the left-eye image 51*a* and the right-eye image 51*b* in the vertical direction can be adjusted. The amount of shift in the vertical direction is caused by the amount of shift of the physical positions between the left-eye image imaging section 18*a* and the right-eye image imaging section 18*b*. For example, if the left-eye image imaging section 18*a* is slightly deviated (deviated in the upward direction as compared to the left-eye image imaging section 18*a* shown in FIG. 2) in the vertical direction, as compared to the right-eye image imaging section 18*b* because of error in manufacturing, images deviated from each other in the vertical direction are taken. The user can adjust such amount of deviation between the left-eye image 51*a* and the right-eye image 51*b* in the vertical direction by using the position adjustment bar 54.

Normally, the deviation between the left-eye image 51*a* and the right-eye image 51*b* in the vertical direction is slight and thus, the user makes merely fine adjustment in the vertical direction. On the other hand, the user moves the object to be imaged, which is included in the stereoscopic image, in the depth direction or the frontward direction of the screen, and thus adjusts the amount of shift and the left-eye image 51*a* and the right-eye image 51*b* in the horizontal direction by sliding the slider 55 in the horizontal direction. That is, normally, the amount of adjustment in the vertical direction is smaller than the amount of adjustment in the horizontal direction. Therefore, in the present embodiment, the range of movement of the position adjustment bar 54 in the vertical direction is set smaller than the range of movement of the slider 55 of the position adjustment bar 54 in the horizontal direction. Therefore, the user can easily adjust the amount of shift of the left-eye image 51*a* and the right-eye image 51*b* in the horizontal direction, and easily make the fine adjustment in the vertical direction. That is, the slider 55 has large range of movement in the horizontal direction, and the position adjustment bar 54 has small range of movement in the vertical direction, and therefore the user can make adjustment in the horizontal direction to the large extent, and make merely fine adjustment in the vertical direction. Moreover, the slider 55 is slid in the horizontal direction for the adjustment in the horizontal direction, and the position adjustment bar 54 is moved in the vertical direction for the adjustment in the vertical direction, and therefore such operations are said to be intuitive and friendly operations for the user. The adjustment of the left-eye image 51*a* and the right-eye image 51*b* in the vertical direction may be made by a slider of an adjustment slider different from the position adjustment bar 54.

Figure 10:
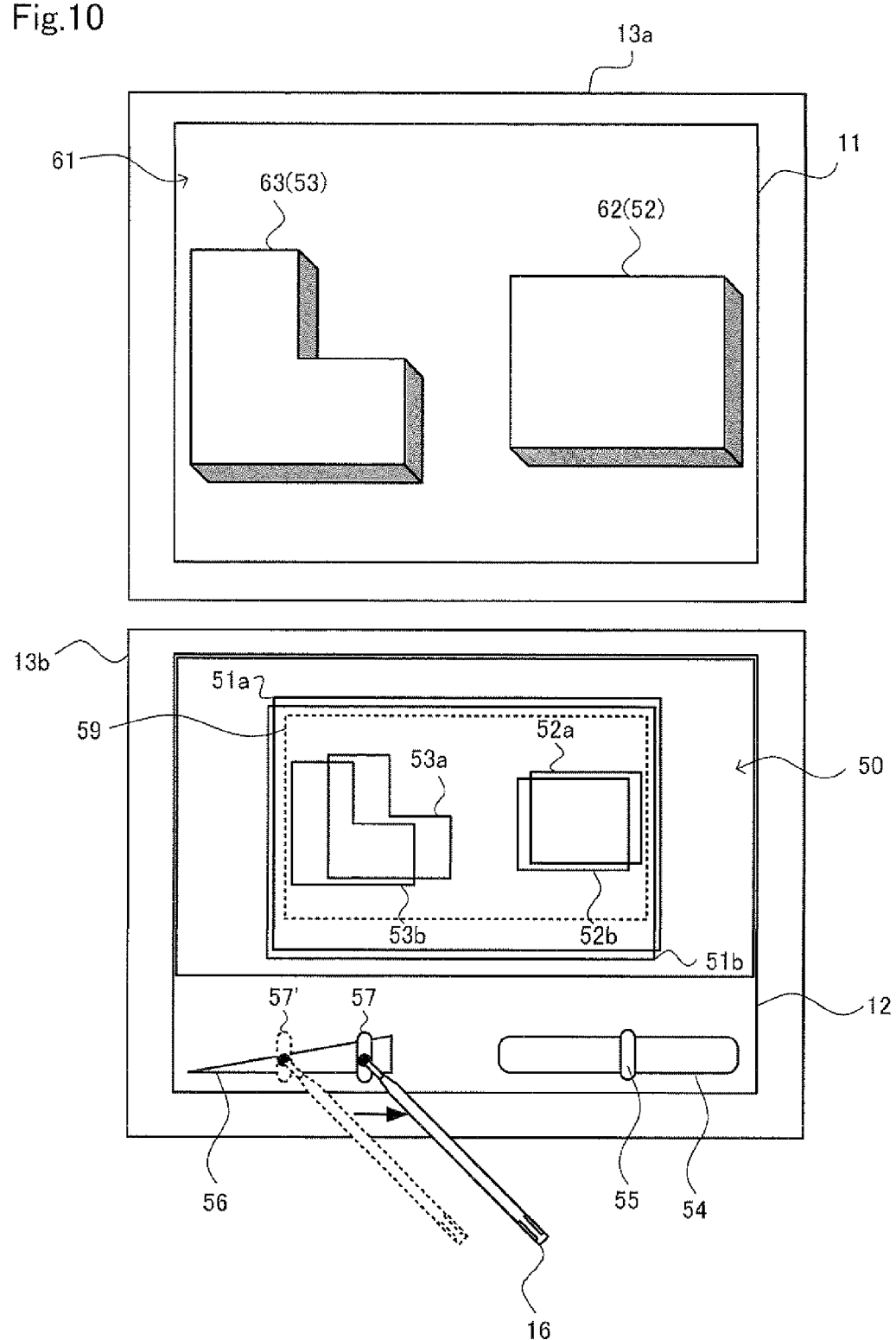
FIG. 10 is a diagram illustrating a state in which a zoom adjustment bar 56 is used for enlarging a stereoscopic image 61.

Next, a zoom operation will be described, with reference to FIG. 10. FIG. 10 is a diagram illustrating a state in which the stereoscopic image 61 is enlarged by using the zoom adjustment bar 56. As shown in FIG. 10, when the user moves the stick 16 in the rightward direction of the screen of the planar image display device 12, while touching the slider 57 of the zoom adjustment bar 56 by using the stick 16, the slider 57 moves in the rightward direction. 57' indicates the slider 57 prior to movement, and 57 indicates the slider 57 after the movement. The stereoscopic image 61 displayed on the stereoscopic image display device 11 is enlarged according to the movement of the slider 57. In FIG. 10, the stereoscopic image 61 is enlarged and thus, the object images 62 and 63, which are included in the stereoscopic image 61, are also enlarged. Since the stereoscopic image 61 is enlarged larger than the screen of the stereoscopic image display device 11, merely a portion thereof is displayed.

On the other hand, the left-eye image 51*a* and the right-eye image 51*b* displayed on the planar image display device 12 are not enlarged according to the movement of the slider 57. A stereoscopic image display frame 59 shown by the dotted line in FIG. 10 is displayed in the image display region 50 of the planar image display device 12. The stereoscopic image display frame 59 indicates an area corresponding to the area in which the stereoscopic image is displayed on the stereoscopic image display device 11. As described above, even though the stereoscopic image displayed on the stereoscopic image display device 11 is enlarged, the left-eye image 51*a* and the right-eye image 51*b* displayed on the planar image display device 12 are not enlarged, but the entirety thereof are displayed. Therefore, even when the stereoscopic image is enlarged, the respective positions of the left-eye image 51*a* and the right-eye image 51*b* is easily adjusted (the adjustment of the respective positions in the horizontal direction and the vertical direction by using the position adjustment bar 54). That is, the entirety of the left-eye image 51*a* and the entirety of the right-eye image 51*b* are displayed on the planar image display device 12, and thereby the user can easily understand the positional relationship of these images.

Figure 11:
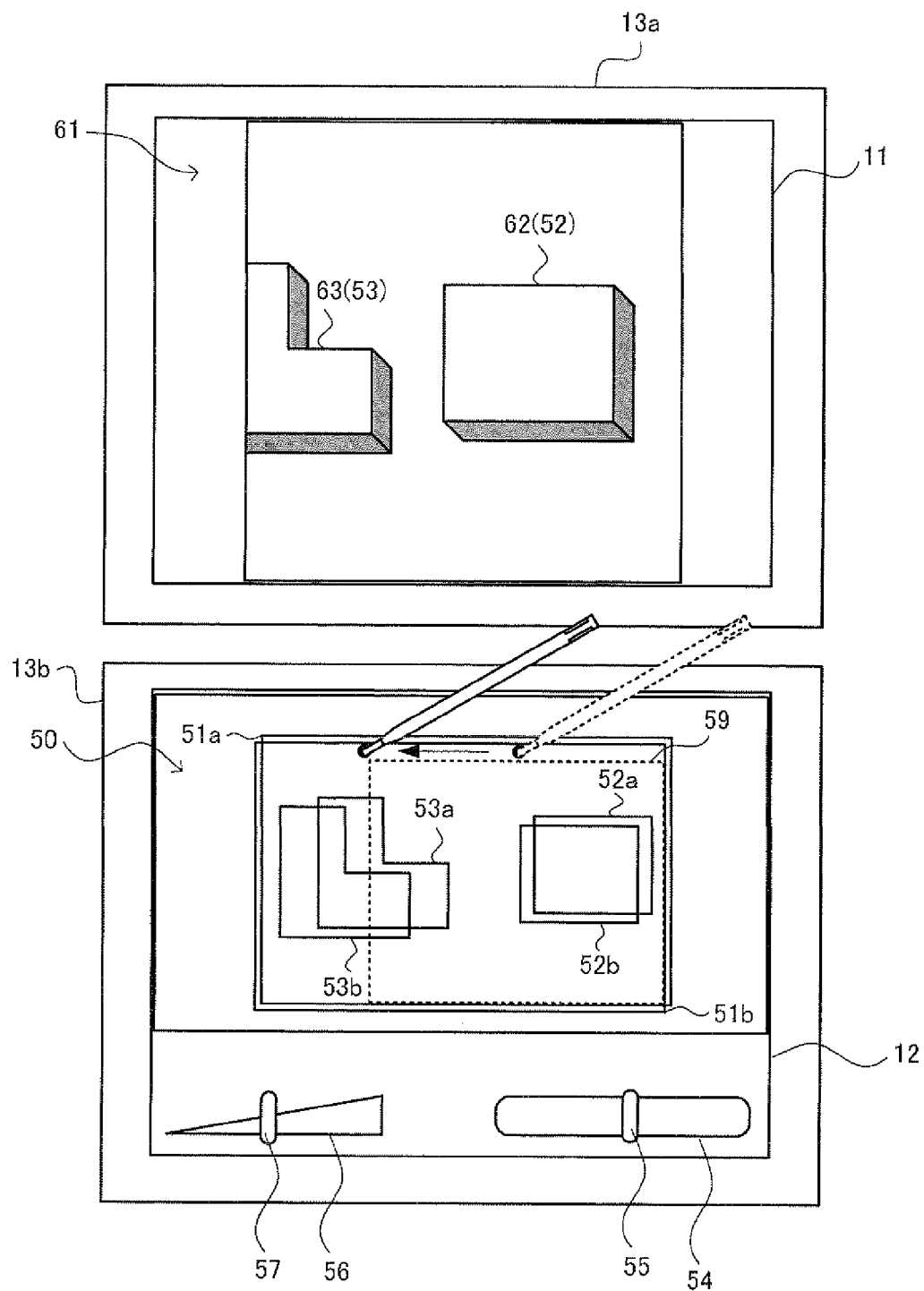
FIG. 11 is a diagram illustrating a state in which the stereoscopic image 61 is scrolled by a touch operation.

Next, a scrolling operation will be described, with reference to FIG. 11. FIG. 11 is a diagram illustrating a state in which the stereoscopic image 61 is scrolled by a touch operation. As shown in FIG. 11, when the user moves on the screen the left-eye image 51*a* or the right-eye image 51*b*, which are displayed on the planar image display device 12, while touching the left-eye image 51*a* or the right-eye image 51*b* by using the stick 16, the stereoscopic image 61 on the stereoscopic image display device 11 is scrolled. For example, when the user moves the left-eye image 51*a* or the right-eye image 51*b* in the leftward direction, while touching the left-eye image 51*a* or the right-eye image 51*b* by using the stick 16, the stereoscopic image 61 is scrolled in the rightward direction (the object image 62 included in the stereoscopic image 61 moves in the leftward direction). On the screen of the stereoscopic image display device 11 shown in FIG. 11, an image after the stereoscopic image 61 is scrolled is displayed. Since the stereoscopic image 61 is scrolled in the rightward direction, the object image 62 included in the stereoscopic image 61 moves leftward relative to the center of the screen, and a portion of the object image 63 is not displayed. By performing the scrolling operation, the user can scroll the stereoscopic image 61 in any direction of the screen.

On the other hand, the left-eye image 51*a* and the right-eye image 51*b* displayed on the planar image display device 12 are not scrolled by the above-described scrolling operation (the operation of moving the images in the right direction of the screen, while touching the images) by the user. The stereoscopic image display frame 59 is displayed in the image display region 50 of the planar image display device 12. As described above, even though the stereoscopic image displayed on the stereoscopic image display device 11 is scrolled, the left-eye image 51*a* and the right-eye image 51*b* displayed on the planar image display device 12 are not scrolled. Therefore, the adjustment of the respective positions of the left-eye image 51*a* and the right-eye image 51*b* (the adjustment of the respective positions in the horizontal direction and the vertical direction by use of the position adjustment bar 54) is easy. That is, the entirety of the left-eye image 51*a* and the entirety of the right-eye image 51*b* are displayed on the planar image display device 12, and thereby the user can easily understand the positional relationship of the images.

Figure 12:
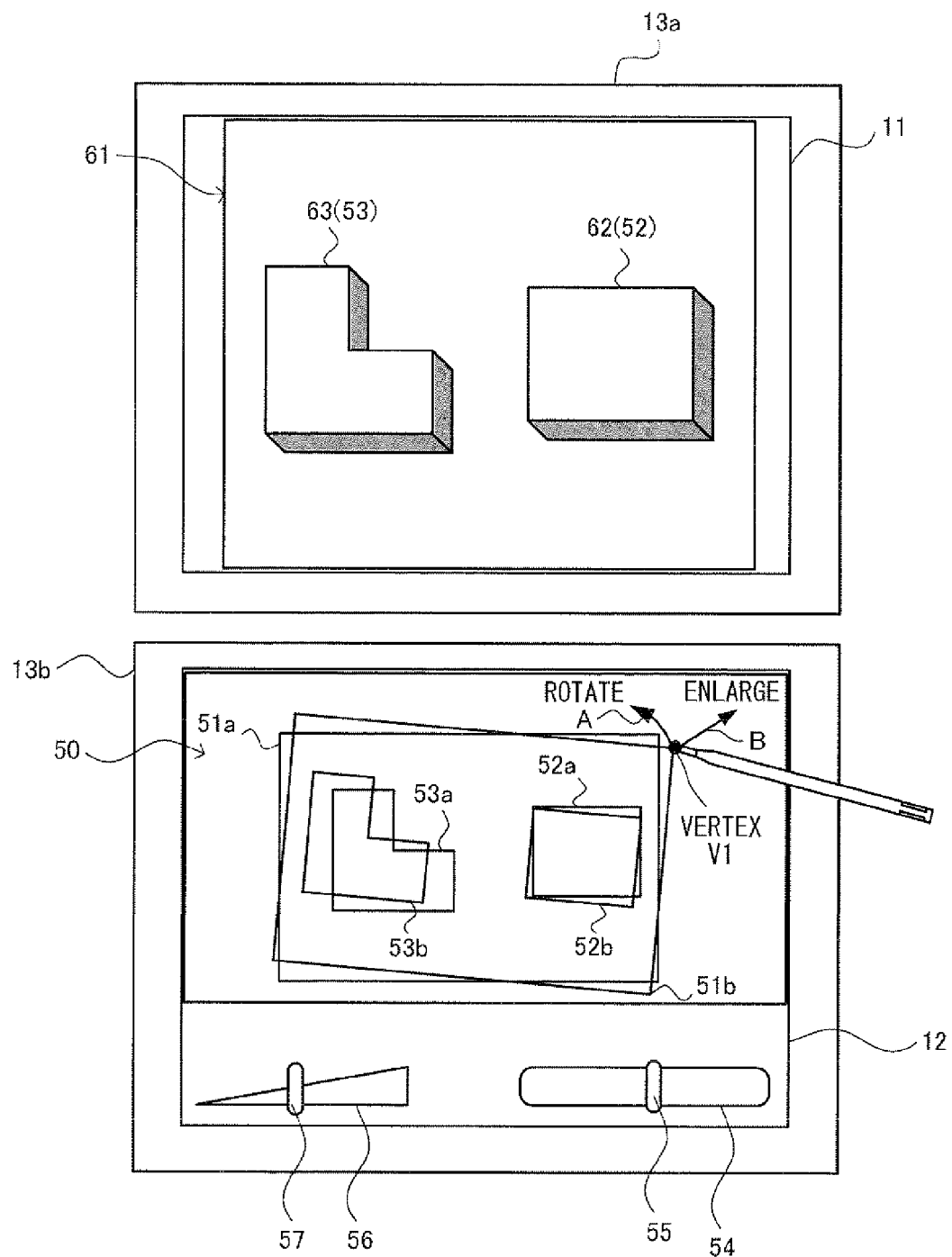
FIG. 12 is a diagram illustrating a state in which the stereoscopic image is adjusted by rotating or enlarging the right-eye image 51b.

Next, rotation and change in size of the left-eye image 51*a* or the right-eye image 51*b* will be described, with reference to FIG. 12. FIG. 12 is a diagram illustrating a state in which the stereoscopic image is adjusted by rotating or enlarging the right-eye image 51*b*. When the user moves, by using the stick 16, the predetermined position of the left-eye image 51*a* or the right-eye image 51*b* displayed on the planar image display device 12, while touching the left-eye image 51a or the right-eye image 51b, the left-eye image 51a or the right-eye image 51b rotates. For example, as shown in FIG. 12, when the user performs an operation so as to rotate the right-eye image 51b, while touching a vertex V1 of the right-eye image 51b (moves the stick 16 in a direction indicated by an arrow A shown in FIG. 12), the right-eye image 51b rotates. Furthermore, for example, when the user moves the stick 16 in a diagonal direction of the right-eye image 51b (moves the stick 16 in a direction indicated by an arrow B shown in FIG. 12), while touching the vertex V1 of the right-eye image 51b, the right-eye image 51b enlarges.

On the other hand, in accordance with the rotation or enlargement of the right-eye image 51b, the appearance of the stereoscopic image 61 displayed on the screen of the stereoscopic image display device 11 also changes. For example, in the case where the right-eye image 51b is rotated by a predetermined angle relative to the left-eye image 51a (more accurately, in the case where the object image 52b included in the right-eye image 51b is rotated by the predetermined angle relative to the object image 52a included in the left-eye image 51a), and when the user sees the object image 62 included in the stereoscopic image 61, the object image 62 may appear different in shape, as compared to the actual object to be imaged 52, or appear poorly visible as an stereoscopic image. Such rotation is likely to due to the error in manufacturing, or the like. For example, there is a case in manufacturing where the left-eye image imaging section 18a is provided being rotated by a predetermined angle. Therefore, the user can adjust the relative angle of rotation of the left-eye image 51a and the right-eye image 51b by rotating the left-eye image 51a or the right-eye image 51b. This allows the user to display on the stereoscopic image display device 11 an easy-to-see image which exerts the stereoscopic effect on the user.

Also, if the right-eye image 51b is small as compared to the left-eye image 51a, (more accurately, the object image 52b included in the right-eye image 51b is smaller than the object image 52a included in the left-eye image 51a) for example, and when the user sees the object image 62 included in the stereoscopic image 61, the object image 62 may appear different in shape, as compared to the actual object to be imaged 52, or appear poorly visible as an stereoscopic image. Such difference in size may be caused by a state during imaging (for example, difference in an operation of a zoom mechanism between the left-eye image imaging section 18a and the right-eye image imaging section 18b). The user can adjust the relative sizes of the left-eye image 51a and the right-eye image 51b by enlarging or reducing the left-eye image 51a or the right-eye image 51b by the above-described operation. This allows the user to display on the stereoscopic image display device 11 the easy-to-see image which exerts the stereoscopic effect on the user.

(Details of Image Display Control Process)

Figure 13:
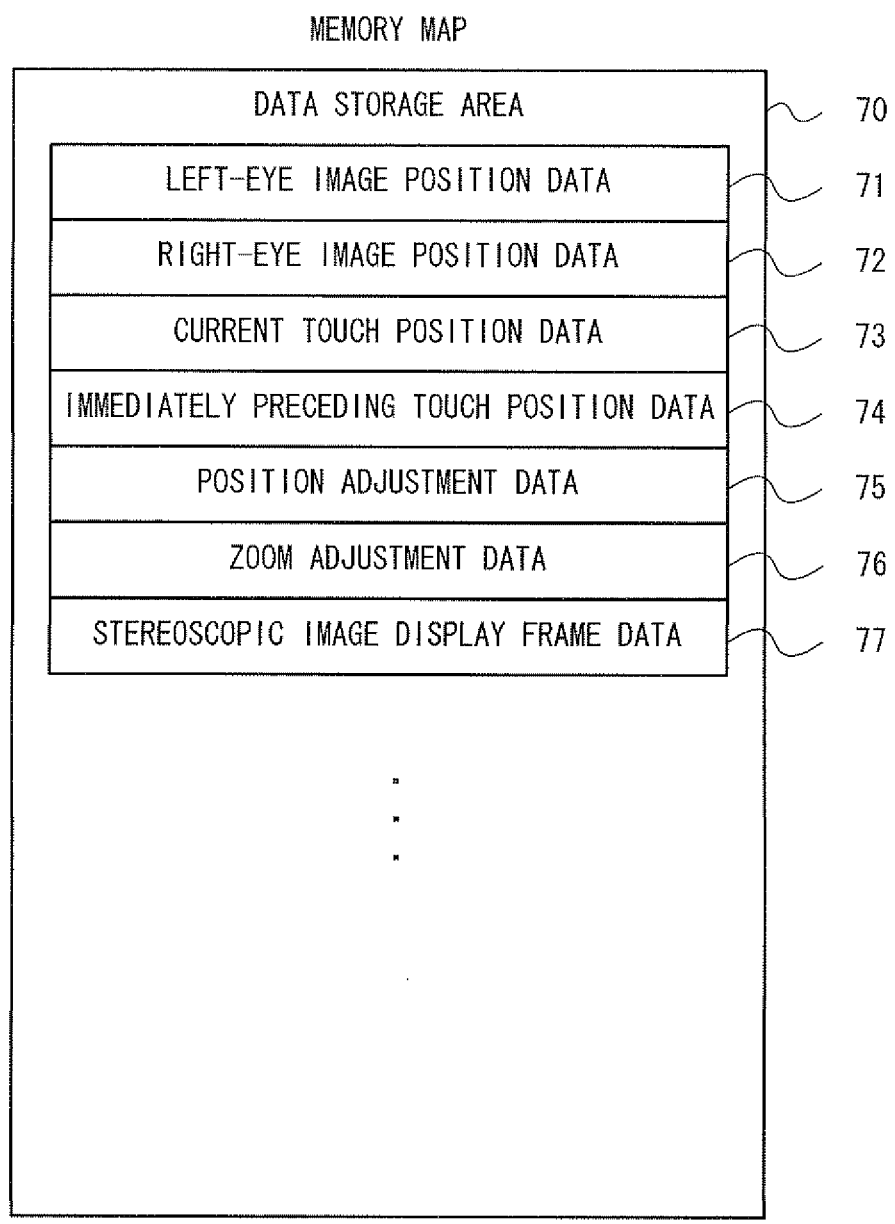
FIG. 13 is a diagram illustrating a memory map of a main memory 31 of the image display apparatus 10

Next, an image display control process according to the present embodiment will be described in detail, with reference to FIG. 13 to FIG. 18. Initially, main data which is stored in the main memory 31 during the image display control process will be described. FIG. 13 is a diagram illustrating a memory map of the main memory 31 of the image display apparatus 10. As shown in FIG. 13, a data storage area 70 is provided in the main memory 31. The data storage area 70 stores therein left-eye image position data 71, right-eye image position data 72, current touch position data 73, immediately preceding touch position data 74, position adjustment data 75, zoom adjustment data 76, stereoscopic image display frame data 77, and the like. Other data stored in the main memory 31 are a program for executing the image display control process, left-eye image data, right-eye image data, image data of the position adjustment bar, image data of the zoom adjustment bar, and the like.

The left-eye image position data 71 is data indicative of a display position of the left-eye image 51a, indicating a coordinate value of the center of the left-eye image 51a. The right-eye image position data 72 is data indicative of a display position of the right-eye image 51b, indicating a coordinate value of the center of the right-eye image 51b.

The current touch position data 73 is data indicative of a coordinate value, which is detected by the touch panel 15 in a current frame, of the touch position. If the touch position is not detected in the current frame, a value, which indicates that the touch position is not detected, is stored in the current touch position data 73. The immediately preceding touch position data 74 is data indicative of a coordinate value detected by the touch panel 15 in an immediately preceding frame. If the touch position is not detected in the immediately preceding frame, a value, which indicates that the touch position is not detected, is stored in the immediately preceding touch position data 74.

The position adjustment data 75 is data regarding the position adjustment bar 54. Specifically, the position adjustment data 75 includes data indicative of a coordinate value of a display position of the position adjustment bar 54, and data indicative of the position of the slider 55 on the position adjustment bar 54.

The zoom adjustment data 76 is data regarding the zoom adjustment bar 56, indicative of the position of the slider 57 on the zoom adjustment bar 56.

The stereoscopic image display frame data 77 is data indicative of the position and size of the stereoscopic image display frame 59 displayed on the planar image display device 12.

Figure 14:
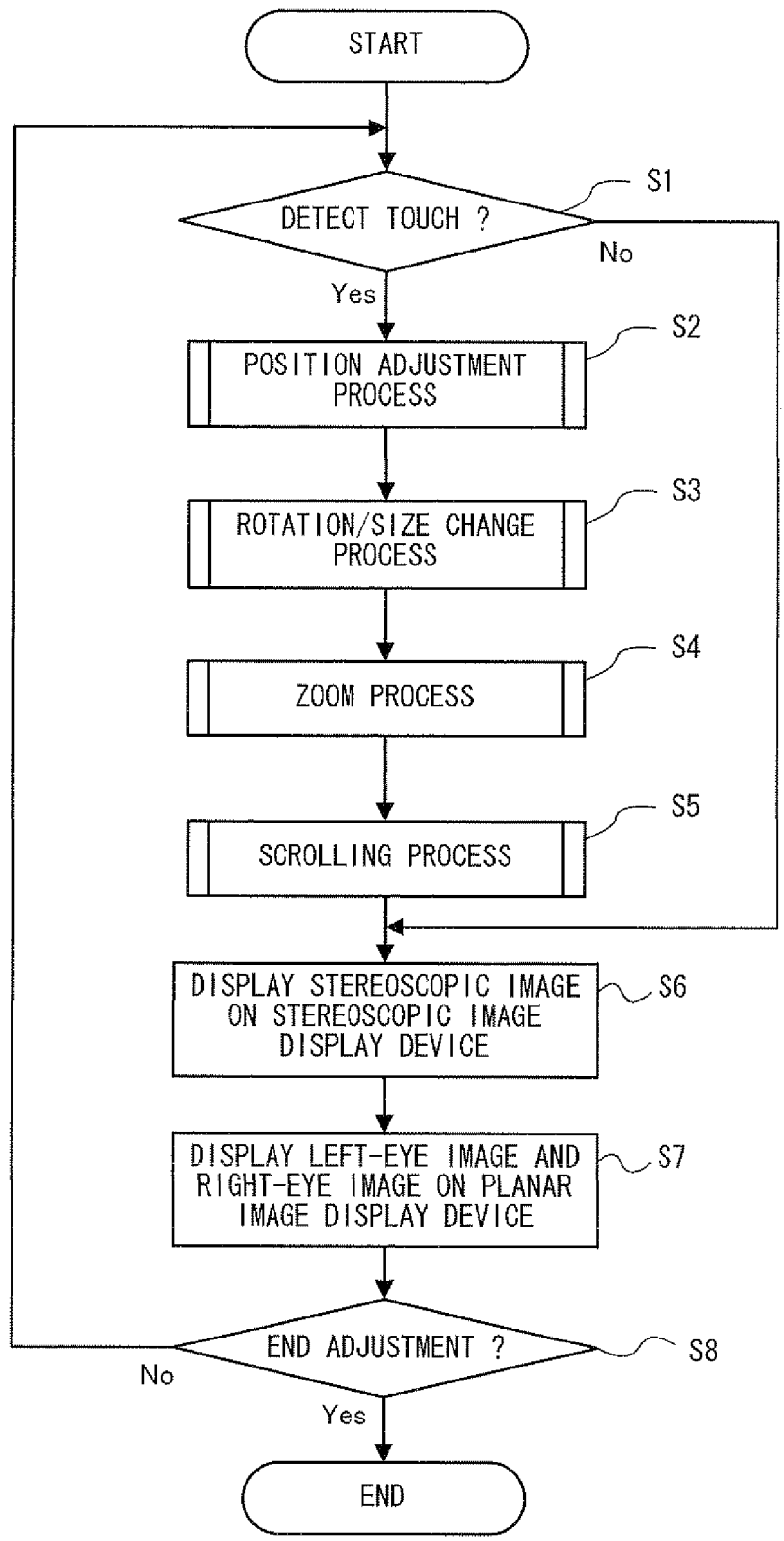
FIG. 14 is a main flowchart illustrating in detail an image display control process according to a first embodiment.

Next, the image display control process will be described in detail, with reference to FIG. 14. FIG. 14 is a main flowchart illustrating in detail the image display control process according to the first embodiment. When the image display apparatus 10 is powered on, the CPU 30 of the image display apparatus 10 executes a boot program stored in the ROM 32 to initialize each unit, such as the main memory 31. Next, the main memory 31 reads the image display control program stored in the ROM 32, and the CPU 30 starts executing the program. The main memory 31 reads the left-eye image 51a and the right-eye image 51b stored in the stored data memory 34. The flowchart shown in FIG. 14 is a flowchart showing a process which is performed after the above-described process is completed. The description of processes, which does not directly relate to the particular aspect of the exemplary embodiment, is omitted in FIG. 14. A processing loop of step S1 through step S8 shown in FIG. 14 is repeatedly executed for each frame (for example, 1/30 second, which is referred to as frame time).

Initially, in step S1, the CPU 30 detects that a touch has occurred on the touch panel 15. If the touch has occurred on the touch panel 15, the CPU 30 stores the detected touch position in the main memory 31 as the current touch position data 73, and next executes a process of step S2. On the other hand, if the touch has not occurred on the touch panel 15, the CPU 30 stores in the main memory 31 the value which indicates that the touch position has not been detected as the current touch position data 73, and next executes a process of step S6.

Figure 15:
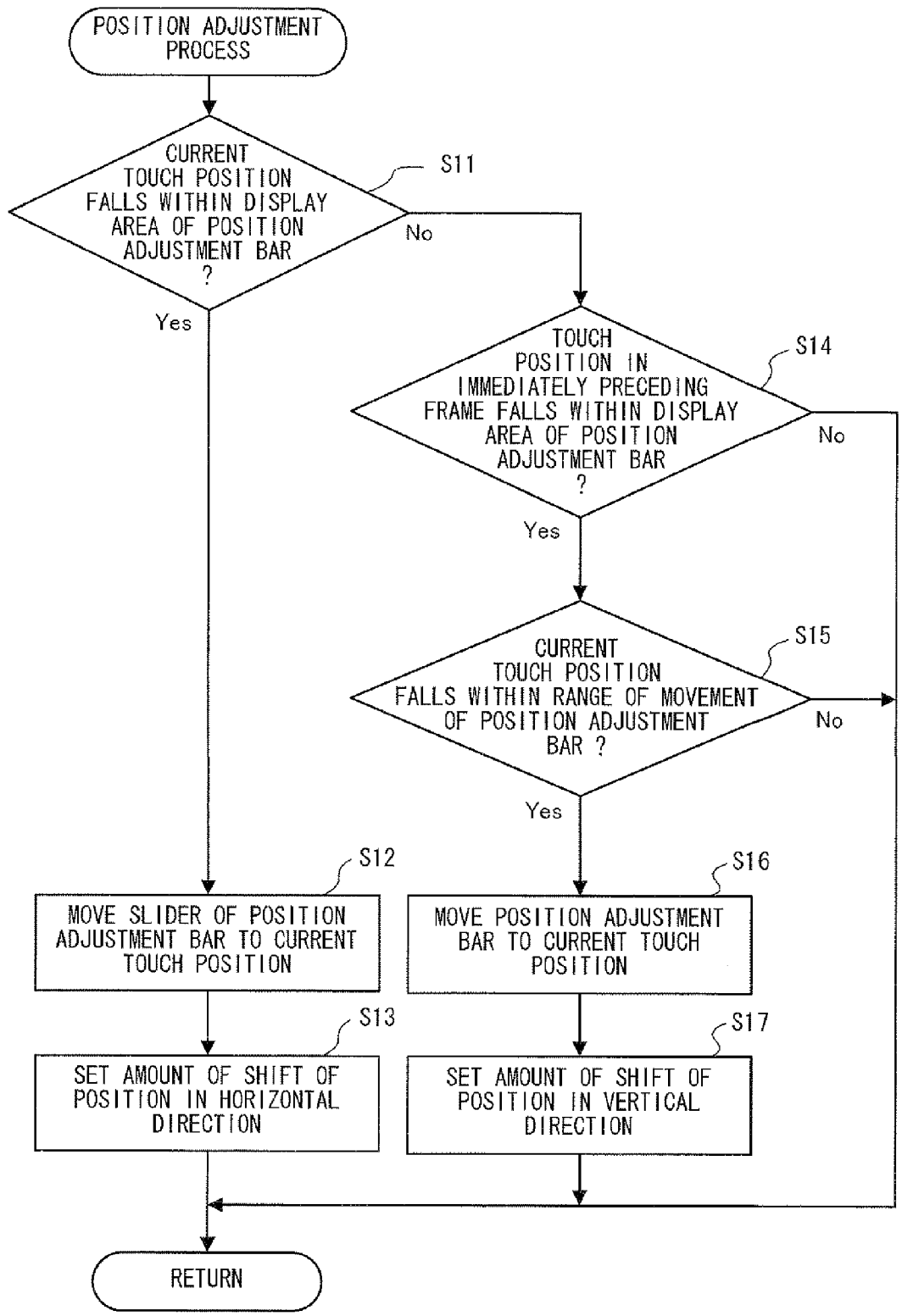
FIG. 15 is a flowchart illustrating in detail a position adjustment process (step S2)

In step S2, the CPU 30 executes a position adjustment process. In step S2, the CPU 30 adjusts the respective positions of the left-eye image 51a and the right-eye image 51b, based on the detected touch position. The position adjustment process in step S2 will be described in detail, with reference to FIG. 15. FIG. 15 is a flowchart showing in detail the position adjustment process (step S2).

In step S11, the CPU 30 determines whether or not the current touch position falls within the display area of the position adjustment bar 54. Specifically, the CPU 30 refers to the current touch position data 73 stored in the main memory 31 to acquire the current touch position (the touch position detected in step S1 of the current processing loop). Next, the CPU 30 refers to the position adjustment data 75 to determine whether or not the acquired current touch position falls within the display area (the area in which the position adjustment bar 54 is displayed on the screen of the planar image display device 12) of the position adjustment bar 54. If the determination result is affirmative, the CPU 30 next executes a process of step S12. On the other hand, if the determination result is negative, the CPU 30 next executes a process of step S14.

In step S12, the CPU 30 moves the slider 55 of the position adjustment bar 54 to the current touch position. In step S12, the slider 55 of the position adjustment bar 54 is moved on the position adjustment bar 54 in the horizontal direction. Specifically, the CPU 30 calculates a position on the position adjustment bar 54, which corresponds to the current touch position, and stores the calculated position in the position adjustment data 75 of the main memory 31. Next, the CPU 30 executes a process of step S13.

In step S13, the CPU 30 sets the amount of shift of the respective positions in the horizontal direction. Specifically, the CPU 30 calculates the amount of shift of the left-eye image 51a and the right-eye image 51b in the horizontal direction (the left-right (X-axis) direction of the screen), based on the position calculated in step S12 of the slider 55 on the position adjustment bar 54, and stores the calculated amount of shift in the main memory 31. If the slider 55 is present at a position predetermined distance away from the left end of the position adjustment bar 54, the CPU 30 sets the amount of shift in the horizontal direction, according to the predetermined distance. The amount of shift in the horizontal direction is an amount of shift (a difference in X coordinate values) of a coordinate value of the center of the left-eye image 51a and a coordinate value of the center of the right-eye image 51b relative to the X axis. For example, the CPU 30 sets the amount of shift in the horizontal direction as positive in a state in which the amount of shift in the horizontal direction when the slider 55 is present at a position P0 (the center position of the position adjustment bar 54, for example) on the position adjustment bar 54 is defined as 0 and if the slider 55 is present rightward relative to the position P0. On the other hand, for example, if the slider 55 is present leftward relative to the position P0, the CPU 30 sets the amount of shift in the horizontal direction as negative. If the amount of shift in the horizontal direction is positive, the left-eye image 51a is positioned on the left side of the screen, as compared to the right-eye image 51b. If the amount of shift in the horizontal direction is negative, the left-eye image 51a is positioned on the right side of the screen, as compared to the right-eye image 51b. Next, the CPU 30 ends the position adjustment process.

On the other hand, the CPU 30 determines in step S14 whether or not the touch position in the immediately preceding frame falls within the display area of the position adjustment bar 54. The touch position in the immediately preceding frame refers to the touch position detected in step S1 in the processing loop immediately before the current processing loop. Specifically, the CPU 30 refers to the immediately preceding touch position data 74 in the main memory 31 to determine whether or not the immediately preceding touch position is present within the display area of the position adjustment bar 54. If the determination result is affirmative, the CPU 30 next executes a process of step S15. On the other hand, if the determination result is negative, the CPU 30 ends the position adjustment process.

In step S15, the CPU 30 determines whether or not the current touch position falls within the range of movement of the position adjustment bar 54. The position adjustment bar 54 can move in the vertical direction (the up-down directions) of the screen within a predetermined range. Therefore, in step S15, it is determined whether or not the current touch position falls within the range of movement. If the determination result is affirmative, the CPU 30 next executes a process of step S16. On the other hand, if the determination result is negative, the CPU 30 ends the position adjustment process.

In step S16, the CPU 30 moves the position adjustment bar 54 to the current touch position. In step S16, the position adjustment bar 54 is moved in the vertical direction (the up-down directions) of the screen. Specifically, the CPU 30 calculates a movement vector indicative of the movement of the position adjustment bar 54 in the vertical (Y-axis) direction of the screen, based on the current touch position indicated by the current touch position data 73. For example, the CPU 30 calculates a point of intersection between the display area of the position adjustment bar 54 and a line segment, which passes through the current touch position and which is parallel to the Y axis, and the CPU 30 calculates, as the movement vector, a vector extending from the calculated point of intersection toward the current touch position. The CPU 30 then adds the calculated movement vector to a position vector indicative of the display position of the position adjustment bar 54, which is indicated by the position adjustment data 75, thereby calculating the position of the position adjustment bar 54. The CPU 30 stores in the main memory 31 the calculated position of the position adjustment bar 54 as the position adjustment data 75. Next, the CPU 30 executes a process of step S17.

In step S17, the CPU 30 sets the amount of shift of the respective positions in the vertical direction. Specifically, the CPU 30 calculates the amount of shift of the left-eye image 51a and the right-eye image 51b in the vertical direction (the up-down (Y-axis) direction of the screen), based on the position calculated in step S16 of the position adjustment bar 54, and stores the obtained amount of shift in the main memory 31. More specifically, the CPU 30 calculates the amount of shift of the respective positions in the vertical direction, according to the coordinate value of the Y axis of the position adjustment bar 54. The amount of shift of the respective positions in the vertical direction is the amount of shift (a difference in Y coordinate values) of the coordinate value of the center of the left-eye image 51a and the coordinate value of the center of the right-eye image 51b relative to the Y axis. For example, the CPU 30 sets the amount of shift in the vertical direction as positive in a state in which the amount of shift in the horizontal direction when the position adjustment bar 54 is present at the predetermined position (the center of the position adjustment bar 54 in the range of movement in the vertical direction, for example) is defined as 0, and if the position adjustment bar 54 is present upward relative to the predetermined position. On the other hand, for example, if the position adjustment bar 54 is present downward relative to the predetermined position, the CPU 30 sets the amount of shift in the vertical direction as negative. If the amount of shift in the vertical direction is positive, the left-eye image 51a is positioned on the upper side of the screen, as compared to the right-eye image 51b. If the amount of shift in the vertical direction is negative, the left-eye image 51a is positioned on the lower side of the screen, as compared to the right-eye image 51b. Next, the CPU 30 ends the position adjustment process.

Returning to FIG. 14, the CPU 30 next executes a process of step S3 after the process of step S2.

Figure 16:
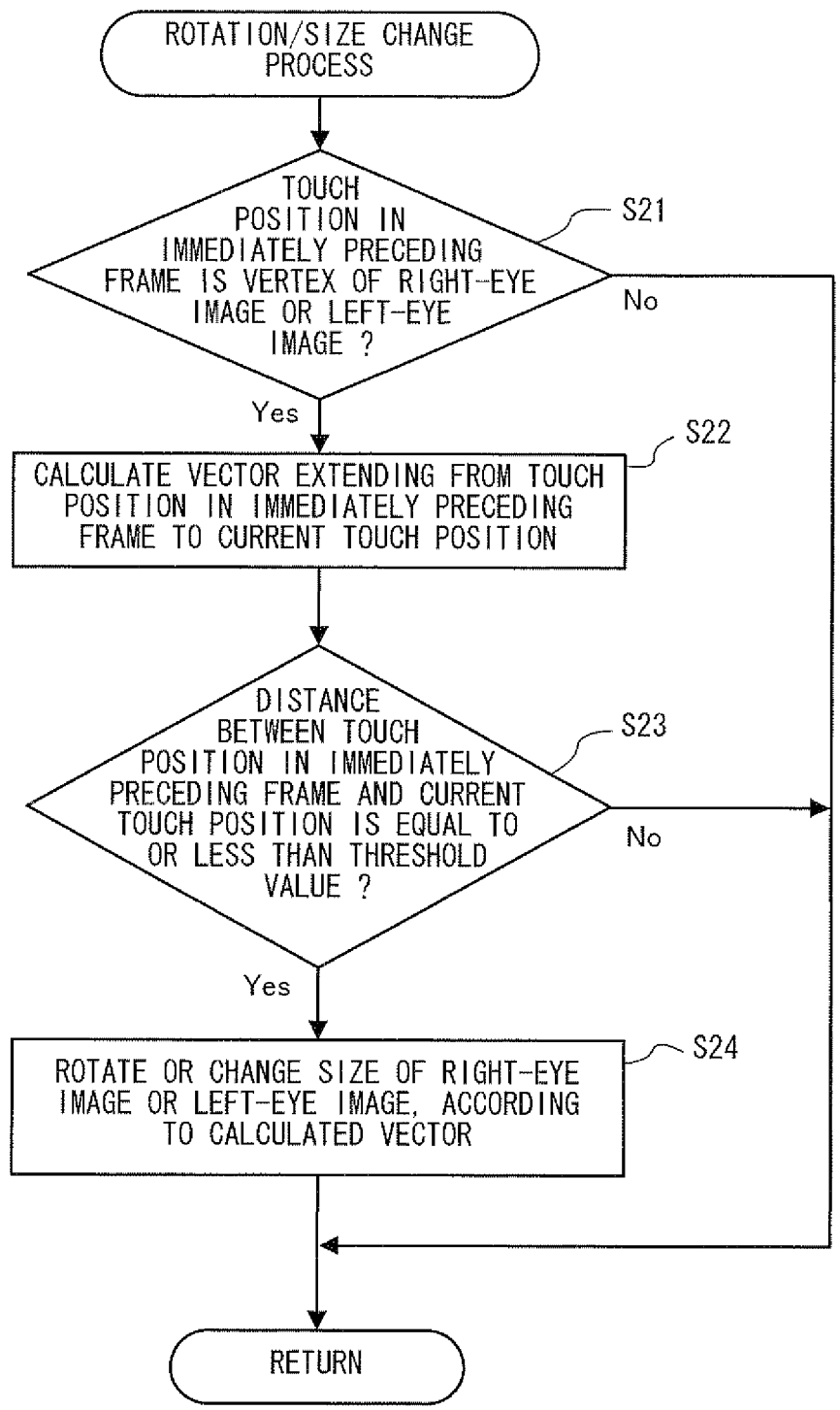
FIG. 16 is a flowchart illustrating in detail a rotation/size change process (step S3)

In step S3, the CPU 30 executes a rotation/size change process. In step S3, the CPU 30 rotates or changes the size of the left-eye image 51a or the right-eye image 51b, based on the touch position detected in step S1. The rotation/size change process in step S3 will be described in detail, with reference to FIG. 16. FIG. 16 is a flowchart showing in detail the rotation/size change process (step S3).

In step S21, the CPU 30 determines whether or not the touch position in the immediately preceding frame is a vertex of the left-eye image 51a or the right-eye image 51b. Specifically, the CPU 30 refers to the immediately preceding touch position data 74 to determine whether or not the immediately preceding touch position falls within a predetermined area in which the vertex of the left-eye image 51a or the right-eye image 51b is included. If the determination result is affirmative, the CPU 30 next executes a process of step S22. On the other hand, if the determination result is negative, the CPU 30 ends the rotation/size change process.

In step S22, the CPU 30 calculates a vector extending from the touch position in the immediately preceding frame to the current touch position. Specifically, the CPU 30 refers to the current touch position data 73 and the immediately preceding touch position data 74 to calculate a vector in which the immediately preceding touch position is a start point of the vector and the current touch position is an end point of the vector. The CPU 30 stores the calculated vector in the main memory 31. Next, the CPU 30 executes a process of step S23.

In step S23, the CPU 30 determines whether or not a distance between the touch position in the immediately preceding frame and the current touch position is equal to or less than a threshold value. An amount of rotation or change in size of the image (the left-eye image 51a or the right-eye image 51b) selected by the immediately preceding touch position is restricted by the process of step S23. Specifically, the CPU 30 determines whether or not the magnitude of vector calculated in step S22 is equal to or less than a predetermined threshold value. If the determination result is affirmative, the CPU 30 next executes a process of step S24. On the other hand, if the determination result is negative, the CPU 30 ends the rotation/size change process.

In step S24, the CPU 30 rotates or changes the size of the right-eye image or the left-eye image, according to the calculated vector. Specifically, the CPU 30 rotates or changes the size of the image selected by the immediately preceding touch position, based on the direction and the magnitude of vector calculated in step S22. For example, if the calculated direction of vector is a diagonal direction of the selected image (if equal to or less than the predetermined angle), the CPU 30 enlarges the selected image, according to the magnitude of vector. Here, the diagonal direction indicates a direction extending from the center of the selected image toward the vertex designated by the immediately preceding touch position. For example, if the calculated direction of vector is opposite to the above-described diagonal direction, the CPU 30 reduces the selected image. Also, for example, if the calculated direction of vector is perpendicular to the above-described diagonal direction, (if within the range of the predetermined angle) the CPU 30 rotates the selected image about the center of the selected image, according to the magnitude of vector. Next, the CPU 30 ends the rotation/size change process.

Returning to FIG. 14, the CPU 30 next executes a process of step S4 after the process of step S3.

Figure 17:
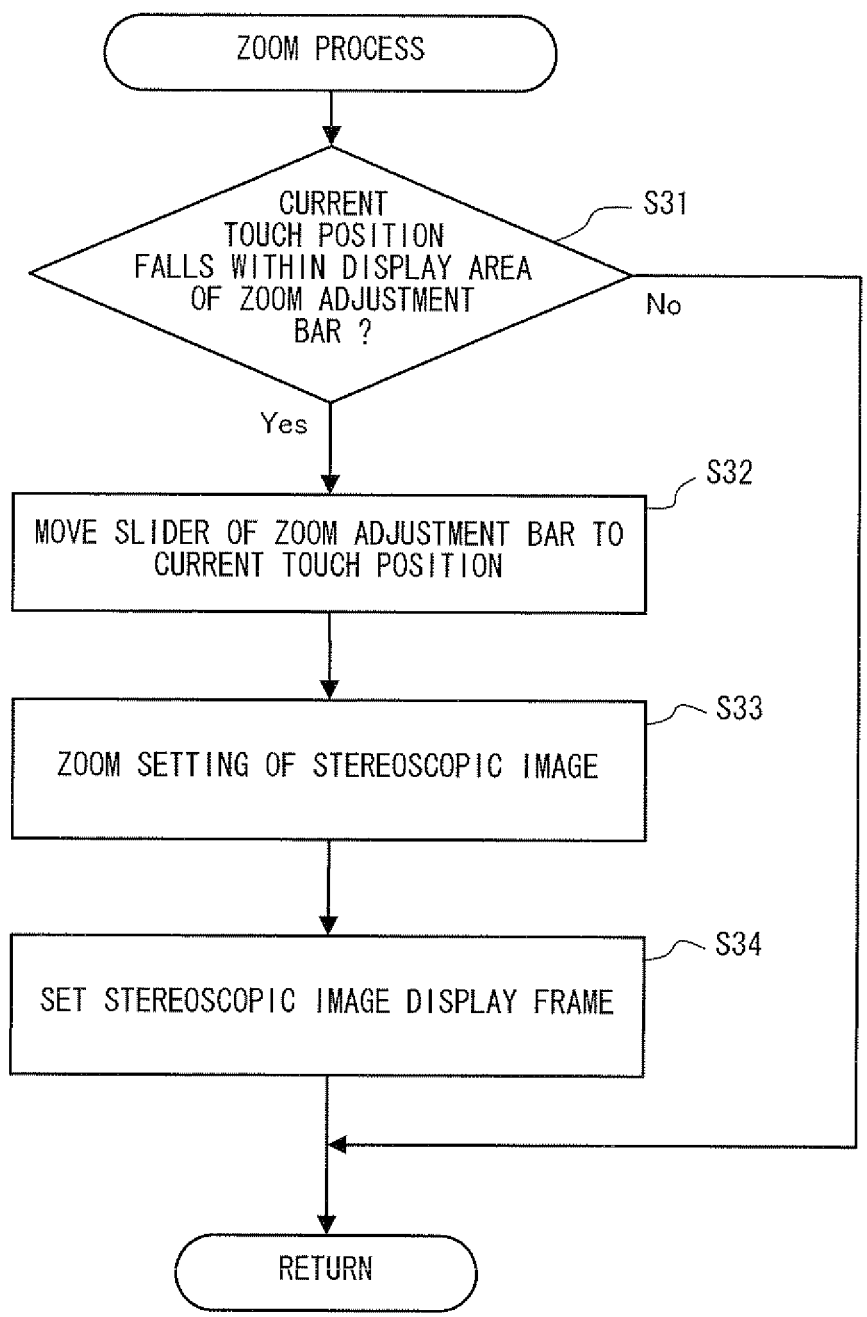
FIG. 17 is a flowchart illustrating in detail a zoom process (step S4)

In step S4, the CPU 30 executes a zoom process. In step S4, the CPU 30 zooms (enlarges or reduces) the stereoscopic image 61 displayed on the stereoscopic image display device 11, based on the touch position detected in step S1. The zoom process in step S4 will be described in detail, with reference to FIG. 17. FIG. 17 is a flowchart showing in detail the zoom process (step S4).

In step S31, the CPU 30 determines whether or not the current touch position falls within the display area of the zoom adjustment bar 56. Specifically, the CPU 30 refers to the current touch position data 73 of the main memory 31 to determine whether or not the current touch position is present within the display area (an area in which the zoom adjustment bar 56 is displayed on the screen of the planar image display device 12) of the zoom adjustment bar 56. If the determination result is affirmative, the CPU 30 next executes a process of step S32. On the other hand, if the determination result is negative, the CPU 30 ends the zoom process.

In step S32, the CPU 30 moves the slider 57 of the zoom adjustment bar 56 to the current touch position. In step S32, the slider 57 of the zoom adjustment bar 56 is moved on the zoom adjustment bar 56 in the horizontal direction. Specifically, the CPU 30 calculates a position on the zoom adjustment bar 56, which corresponds to the current touch position, and stores the calculated position in the zoom adjustment data 76 of the main memory 31. Next, the CPU 30 executes a process of step S33.

In step S33, the CPU 30 makes a zoom setting of the stereoscopic image 61. The process of step S33 is a setting process for performing zoom of the stereoscopic image 61, which is displayed on the stereoscopic image display device 11 in step S6 described below. Specifically, the CPU 30 determines a level of enlargement or reduction of both the left-eye image 51a and the right-eye image 51b, according to the position of the slider 57 of the zoom adjustment bar 56, and stores the determined level in the main memory 31. Next, the CPU 30 executes a process of step S34.

In step S34, the CPU 30 sets the stereoscopic image display frame 59. Specifically, the CPU 30 calculates an area of the stereoscopic image 61, which is displayed on the stereoscopic image display device 11, based on the zoom setting of the stereoscopic image 61 in step S33. That is, the CPU 30 calculates the position and size of the stereoscopic image display frame 59, and stores the obtained data in the main memory 31 as the stereoscopic image display frame data 77. The stereoscopic image display frame 59 is a frame which is displayed in the image display region 50 of the planar image display device 12, and indicative of the areas of the left-eye image 51a and the right-eye image 51b, which correspond to the area of the stereoscopic image 61 displayed on the stereoscopic image display device 11. When the stereoscopic image 61 is enlarged by zooming in, there is a case where merely respective positions of the left-eye image 51a and the right-eye image 51b are displayed on the stereoscopic image display device 11. Even if the stereoscopic image 61 is enlarged by zooming in, if the entirety of the left-eye image 51a and the entirety of the right-eye image 51b are displayed on the stereoscopic image display device 11, the stereoscopic image display frame 59 is not displayed. Next, the CPU 30 ends the zoom process.

Returning to FIG. 14, the CPU 30 next executes a process of step S5 after the process of step S4.

Figure 18:
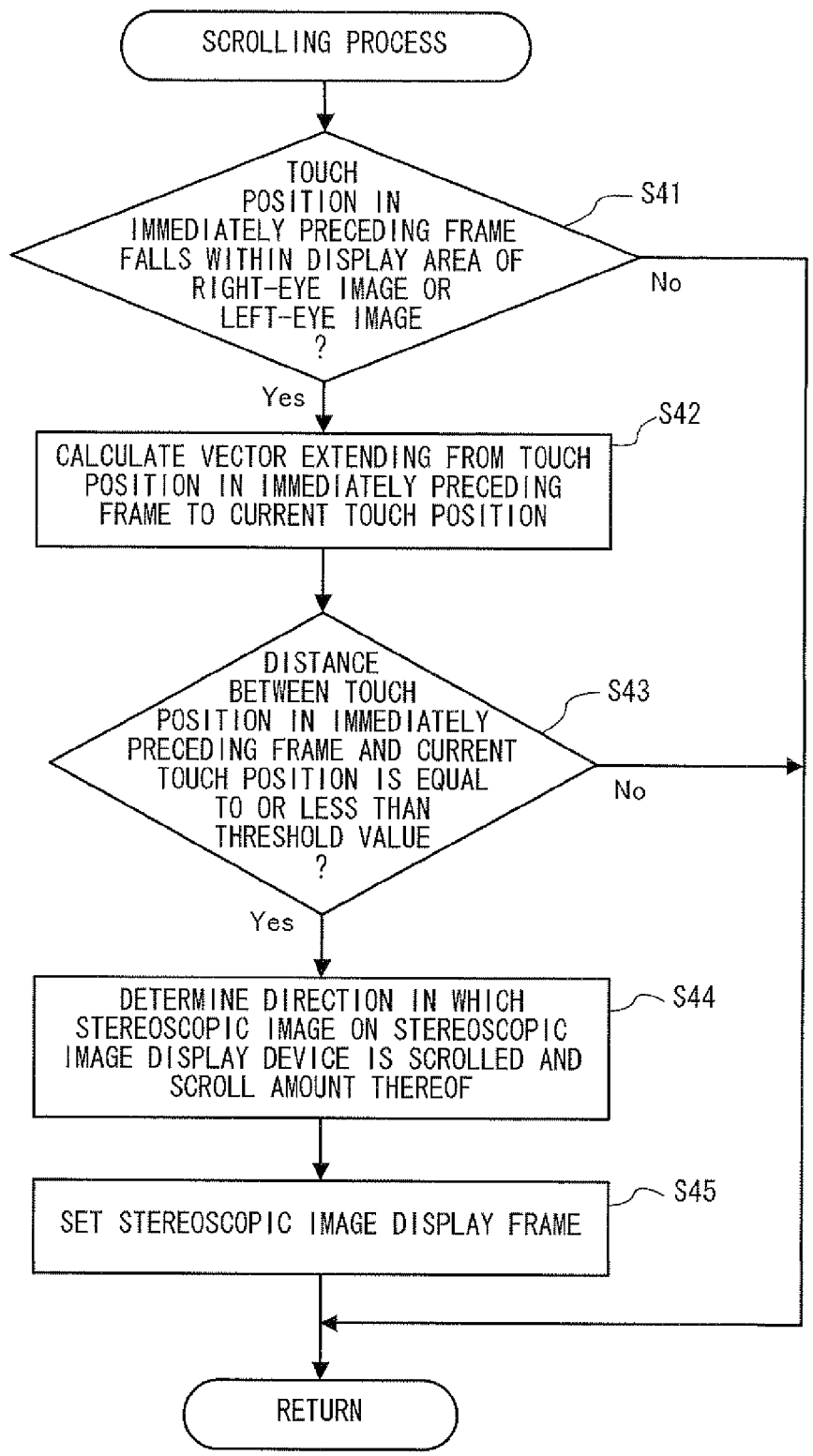
FIG. 18 is a flowchart illustrating in detail a scrolling process (step S5)

In step S5, the CPU 30 executes a scrolling process. In step S5, the CPU 30 scrolls the stereoscopic image 61 displayed on the stereoscopic image display device 11, based on the touch position detected in step S1. The scrolling process in step S5 will be described in detail, with reference to FIG. 18. FIG. 18 is a flowchart showing in detail the scrolling process (step S5).

In step S41, the CPU 30 determines whether or not the touch position in the immediately preceding frame falls within the display area of the left-eye image 51a or the right-eye image 51b. Specifically, the CPU 30 refers to the immediately preceding touch position data 74 to determine whether or not the immediately preceding touch position falls within the display area of the left-eye image 51a or the right-eye image 51b. If the determination result is affirmative, the CPU 30 next executes a process of step S42. On the other hand, if the determination result is negative, the CPU 30 ends the scrolling process.

In step S42, the CPU 30 calculates a vector extending from the touch position in the immediately preceding frame to the current touch position. Specifically, the CPU 30 refers to the current touch position data 73 and the immediately preceding touch position data 74 to calculate a vector in which the immediately preceding touch position is the start point of the vector and the current touch position is the end point of the vector. The CPU 30 stores the obtained vector in the main memory 31. Next, the CPU 30 executes a process of step S43.

In step S43, the CPU 30 determines whether or not the distance between the touch position in the immediately preceding frame and the current touch position is equal to or less than the threshold value. An amount of scrolling of the stereoscopic image 61 is restricted by the process of step S43. Specifically, the CPU 30 determines whether or not the magnitude of vector calculated in step S42 is equal to or less than the predetermined threshold value. If the determination result is affirmative, the CPU 30 next executes a process of step S44. On the other hand, if the determination result is negative, the CPU 30 ends the scrolling process.

In step S44, the CPU 30 sets a direction in which the stereoscopic image 61 displayed on the stereoscopic image display device 11 is scrolled and a scroll amount thereof. Specifically, the CPU 30 determines a direction opposite to the direction of the vector calculated in step S42, and stores the determined direction in the main memory 31 as the direction in which the stereoscopic image 61 is scrolled. Therefore, the object image included in the stereoscopic image 61 moves in the direction in which the user moves the stick 16. Also, the CPU 30 determines the scroll amount, according to the magnitude of vector which is calculated in step S42, and stores the determined scroll amount in the main memory 31. Next, the CPU 30 executes a process of step S45.

In step S45, the CPU 30 sets the stereoscopic image display frame 59. The process of step S45 is the same as that of step S34 described above. Specifically, the CPU 30 calculates the area of the stereoscopic image 61 displayed on the stereoscopic image display device 11, based on the scroll setting of the stereoscopic image 61 in step S44. That is, the CPU 30 calculates the position of the stereoscopic image display frame 59, and stores the calculated position in the main memory 31 as the stereoscopic image display frame data 77. Next, the CPU 30 ends the scrolling process.

Returning to FIG. 14, the CPU 30 next executes a process of step S6 after the process of step S5.

In step S6, the CPU 30 displays the stereoscopic image 61 on the stereoscopic image display device 11. In step S6, the left-eye image 51a and the right-eye image 51b, which have been adjusted in steps S2 to S5, are displayed on the stereoscopic image display device 11, thereby displaying the stereoscopic image 61. Specifically, the CPU 30 shifts the respective positions of the left-eye image 51a and the right-eye image 51b by the amounts of shift, which has been set by the process of step S2, in the horizontal direction and the vertical direction, and synthesizes the left-eye image 51a and the right-eye image 51b. Also, the CPU 30 synthesizes the left-eye image 51a and the right-eye image 51b by using the image (the left-eye image 51a or the right-eye image 51b), which has been rotated or changed in size in step S3. More specifically, the CPU 30 divides each of the two images, which have been adjusted in step S2 or S3, into rectangle-shaped images each having one line of pixels aligned in the vertical direction, and alternately aligns the rectangle-shaped images of the two images, thereby synthesizing the two images. Furthermore, the CPU 30 sets the display area, based on the zoom setting set by the zoom process in step S4, or the scroll setting set by the scrolling process in step S5. For example, if the zoom setting has been made in step S4, the CPU 30 sets the display area, according to the determined level of enlargement or reduction, and enlarges or reduces (digital zoom) the areas of the left-eye image 51a and the right-eye image 51b, which correspond to the display area. Moreover, for example, if the scroll setting has been made in step S5, the CPU 30 sets the display area, based on the scrolling direction and the scroll amount. Merely a superimposed area when the left-eye image 51a and the right-eye image 51b adjusted in steps S2 to S5 are superimposed one on the other is set as the display area. The CPU 30 then displays on the stereoscopic image display device 11 the display area of the synthesized image, thereby displaying the stereoscopic image. Next, the CPU 30 executes a process of step S7.

In step S7, the CPU 30 displays the left-eye image 51a and the right-eye image 51b on the planar image display device 12. In step S7, the left-eye image 51a and the right-eye image 51b adjusted in steps S2 to S5 are displayed on the planar image display device 12. Specifically, the CPU 30 shifts the position of the left-eye image 51a and the position of the right-eye image 51b in the horizontal and vertical directions by the respective amounts of shift set by the process in step S2, makes the two images semi-transparent and superimposes one on the other. The CPU 30 then displays a resulting superimposed image in the image display region 50 of the planar image display device 12. Furthermore, the CPU 30 makes the left-eye image 51a and the right-eye image 51b semi-transparent and superimposes one on the other by using the image (the left-eye image 51a or the right-eye image 51b) rotated or changed in size in step S3. The CPU 30 then displays a resulting superimposed image on the planar image display device 12. Here, the image display region 50 of the planar image display device 12 is small as compared to the screen of the stereoscopic image display device 11. Therefore, the CPU 30 reduces the left-eye image 51a and the right-eye image 51b, according to the ratio of size of the image display region 50 to the size of the screen of the stereoscopic image display device 11, and displays the left-eye image 51a and the right-eye image 51b on the planar image display device 12. Furthermore, the CPU 30 displays on the planar image display device 12 the stereoscopic image display frame 59 set by the zoom process (S34) in step S4 or the scrolling process (S45) in step S5. As described above, although the stereoscopic image 61 displayed on the stereoscopic image display device 11 is zoomed or scrolled, the images displayed on the planar image display device 12 are not zoomed or scrolled. That is, the entirety of the left-eye image 51a and the entirety of the right-eye image 51b are displayed on the planar image display device 12 even when the entirety of the stereoscopic image 61 is not displayed on the stereoscopic image display device 11 because the stereoscopic image 61 is zoomed or scrolled. This allows the user to adjust the images, while verifying the entirety of the left-eye image 51a and the entirety of the right-eye image 51b, even when the stereoscopic image 61 is zoomed or scrolled. Next, the CPU 30 executes a process step S8.

In step S8, the CPU 30 determines whether or not the adjustment is ended. The CPU 30 determines, for example, whether or not a predetermined operation has been performed by the user (whether or not any button provided on the lower housing 13b (not shown) has been pressed, for example). If the determination result is negative, the CPU 30 next executes a process of step S1. If the determination result is affirmative, the CPU 30 ends the process shown in FIG. 14. This is the end of the image display control process according to the present embodiment.

The content and the order of the above-described processes are merely illustrative. That is, the position adjustment process, the rotation/size change process, and the like are merely specific examples, and the relative positions, relative sizes, and relative rotations of the left-eye image 51a and the right-eye image 51b may be adjusted in any manner. Also, the above-described processes may be in any order.

As described above, by adjusting the positions, sizes or rotations of the left-eye image 51a and the right-eye image 51b, the user can adjust the appearance of the stereoscopic image 61.

For example, Japanese Laid-Open Patent Publication No. 2003-264851 discloses an apparatus which adjusts a stereoscopic effect of a displayed image by adjusting respective positions, sizes, and rotations of right-eye and left-eye images on a display screen, which are taken. Specifically, in the apparatus disclosed in the document, the right-eye image and the left-eye image are superimposed one on the other to be displayed on one screen, and the user adjusts the respective positions and rotations of the two images displayed on the one screen. After the adjustment of the two images, the user displays the two images as a stereoscopic image and verifies the stereoscopic effect of the image. The apparatus disclosed in the document, however, does not allow the user to adjust the respective positions and rotations of the right-eye and left-eye images while the images are being stereoscopically displayed on the screen. That is, in the apparatus disclosed in the document, the user adjusts the respective positions, and the like, of the two images superimposed one on the other in a planar manner and displayed on the screen, and thereafter displays the two images stereoscopically to verify the stereoscopic effect of a resulting image. Thus, the user cannot verify the stereoscopic effect of the stereoscopically displayed image during the adjustment of the superimposed two images. On the other hand, in the state in which the images are stereoscopically displayed on the screen, the user needs to make adjustment of the two superimposed images in a situation in which the stereoscopic display is poorly visible and additionally, it is difficult for the user to view the two images individually. Therefore, it is difficult to make adjustments while the images are being displayed stereoscopically on the screen.

However, in the present embodiment, The user can adjust the positions, sizes or rotations of the left-eye image 51a and the right-eye image 51b on the screen of the planar image display device 12, while seeing the stereoscopic image 61 displayed on the stereoscopic image display device 11. Therefore, the user can easily adjust the appearance of the stereoscopic image 61.

The left-eye image 51a and the right-eye image 51b taken by another device may be loaded to the image display apparatus 10 via the stored data memory 34. Also, the left-eye image 51a and the right-eye image 51b taken by another device may be provided to the image display apparatus 10 via the communication module 35.

Also, information indicative of the amounts of adjustment in the positions, sizes, and rotations by which the left-eye image 51a and the right-eye image 51b are adjusted in step S2 and S3 may be stored in the stored data memory 34, together with the image data of the left-eye image 51a and the right-eye image 51b, respectively. The information may be stored as part of the image data of each of the left-eye image 51a and the right-eye image 51b. The stored data memory 34 may be connected to another apparatus different from the image display apparatus 10, and the stereoscopic image, which is adjusted by using the image data stored in the stored data memory 34 and the information indicative of the amounts of adjustment, may be displayed on a screen of the another apparatus.

Further, in the above embodiment, even when the stereoscopic image is zoomed or scrolled, the planar image (including the left-eye image 51a and the right-eye image 51b) displayed on the planar image display device 12 are not zoomed or scrolled. In another embodiment, when the stereoscopic image is zoomed or scrolled, the planar image displayed on the planar image display device 12 may also be zoomed or scrolled. That is, in another embodiment, by performing scrolling or zooming of the stereoscopic image, respective portions of the left-eye image 51a and the right-eye image 51b displayed on the planar image display device 12 may be displayed on the planar image display device 12 (the entirety of the left-eye image 51a and the entirety of the right-eye image 51b may not be displayed).

Figure 19:
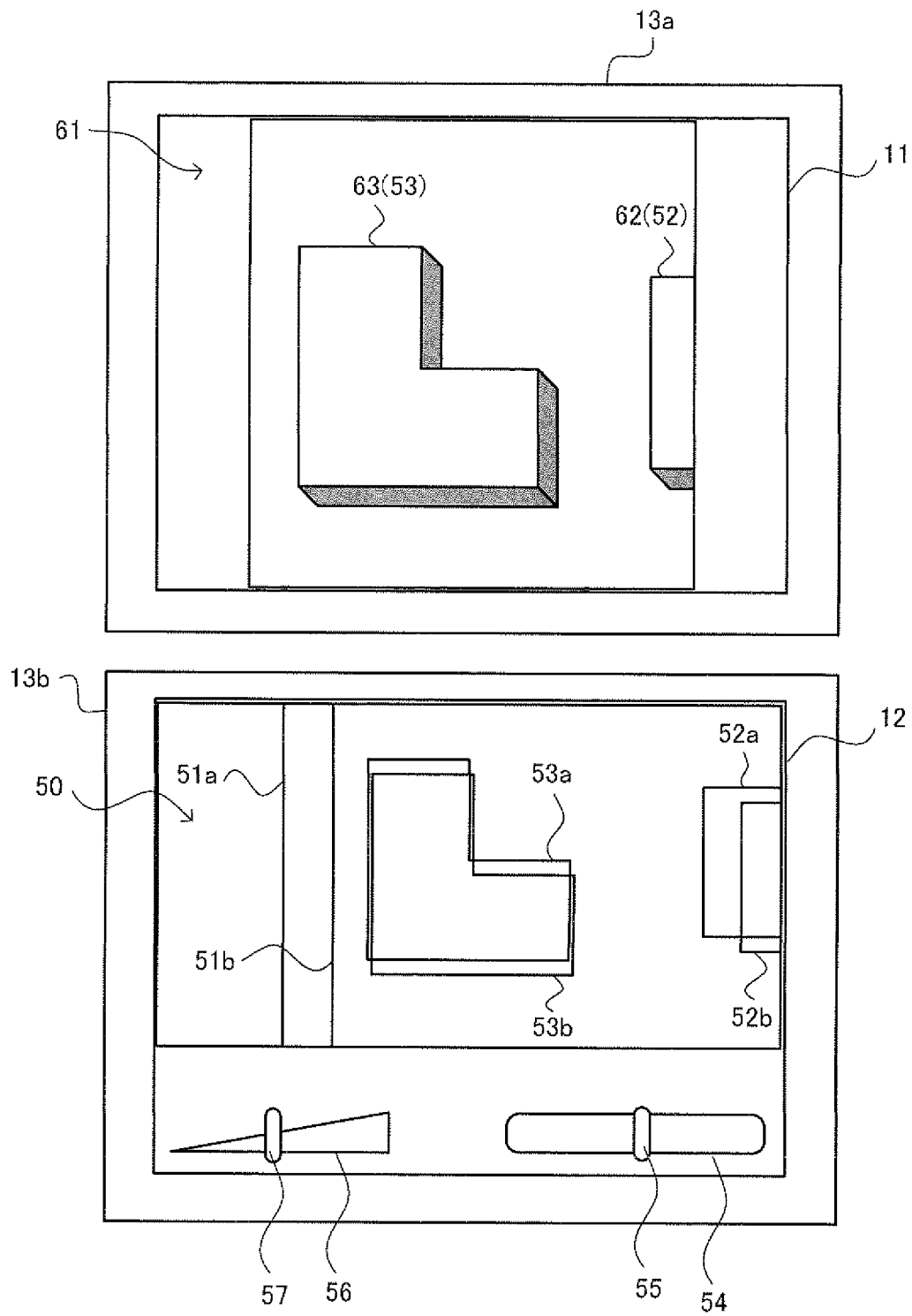
FIG. 19 is a diagram illustrating a state in which the left-eye image 51a and the right-eye image 51b displayed on the planar image display device 12 are zoomed or scrolled in response to performing zooming or scrolling of the stereoscopic image 61.

Specifically, as shown in FIG. 19, by performing scrolling or zooming of the stereoscopic image 61, the left-eye image 51a and the right-eye image 51b displayed on the planar image display device 12 may also be zoomed or scrolled. FIG. 19 is a diagram illustrating a state in which the left-eye image 51a and the right-eye image 51b displayed on the planar image display device 12 are zoomed or scrolled in response to performing zooming or scrolling of the stereoscopic image 61. In FIG. 19, by performing zooming or scrolling of the stereoscopic image 61, portions of the left-eye image 51a and the right-eye image 51b are made semi-transparent, superimposed one on the other, and displayed on the planar image display device 12. Specifically, in FIG. 19, a portion where the left-eye image 51a and the right-eye image 51b are superimposed one on the other and a portion where the left-eye image 51a and the right-eye image 51b are not superimposed one on the other are displayed on the screen of the planar image display device 12. Also, a stereoscopic image, which corresponds to the portion where the left-eye image 51a and the right-eye image 51b are superimposed one on the other, is displayed on the screen of the stereoscopic image display device 11. As shown in FIG. 19, the left-eye image 51a and the right-eye image 51b displayed on the planar image display device 12 are enlarged by the same ratio as the magnification ratio of the stereoscopic image 61. Since the screen of the stereoscopic image display device 11 is large as compared to the image display region 50 of the planar image display device 12, the object image 63 is displayed larger than the object images 53a and 53b. The left-eye image 51a and the right-eye image 51b displayed on the planar image display device 12 are scrolled in response to performing scrolling of the stereoscopic image 61. That is, the images displayed on the planar image display device 12 are the same as the image displayed on the stereoscopic image display device 11. As described above, similar to the stereoscopic image displayed on the stereoscopic image display device 11, the planar image displayed on the planar image display device 12 is also zoomed and/or scrolled, and thereby it is easy for the user to understand the correspondence between the stereoscopic image and the planar image.

Further, in the above embodiment, the image, in which the left-eye image 51a and the right-eye image 51b are made semi-transparent and superimposed one on the other, is displayed on the planar image display device 12. In another embodiment, the images may be displayed in any manner if the amounts of shift (amounts of shift in positions, sizes and rotations) of the left-eye image 51a and the right-eye image 51b are recognizable to the user. For example, the contours of the two images may be highlighted so as to be recognizable to the user, and the two images may be superimposed one on the other without being made semi-transparent. That is, one image may be displayed over another image so that the one image hides a portion of the other image.

Any operation, not limited to the above-described operation, may be performed to adjust the positions, sizes, or rotations of the left-eye image 51a and/or the right-eye image 51b. For example, a button (cross button or the like) may be provided on the lower housing 13b, and the positions of the left-eye image 51a and/or the right-eye image 51b may be adjusted by using the button. Specifically, for example, in the case where is the image to be moved is selected by using the stick 16, and if a right-direction button of the cross button is pressed, the selected image may be moved in the rightward direction, and if a left-direction button is pressed, the selected image may be moved in the leftward direction. Furthermore, for example, in the case where the image to be rotated is selected by using the stick 16, and if the right-direction button of the cross button is pressed, the selected image may be rotated in the clockwise direction, and if the left-direction button is pressed, the selected image may be rotated in the anticlockwise direction. Further, for example, in the case where the image to be enlarged or reduced is selected by using the stick 16, and if an up-direction button of the cross button is pressed, the selected image may be enlarged, and if a down-direction button is pressed, the selected image may be reduced.

Further, while the display configured to display a stereoscopic image which can be viewed by the naked eye is employed in the present embodiment, the present invention is applicable to achieving the stereoscopic vision which requires glasses having the time division scheme or the deflecting scheme, the anaglyphic format (the red-blue glasses format), or the like.

Second Embodiment

Next, a second embodiment will be described. In the second embodiment, the image display apparatus 10 described above also operates as a game apparatus. On a lower housing 13b of the image display apparatus 10 according to the second embodiment, a plurality of operation buttons (a cross button and other buttons), which are operated by a user, are provided.

The image display apparatus 10 according to the second embodiment operates in a first mode and a second mode. In the first mode, as described in the first embodiment, images which are taken by using a left-eye image imaging section 18a and a right-eye image imaging section 18b are used, and a stereoscopic image is displayed on the stereoscopic image display device 11. In the second mode, images taken by a virtual stereo camera are used, and a stereoscopic image is displayed, in real time, on a stereoscopic image display device 11. In the second mode, the images taken, of a virtual space, by the virtual stereo camera (a left-eye virtual camera and a right-eye virtual camera) are displayed on the stereoscopic image display device 11. In the second mode, the virtual stereo camera takes images of a three-dimensional virtual space, and thereby a left-eye image and a right-eye image, which has a predetermined parallax therebetween, are generated. The image display apparatus 10 synthesizes the left-eye image and the right-eye image in which the virtual space is taken in real time, thereby displays, in real time, the stereoscopic image on the stereoscopic image display device 11.

In the second mode, for example, a role-playing game is assumed, in which a story advances such that a player character operated by the user explores the three-dimensional virtual space. In the role-playing game, various game scenes (for example, a scene in which the player character explores a cave, or a scene in which the player character explores a forest) are prepared. For the virtual stereo camera, settings (such as a zoom setting, setting of a focus position, a setting of a distance between the left-eye virtual camera and the right-eye virtual camera) are previously made depending on the various game scenes. For example, for the scene in which the player character explores the cave, the distance between the left-eye virtual camera and the right-eye virtual camera is previously set to a first distance, and for the scene in which the player character explores the forest, the distance between the left-eye virtual camera and the right-eye virtual camera is previously set to a second distance.

The distance of the two virtual cameras (the left-eye virtual camera and the right-eye virtual camera) influences the appearance of various three-dimensional objects (a rock object, a tree object, and the like, for example), which are present in the three-dimensional virtual space, in the depth direction. For example, in the case where the distance between the two virtual cameras is relatively long, and if an image of the three-dimensional object is taken, the stereoscopic image, which has the three-dimensional object being longer in the depth direction, is displayed. The distance between the two virtual cameras is previously determined by a game architect, according to each scene of the game.

Here, in the second embodiment, the distance between the two virtual cameras is adjusted according to a position of a hardware slider 14 (see FIG. 1) of the image display apparatus 10. That is, the user of the image display apparatus 10 can adjust, by using the hardware slider 14, the distance between the two virtual cameras to make the stereoscopic image easy to see for the user. Specifically, for example, if the hardware slider 14 is positioned at the center of a range of movement thereof, the distance between the two virtual cameras is set to a predetermined value (a default value). Also, for example, if the hardware slider 14 is positioned at the right end of the range of movement thereof, the distance between the two virtual cameras is set to 125% of the default value. Furthermore, for example, if the hardware slider 14 is positioned at the left end of the range of movement thereof, the distance between the two virtual cameras is set to 75% of the default value.

As described above, in the second embodiment, the user can adjust the distance between the two virtual cameras by using the hardware slider 14. This allows the user to adjust the appearance of the stereoscopic image.

In the first mode, since the distance between the left-eye image imaging section 18a and the right-eye image imaging section 18b cannot be adjusted, the hardware slider 14 is used as a switch to switch between whether or not to display the stereoscopic image on the stereoscopic image display device 11. In the first mode, for example, if the hardware slider 14 is positioned at the right end, the stereoscopic image is displayed on the stereoscopic image display device 11, and if the hardware slider 14 positioned at the left end, the stereoscopic image is not displayed on the stereoscopic image display device 11. When the stereoscopic image is not displayed on the stereoscopic image display device 11, image may not be displayed on the stereoscopic image display device 11, or a planar image may be displayed.

Figure 20:
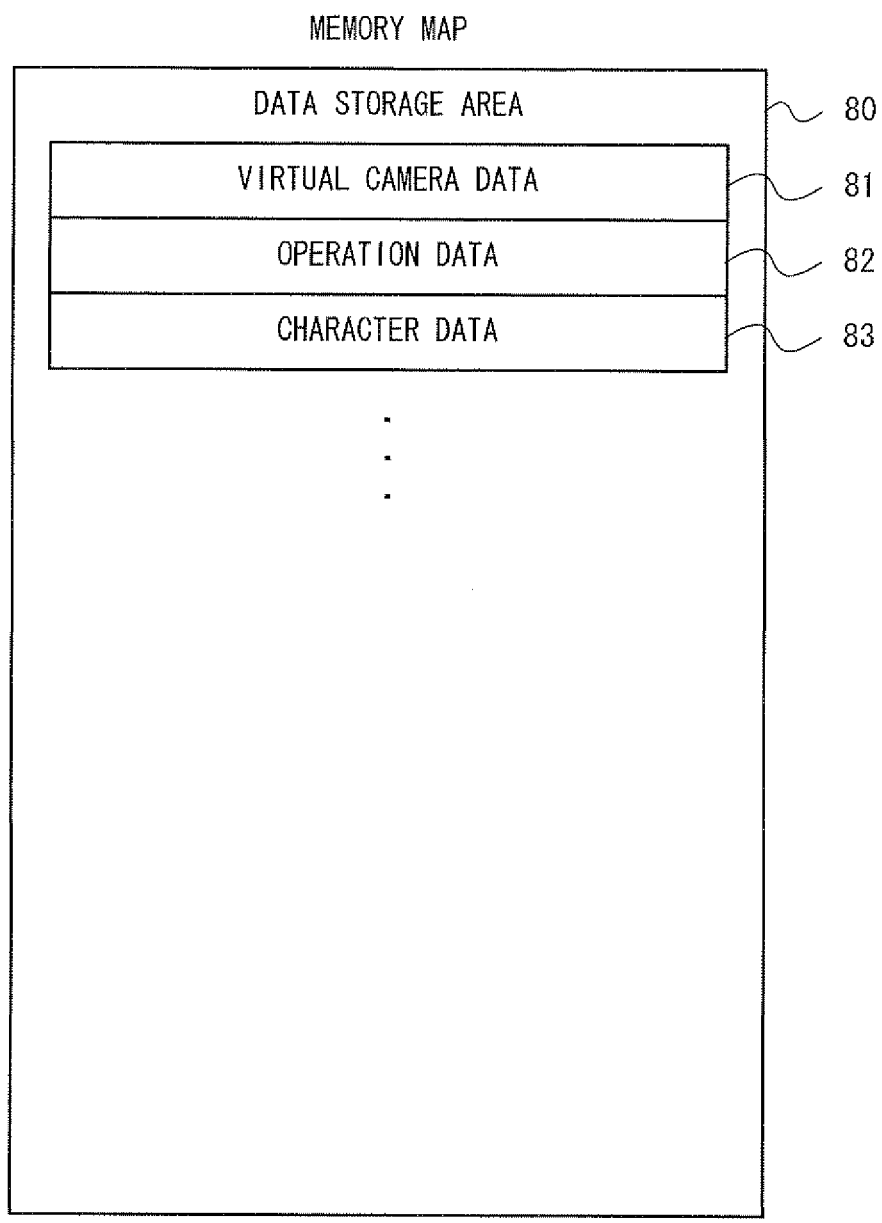
FIG. 20 is a diagram illustrating a memory map of a main memory 31 of an image display apparatus 10 according to a second embodiment.

Next, a process performed in the image display apparatus 10 according to the second embodiment will be described in detail. Initially, main data stored in a main memory 31 during the process will be described. FIG. 20 is a diagram illustrating a memory map of the main memory 31 of the image display apparatus 10 according to the second embodiment. As shown in FIG. 20, a data storage area 80 is provided in the main memory 31. In the data storage area 80, virtual camera data 81, operation data 82, character data 83, and the like, are stored. Other data stored in the main memory 31 are a program for executing the above-described process, image data of the various objects appear in the game, and the like.

The virtual camera data 81 is data regarding setting of the virtual stereo camera present in a game space. The setting of the virtual stereo camera includes the distance between the left-eye virtual camera and the right-eye virtual camera, which are components of the virtual stereo camera, the zoom setting of the virtual stereo camera, positions of respective points of views of the virtual stereo camera, and the like.

The operation data 82 is data indicative of inputs to the plurality of operation buttons (not shown). When each operation button is pressed by the user, data which indicates that the operation button has been pressed is stored in the main memory 31.

The character data 83 is data regarding the player character which is operated by the user and which is present in the game space, and includes the position of the player character in the game space and the character information of the player character.

Figure 21:
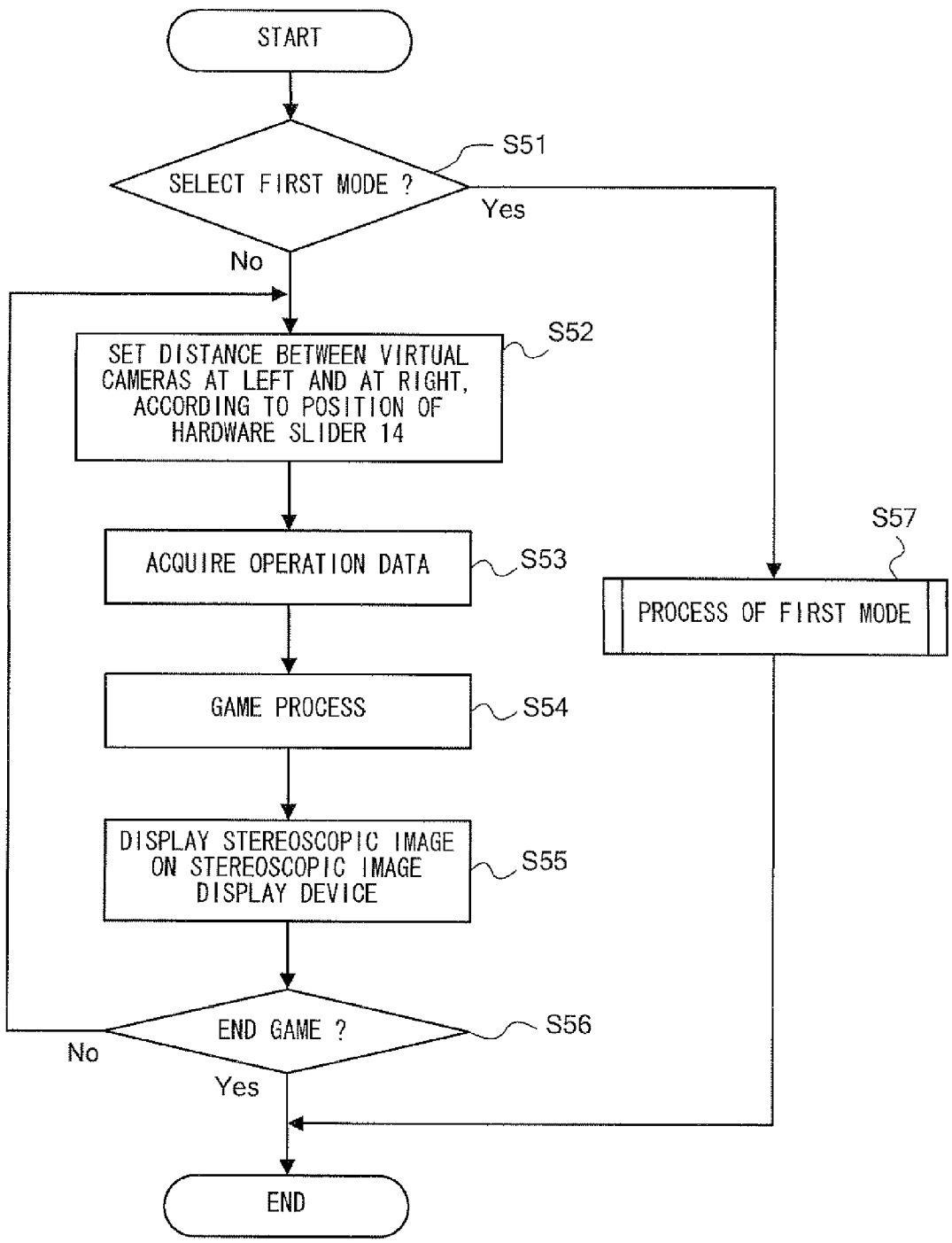
FIG. 21 is a main flowchart illustrating in detail a process according to the second embodiment.

Next, the process according to the second embodiment will be described in detail, with reference to FIG. 21. FIG. 21 is a main flowchart showing in detail the process according to the second embodiment. When the image display apparatus 10 is powered on, a CPU 30 of the image display apparatus 10 executes a boot program stored in a ROM 32 to initialize each unit, such as the main memory 31. Next, the program stored in the ROM 32 is loaded into the main memory 31, and the CPU 30 starts executing the program. The program may be stored in the stored data memory 34, or provided to the image display apparatus 10 via the communication module 35. The flowchart shown in FIG. 21 shows a process performed after the process is completed. In FIG. 21, the description of processes, which do not directly relate to the particular aspect of the exemplary embodiment, is omitted. A processing loop of step S52 through step S56 shown in FIG. 21 is repeatedly executed for each frame (for example, 1/30 second, which is referred to as frame time).

Initially, in step S51, the CPU 30 determines whether or not the first mode has been selected. Specifically, the CPU 30 displays a screen, which allows the user to select the first mode or the second mode, on the planar image display device 12 and detects an input from the user. If the first mode has been selected by the user, the CPU 30 next executes a process of step S57. On the other hand, if the second mode has been selected by the user, the CPU 30 next executes a process of step S52.

In step S52, the CPU 30 sets the distance between the left-eye virtual camera and the right-eye virtual camera, according to the position of the hardware slider 14. Specifically, the CPU 30 detects the position of the hardware slider 14 to calculate the distance between the two virtual cameras, and stores the obtained data in the main memory 31 as the virtual camera data 81. The CPU 30 next executes a process of step S53.

In step S53, the CPU 30 acquires the operation data. Specifically, the CPU 30 refers to the main memory 31 to acquire the operation data regarding the plurality of operation buttons. The CPU 30 next executes a process of step S54.

In step S54, the CPU 30 executes a game process. Specifically, the CPU 30 updates the position of the player character in the game space, causes the player character to perform a predetermined movement, and the like, based on the operation data acquired in step S53. Further, the CPU 30 causes objects, other than the player character, which are present in the game space, to perform the predetermined movement. Furthermore, the CPU 30 updates the positions of the respective points of views of the virtual stereo camera, updates the zoom setting, and the like. The CPU 30 next executes a process of step S55.

In step S55, the CPU 30 displays the stereoscopic image on the stereoscopic image display device 11. Specifically, the CPU 30 takes images of the game space by the virtual stereo camera to acquire the left-eye image and the right-eye image. The CPU 30 then synthesizes the left-eye image and the right-eye image to generate stereoscopic image data, and displays the stereoscopic image on the stereoscopic image display device 11. The CPU 30 next executes a process of step S56.

In step S56, the CPU 30 determines whether or not the game is ended. For example, the CPU 30 determines whether or not a button (one of the plurality of operation buttons), which indicates that the game is ended, has been pressed by the user. If the determination result is negative, the CPU 30 executes again the process of step S52. If the determination result is affirmative, the CPU 30 ends the process shown in FIG. 21.

Figure 22:
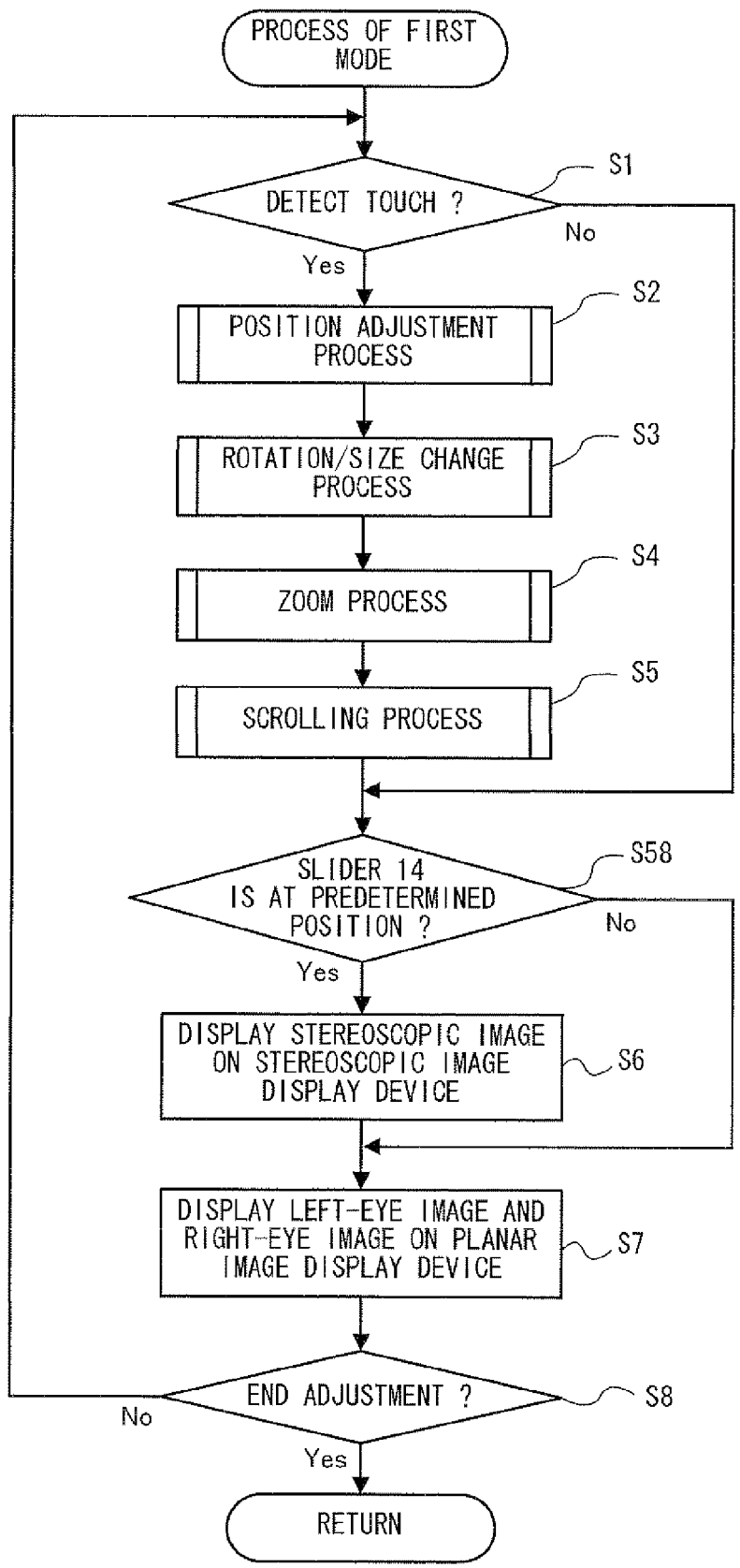
FIG. 22 is a flowchart illustrating in detail a process of a first mode.

In step S57, the CPU 30 executes the process of the first mode. Although the process of step S57 is the same as the process (the steps S1 to S8 shown in FIG. 14) in the first embodiment, a determination process of step S58 is performed between the step S5 and step S6 in FIG. 14, as shown in FIG. 22. FIG. 22 is a flowchart showing in detail the process of the first mode. In step S58, the CPU 30 determines whether or not the hardware slider 14 is positioned at a predetermined position (the right end, for example). If the determination result is affirmative, the CPU 30 next executes a process of step S6. If the determination result is negative, the CPU 30 next executes a process of step S7.

As described above, in the second embodiment, the image display apparatus 10 operates in the first mode, in which the stereoscopic image is displayed by using the left-eye image and the right-eye image which are already taken, and in the second mode in which the stereoscopic image is displayed by using the left-eye image and the right-eye image taken by the virtual stereo camera present in the virtual space.

In the first mode, the left-eye image and the right-eye image may be the images taken by the stereo camera 18 (the left-eye image imaging section 18*a* and the right-eye image imaging section 18*b*), or images taken by another stereo camera. In the first mode, since the images, which are already taken, are used, the parallax caused by the distance between the left-eye image imaging section 18*a* and the right-eye image imaging section 18*b* cannot be changed. Therefore, in the first mode, the hardware slider 14 functions as a switch to switch between displaying/not displaying the stereoscopic image. This allows the user to switch between ON/OFF of the stereoscopic display by using the hardware slider 14.

On the other hand, in the second mode, since the left-eye image and the right-eye image are the images taken by the virtual stereo camera (the left-eye virtual camera and the right-eye virtual camera), the distance between the left-eye virtual camera and the right-eye virtual camera can be arbitrarily changed. In the second mode, the distance between the virtual cameras (the distance between the left-eye virtual camera and the right-eye virtual camera) is changed by using the hardware slider 14. Therefore, the user can adjust the appearance of the stereoscopic image. Furthermore, the distance between the virtual cameras can be changed from the default value, according to the position of the hardware slider 14, and thus the user need not to adjust the hardware slider 14, according to the game scene. That is, the default value of the distance between the virtual cameras, which is set for each game scene, is previously determined by the architect. Therefore, the stereoscopic image taken with such settings of the virtual cameras does not necessarily cause no sense of discomfort for all users. For example, it may be easy for a certain user to see the image as the stereoscopic image, when the distance between the virtual cameras is set to 80% of the default value in each game scene. Therefore, setting the ratio of the value of the distance between the virtual cameras to the default value, according to the position of the hardware slider 14 obviates the need for adjusting the position of the hardware slider 14 in each game scene.

In the second mode, the amount of shift of the left-eye image and the right-eye image in the horizontal direction may be set according to the position of the hardware slider 14. That is, the amount of shift of the left-eye image and the right-eye image in the horizontal direction may be adjusted, according to the position of the hardware slider 14, instead of adjusting the distance between the virtual cameras.

Also, even in the second mode, the amount of shift of the left-eye image and the right-eye image (the amount of shift in the horizontal direction) may be adjusted by using the position adjustment bar 54, as described in the first embodiment. This allows the user to move a predetermined object present in the game space in a direction perpendicular to the screen of the stereoscopic image display device 11.

Furthermore, in the first and second embodiments, the image display apparatus 10 having a handheld type, which includes both the stereoscopic image display device 11 and the planar image display device 12, is assumed. In another embodiment, these devices may be configured to be independently of one another and connected to one another. For example, a first display device capable of displaying a stereoscopically visible image, a second display device configured to display merely a planar image, and a control apparatus which performs the processes described above may be configured to be hardware independently of one another. Then, these devices and apparatus may function as the image display control system by being connected with one another by wire or wirelessly.

Further, in another embodiment, a display device capable of setting simultaneously a stereoscopic image display area, in which a stereoscopic image is displayed, and a planar image display area, in which a planer images is displayed, may be employed as the stereoscopic image display device 11 and the planar image display device 12, respectively. That is, the stereoscopic image display area and the planar image display area of such display devices may be employed as stereoscopic image display means, and planar image display means, respectively.

Further, in another embodiment, the adjustment method described above may be applied to any information processing apparatus, which includes a display device and a touch panel (for example, PDAs (Personal Digital Assistant), mobile phones, and the like), and personal computers which include a pointing device such as a mouse.

Further, in the embodiment described above, the stereoscopic image is adjusted (the respective positions of the left-eye image and the right-eye image are adjusted), the stereoscopic image is zoomed, scrolled, and the like, by the operations on the touch panel. In another embodiment, a pointing device, such as a mouse, may be operated to adjust the stereoscopic image, and the like. For example, the slider of the position adjustment bar, which is displayed on the screen, may be adjusted by a mouse operation.

Further, in the embodiment described above, the processes shown in the above-described flowcharts are performed by the CPU 30 of the image display apparatus 10 executing a predetermined program. In another embodiment, a part or the entirety of the processes may be performed by a dedicated circuit included in the image display apparatus 10. For example, a dedicated GPU (Graphics Processing Unit) or the like, which generates an image to be displayed on the stereoscopic image display device 11, may be provided.

Third Embodiment

Outline of Game

Figure 23:
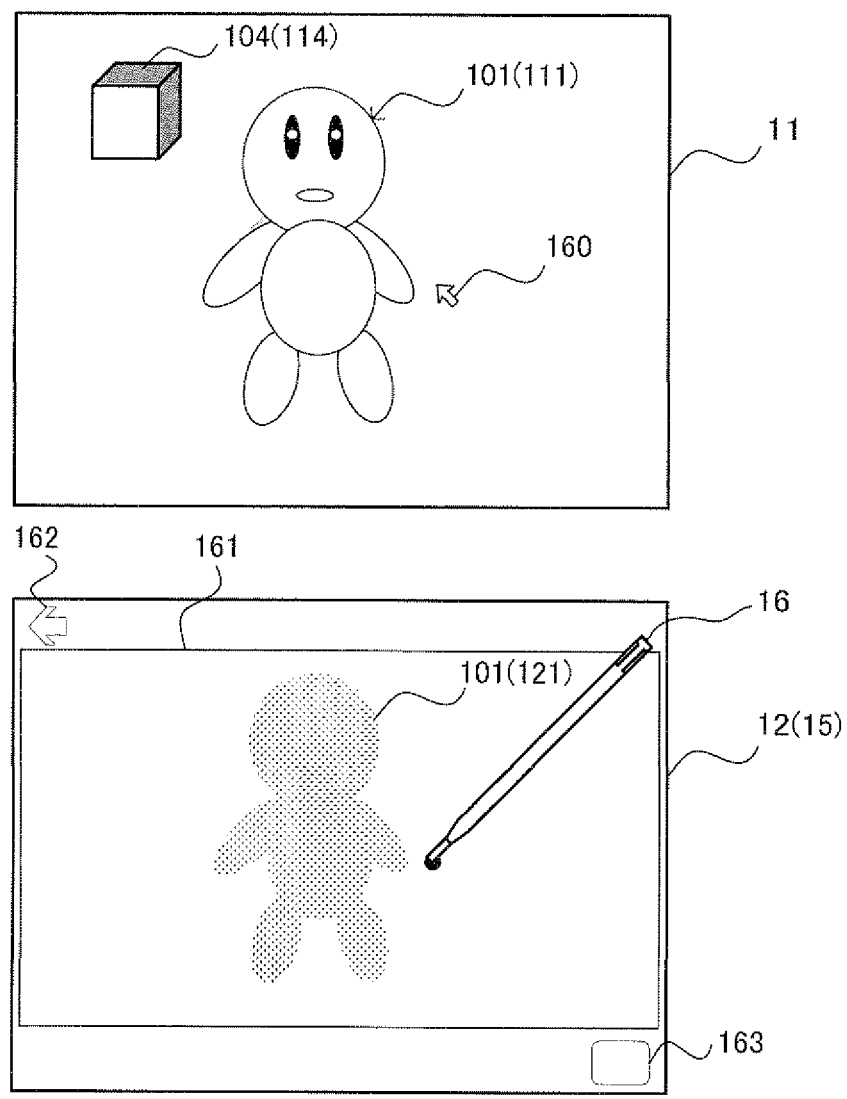
FIG. 23 is a diagram illustrating an example of game images displayed on respective screens of a stereoscopic image display device 11 and a planar image display device 12, while a game according to a third embodiment is being executed.

Next, an outline of a game according to a third embodiment will be described, with reference to FIG. 23 to FIG. 29. In the third embodiment, an image display apparatus 10 functions as a game apparatus. FIG. 23 is a diagram illustrating an example of game images displayed on respective screens of a stereoscopic image display device 11 and a planar image display device 12, while the game according to the third embodiment is being executed.

As shown in FIG. 23, on the screen of the stereoscopic image display device 11, a child object image 111, in which a child object 101 representing a child present in a virtual space is displayed stereoscopically (displayed in a stereoscopically visible manner), and a furniture object image 114, in which a furniture object 104 is displayed stereoscopically, are displayed. The child object image 111 and the furniture object image 114 are displayed, for example, in 32-bit color on the screen of the stereoscopic image display device 11. In addition, a cursor 160 is displayed on the screen of the stereoscopic image display device 11. The cursor 160 is arranged at a position, in the virtual space, which corresponds to a position touched by a user on a touch panel 15 (the screen of the planar image display device 12). The cursor 160 is then displayed on the screen of the stereoscopic image display device 11.

Figure 24:
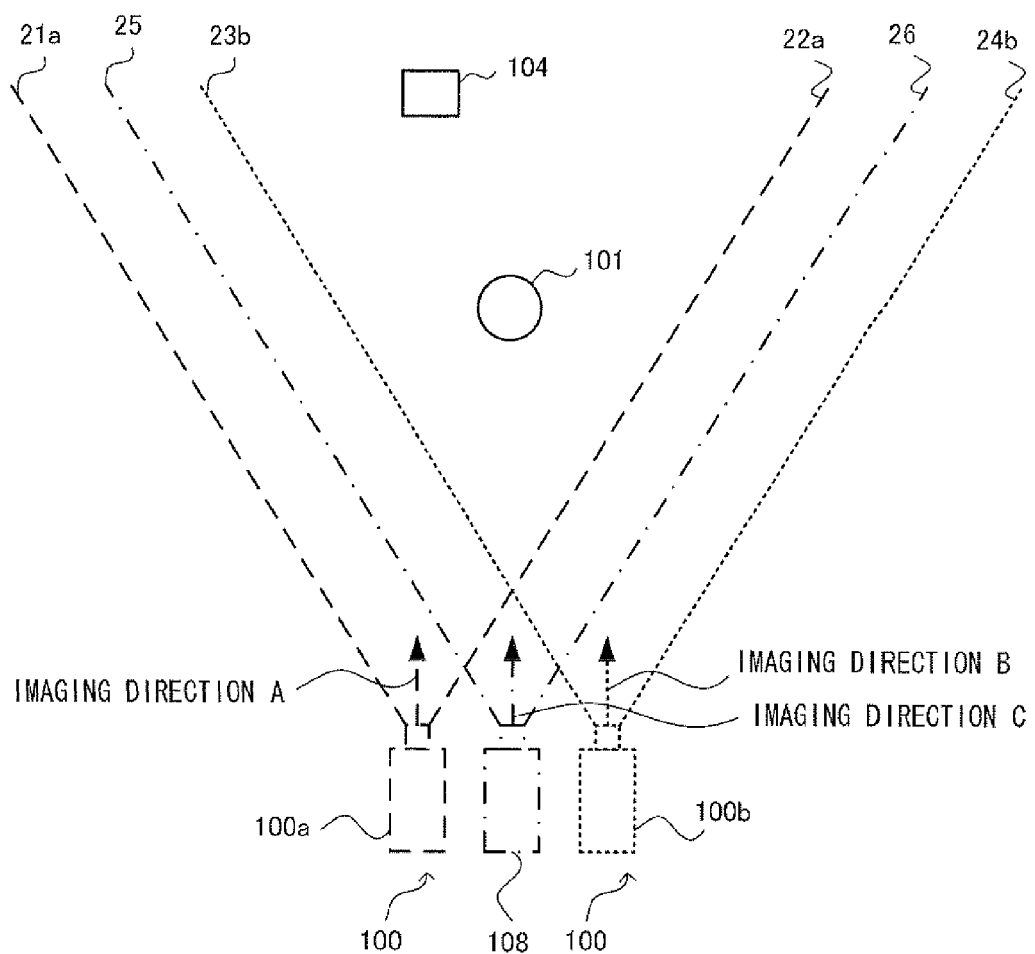
FIG. 24 is a diagram illustrating a state in which respective images of objects present in the virtual space are taken by a virtual stereo camera 100, the state being viewed from above the virtual space.

A stereoscopic image, which includes the child object 101 and the furniture object 104, (an image displayed on the screen of the stereoscopic image display device 11) is an image taken, of the virtual space, by a virtual stereo camera, and which is an image (a stereoscopically visible image) which exerts a stereoscopic effect on the user. FIG. 24 is a diagram illustrating a state in which images of respective objects present in the virtual space are taken by a virtual stereo camera 100, the state being viewed from above the virtual space. As shown in FIG. 24, a left-eye image and a right-eye image are taken by a left-eye virtual camera 100a and a right-eye virtual camera 100b, respectively. The left-eye virtual camera 100a and the right-eye virtual camera 100b are components of the virtual stereo camera 100. By the taken left-eye image being viewed with the user's left eye and the taken right-eye image being viewed with the user's right eye, the user can view the image having the stereoscopic effect. An imaging direction A of the virtual camera at the left 100a, which is the component of the virtual stereo camera 100, and an imaging direction B of the virtual camera at the right 100b, which is the component of the virtual stereo camera 100, are the same. For example, the imaging direction A of the left-eye virtual camera 100a is a direction of a straight line which divides in half an angle formed between a line 21a and a line 22a which together indicate an angle of view of the left-eye virtual camera 100a. Similarly, the imaging direction B of the right-eye virtual camera 100b is a direction of a straight line which divides in half an angle formed between a line 23b and a line 24b which together indicate an angle of view of the right-eye virtual camera 100b. In addition, a point of view of the virtual stereo camera 100 coincides with a point of view of the user. As shown in FIG. 24, the child object 101 is present at a position closer to the virtual stereo camera than the furniture object 104 is. Therefore, as shown in FIG. 23, the user feels an experience as if the child object 101 exists in front of the user itself.

A planar image display area 161 is provided in the central portion of the screen of the planar image display device 12. An operation button 162 and an item selection button 163 are displayed on the upper portion and the lower portion of the screen of the planar image display device 12, respectively. The operation button 162 is used for pausing or ending the game. When ending the game, the user touches the operation button 162 by using the stick 16, thereby pausing or ending the game. The item selection button 163 is used for selecting an item described below.

A child object image 121 is displayed in the planar image display area 161. The child object image 121 is an image in which the child object 101, which is displayed on the screen of the stereoscopic image display device 11, is displayed in one color (gray) and in a planar manner. Specifically, the child object image 121 is a silhouette of an image of the child object 101 present in the virtual space, which is taken by a virtual camera 108 set at the middle of the left-eye virtual camera 100a and the right-eye virtual camera 100b. In this case, an imaging direction (an imaging direction C shown in FIG. 24) of the virtual camera 108 is the same as the imaging directions of the virtual stereo camera 100. In addition, an angle of view of the virtual camera 108 is the same as the angle of view of the virtual stereo camera 100. Therefore, the image (the image taken of the virtual space including the child object 101), which is displayed in the planar image display area 161, has substantially the same size as the image (the image taken of the virtual space including the child object 101 and the furniture object 104), which is displayed on the stereoscopic image display device 11, and these images are images taken of substantially the same virtual space regions. That is, the image displayed on the planar image display device 12 is an image (here, an image reduced by a predetermined ratio in the vertical direction of the screen) obtained by reducing the image displayed on the stereoscopic image display device 11, according to a ratio in size of the screen of the stereoscopic image display device 11 to the planar image display area 161. Also, an imaging range of the image (a virtual space region displayed in the image) displayed on the planar image display device 12 is substantially the same as an imaging range of the image displayed on the stereoscopic image display device 11.

Therefore, the child object image 121 displayed on the screen of the planar image display device 12 has substantially the same size as the child object image 111 displayed on the stereoscopic image display device 11. The child object image 121 is the child object 101 present in the virtual space, which is viewed from the same direction.

The furniture object 104, which is displayed on the stereoscopic image display device 11, is not displayed in the planar image display area 161. In the third embodiment, the silhouette of only an object (the child object 101) which can be operated by the user, i.e. a user-operable-object, is displayed on the screen (the planar image display area 161) of the planar image display device 12. Since the furniture object 104 is not a user-operable-object, the silhouette of the furniture object 104 is not displayed on the screen of the planar image display device 12.

Here, the imaging ranges of the respective images taken by the virtual stereo camera 100 and the image taken by the virtual camera 108 will be described. As shown in FIG. 24, the imaging range (the angle of view) of the left-eye virtual camera 100a is an area which includes the child object 101 and the furniture object 104, and which is surrounded by the line 21a and the line 22a. The imaging range (the angle of view) of the right-eye virtual camera 100b is an area, which includes the child object 101 and the furniture object 104, and which is surrounded by the line 23b and the line 24b. The left-eye image taken by the left-eye virtual camera 100a and the right-eye image taken by the right-eye virtual camera 100b are synthesized and displayed on the stereoscopic image display device 11, thereby displaying the stereoscopic image exerting the stereoscopic effect on the user. Here, only an area including the child object 101 and the furniture object 104, which is surrounded by the line 22a and the line 23b, is displayed on the stereoscopic image display device 11. That is, the region of the stereoscopic image (the imaging range of the virtual stereo camera 100) displayed on the stereoscopic image display device 11 is an area in which the imaging range of the left-eye virtual camera 100a and the imaging range of the right-eye virtual camera 100b are overlapped one on the other. The following are reasons why the overlapping area only is displayed. That is, if the stereoscopic image including a non-overlapping area is displayed on the screen of the stereoscopic image display device 11, part of the stereoscopic image becomes an image having the stereoscopic effect, while other part becomes an image having no stereoscopic effect, and which is a state in which "what should be visible is invisible" or "what should be invisible is visible" for the user. Therefore, an image taken of the overlapped area of the respective imaging ranges of the virtual cameras at the left and the right (100a and 100b) is displayed on the screen of the stereoscopic image display device 11.

On the other hand, as shown in FIG. 24, the imaging range of the virtual camera 108 is an area including the child object 101 and the furniture object 104, which is surrounded by a line 25 and a line 26. The imaging range of the virtual camera 108 is an area including the imaging range (the above-described overlapping area) of the virtual stereo camera 100, and which is larger than the imaging range of the virtual stereo camera 100. However, the virtual cameras at the left and the right (100a and 100b, respectively), which are the components of the virtual stereo camera 100, are close to each other, and the imaging range of the virtual stereo camera 100 is substantially the same as the imaging range of the virtual camera 108. Therefore, the image displayed on the planar image display device 12 is an image taken of substantially the same virtual space region as that of the image displayed on the stereoscopic image display device 11. The imaging range of the virtual camera 108 may be exactly the same as the imaging range of the virtual stereo camera 100.

Next, the user touches the child object image 121 by using the stick 16 to perform a predetermined operation, thereby causing the child object 101 present in the virtual space to perform a predetermined movement.

FIG. 25 is a diagram showing a state in which when the user touches the child object image 121 displayed on the planar image display device 12 to perform the predetermined operation, the respective images displayed on the stereoscopic image display device 11 and the planar image display device 12 change. As shown in FIG. 25, when the user operates the stick 16 such as stroking the chest of the child object image 121 by using the stick 16, the child object image 111 displayed on the stereoscopic image display device 11 changes. Specifically, when the user moves the stick 16 in the up-down direction (the vertical direction) of the screen, while touching, by using the stick 16, the chest area of the child object image 121, the facial expression of the child object 101 present in the virtual space changes and the positions of both hands of the child object 101 change. The child object image 111 displayed on the stereoscopic image display device 11 and the child object image 121 displayed on the planar image display device 12 also change in the same manner, according to the change of the child object 101.

When the user touches the child object image 121 by using the stick 16, the cursor 160 is displayed on the screen of the stereoscopic image display device 11 at a position corresponding to the touch position. For example, if the user touches the head of the child object image 121 on the planar image display device 12, the cursor 160 is displayed on the stereoscopic image display device 11 on the head of the child object 101. In addition, if the user touches the child object image 121 by using the stick 16, the shape of the cursor 160 changes from an arrow shape shown in FIG. 23 to a shape of a human hand shown in FIG. 25.

Figure 26A:
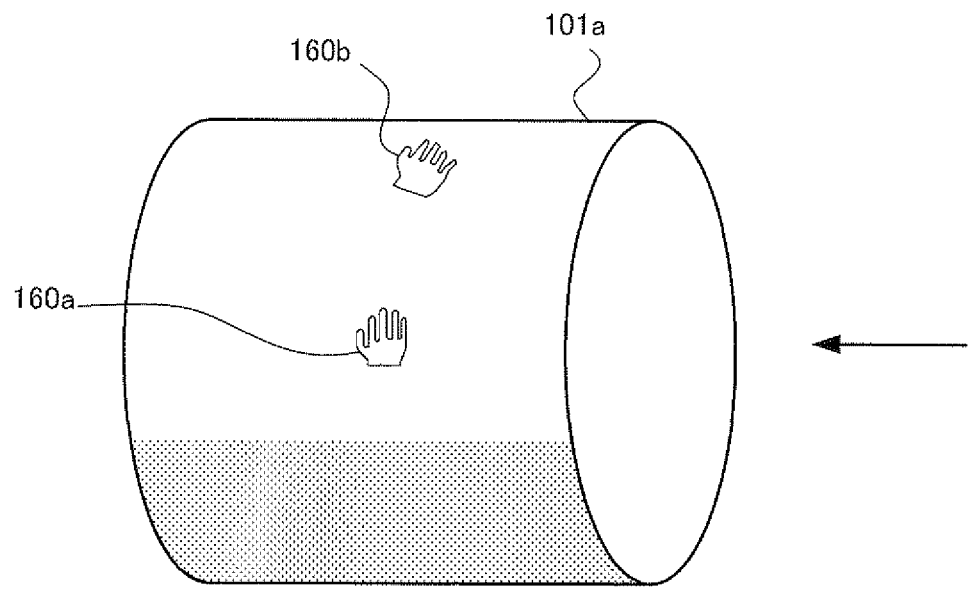
FIG. 26A is a diagram illustrating how a cursor 160 is displayed, and a part of a child object 101 displayed on the stereoscopic image display device 11, which is enlarged and viewed obliquely from the front.
Figure 26B:
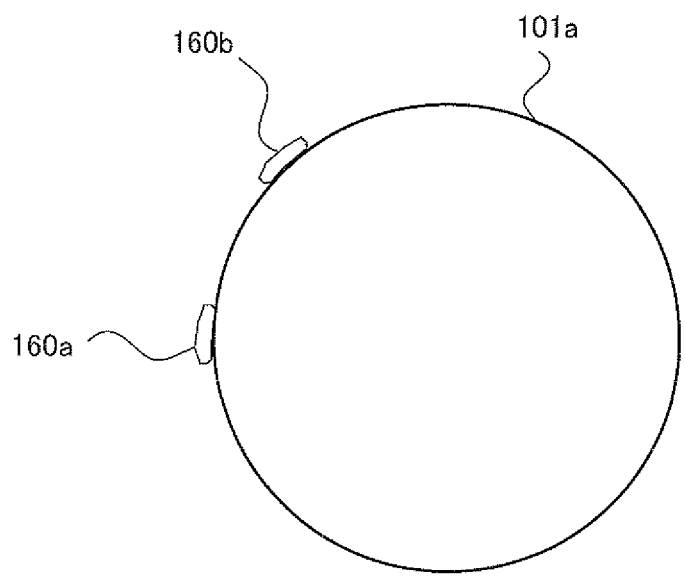
FIG. 26B is a diagram illustrating the part of the child object 101 viewed from a direction indicated by an arrow shown in FIG. 26A.

Furthermore, the cursor 160 is displayed so as to be along on a surface of the child object 101. FIG. 26A is a diagram illustrating how the cursor 160 is displayed, and a part of the child object 101 displayed on the stereoscopic image display device 11, which is enlarged and viewed obliquely from the front. FIG. 26B is a diagram illustrating the part of the child object 101 viewed from a direction indicated by an arrow in FIG. 26A. In FIG. 26A and FIG. 26B, 101a indicates a part (a part of an arm, for example) of the child object 101. The part 101a is formed in a simple columnar shape for the purpose of explanation. As shown in FIG. 26A and FIG. 26B, the cursor 160 (the cursors 160a and 160b) is stereoscopically displayed so as to be along the surface of the part 101a. When the user sees the stereoscopic child object 101 (the child object image 111) displayed on the stereoscopic image display device 11, it appears as if the cursor 160 is present on the surface of the stereoscopic child object 101. This allows the user to obtain the feeling of the experience as if the user is stroking the child object 101, by performing an operation of stroking on the screen of the planar image display device 12 by using the stick 16, while seeing the screen of the stereoscopic image display device 11.

As described above, the game according to the third embodiment, the child object 101 and the furniture object 104 present in the virtual space are stereoscopically displayed on the screen of the stereoscopic image display device 11. On the screen of the planar image display device 12, the silhouette of only the child object 101, which is a user-operable-object, is displayed (only the child object image 121, which is the silhouetted child object 101, is displayed). The user then touches the child object image 121 displayed on the screen of the planar image display device 12 by using the stick 16. As described above, the silhouette of the child object is displayed on the planar image display device 12, and the user touches the silhouette by using the stick 16. This allows the user to easily operate the object while seeing the screen of the stereoscopic image display device 11, and obtain the feeling of the experience as if the user is operating the object.

That is, since the object is stereoscopically displayed on the stereoscopic image display device 11, it is difficult for the user to directly touch on the screen of the stereoscopic image display device 11 to operate the displayed object. The user feels an experience as if the stereoscopically displayed object is positioned, for example, in front of the screen, or positioned far behind of the screen. For example, if it appears as if the object is present in front of the screen, and if the user attempts to directly touch the stereoscopically displayed object for operation, the user ends up attempting to touch a space in front of the screen by using the stick 16. Therefore, the user is unable to operate the desired object. Moreover, if the user touches on the screen of the stereoscopic image display device 11 to operate the stereoscopically displayed object which appears to be in front of the screen, the display position of the object felt by the user is different from the touch position, and thus the user cannot obtain the feeling of the experience as if the user is operating the object. That is, the display position of the object felt by the user is in front of the screen, while the position where user touches is on the screen. Therefore, in order to operate the object, the user ends up touching a different position in a direction perpendicular to the screen, thereby unable to obtain the feeling of the experience as if the user is directly operating the object. That is, for example, if it appears as if the object is present in front of the screen, and if the user touches the screen by using the stick 16, the stick 16 falls in a state in which the stick 16 penetrates inside the object. Furthermore, if it appears as if the object is positioned in a depth direction of the screen, the user cannot move the stick deeper than the screen and therefore, the user cannot directly touch the object which appears to be present far behind of the screen. Thus, what the user sees contradicts with the reality, and which may cause detriment to the feeling of operation. However, stereoscopically displaying the object on the stereoscopic image display device 11 and displaying the silhouette of the object on the planar image display device 12 as described above allows the user to operate the object by touching the screen of the planar image display device 12, while seeing the object displayed on the stereoscopic image display device 11. Therefore, the user obtains the feeling of the experience as if the user is directly operating the object.

Also, on the screen of the stereoscopic image display device 11, the cursor 160 is displayed at a position corresponding to the position touched by the user on the screen of the planar image display device 12. Therefore, the user can obtain the feeling of the experience as if the user is directly operating the object displayed on the stereoscopic image display device 11 without the necessity of directly touching the screen of the stereoscopic image display device 11.

The object is displayed in 32-bit color on the screen of the stereoscopic image display device 11. The object is an image having fine detail recognizable of each part (for example, the head, body, arms, and the like of the child object 101) of the object. On the other hand, the silhouette of the object is displayed on the planar image display device 12 and therefore, the presentation is less prominent, as compared to the object displayed on the stereoscopic image display device 11. The user tends to be more attracted to beautiful color images than less prominent monochromatic images. Therefore, it is easy for the user to perform the touch operation on the screen of the planar image display device 12 by using the stick 16, while gazing at the object displayed on the screen of the stereoscopic image display device 11.

Furthermore, since only the operable object is displayed on the planar image display device 12, the user can easily recognize the operable object. Merely by glancing at the silhouette displayed on the screen of the planar image display device 12, the user can recognize and touch the operable object, and thereafter operate the object while seeing the object displayed on the screen of the stereoscopic image display device 11. That is, after seeing the screen of the planar image display device 12 and touching the silhouette of the object, the user can operate the object, while seeing the screen of the stereoscopic image display device 11, and without the necessity of seeing the screen of the planar image display device 12.

Figure 27:
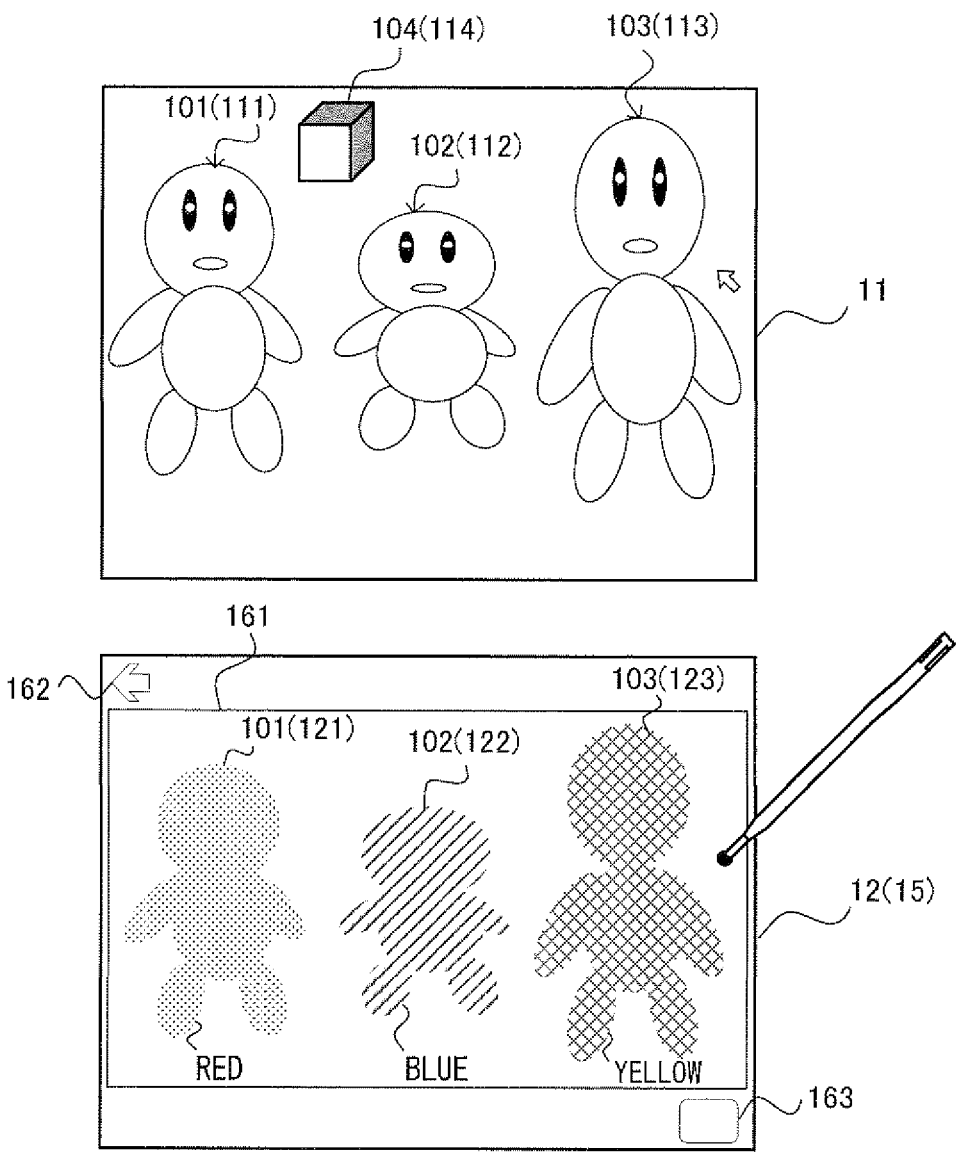
FIG. 27 is a diagram illustrating images displayed on the respective screens of the stereoscopic image display device 11 and the planar image display device 12 when there is a plurality of operable objects.

Next, a case where there is a plurality of operable objects will be described. FIG. 27 is a diagram illustrating images displayed on the respective screens of the stereoscopic image display device 11 and the planar image display device 12 when there is the plurality of operable objects. As shown in FIG. 27, on the screen of the stereoscopic image display device 11, the child object 101 (the child object image 111), a child object 102 (a child object image 112), a child object 103 (a child object image 113), and the furniture object 104 (the furniture object image 114) are displayed. On the other hand, on the screen (the planar image display area 161) of the planar image display device 12, the child object image 121, a child object image 122, and a child object image 123 are displayed. The child object image 121, the child object image 122, and the child object image 123 are images displayed in the planar manner of the silhouetted child object 101, the silhouetted child object 102, and the silhouette child object 103, respectively. Respective display modes of the child object image 121, the child object image 122, and the child object image 123 are different from one another. For example, the child object image 121 is displayed in red, the child object image 122 is displayed in blue, and the child object image 123 is displayed in yellow.

Figure 28:
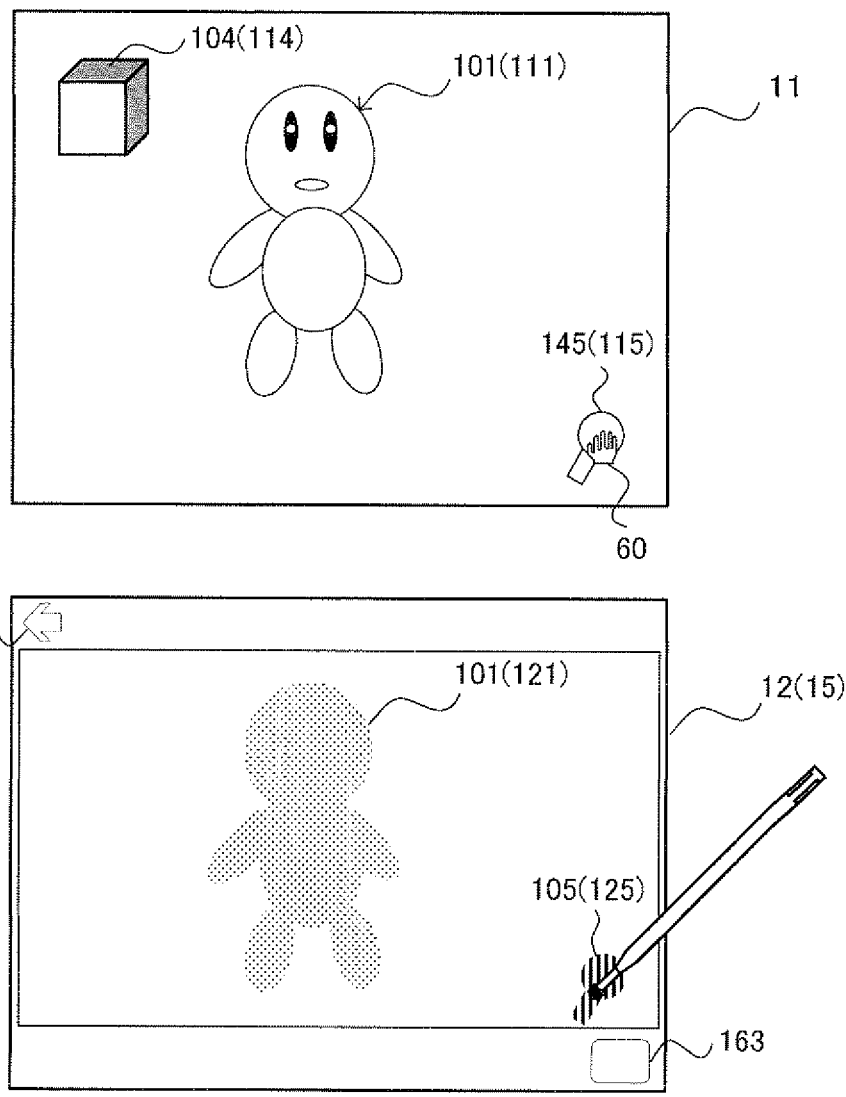
FIG. 28 is a diagram illustrating a case where the user uses an item in the game according to the third embodiment.

Next, the game, in which an item is used, will be described, with reference to FIG. 28 and FIG. 29. FIG. 28 is a diagram illustrating a case where the user uses an item in the game according to the third embodiment. When the user moves the stick 16 on the screen of the planar image display device 12 while touching an item selection button 163 by using the stick 16, an item 105 (an item image 115 which is stereoscopically displayed) emerges on the stereoscopic image display device 11 in a state in which the item 105 is held by the cursor 160 (hand). The item 105 is a user-operable-object. On the other hand, an item image 125 is displayed on the planar image display device 12. The item image 125 is the silhouette of the item 105 present in the virtual space. As shown in FIG. 28, the item image 125 (the silhouette of the item 105) is displayed in a display mode different from that of the child object image 121 of the child object 101. For example, the item image 125 is displayed in blue while the child object image 121 (the silhouette of the child object 101) is displayed in gray.

FIG. 29 is a diagram illustrating how the respective images displayed on the stereoscopic image display device 11 and the planar image display device 12 change when the item 105 is given to the child object 101. If the user moves the item image 125 to the position of a hand of the child object image 121 while touching the item image 125, the child object 101 displayed on the stereoscopic image display device 11 holds the item 105. In this case, the facial expression of the child object 101 displayed on the stereoscopic image display device 11 changes, and the child object 101 changes so as to raise both hands. Similarly, the child object image 121 displayed on the planar image display device 12 also changes. As described above, the user touches the item selection button 163 to hand the item 105 to the child object 101, thereby letting the child object 101 play with the item 105. Therefore, the child object 101 being joyous is displayed on the stereoscopic image display device 11. The user may be allowed to touch the item selection button 163 to select an item to be used from among a plurality of items. Also, the item 105 may be previously present at a predetermined position (a predetermined position in the virtual space) on the screen of the stereoscopic image display device 11, and the user touches the item image 125 displayed on the planar image display device 12 to hand the item image 125 to the child object 101.

As shown in FIG. 27 to FIG. 29, the respective display modes of the operable objects (the child objects 101 to 103 and the item 105) are changed on the screen of the planar image display device 12. This allows the user to easily associate, at a glance, the objects displayed on the stereoscopic image display device 11 with the objects displayed on the planar image display device 12, respectively. For example, when the respective silhouettes of the plurality of operable objects are displayed in the same color on the screen of the planar image display device 12, it may be difficult for the user to distinguish among the objects. Particularly, when the objects are close to one another, it is difficult for the user to distinguish the borders between the objects, and if the user attempts to touch one object for operation, the user may tend to gaze at the screen of the planar image display device 12. If so, the user is unable to perform operation while seeing the stereoscopic objects displayed on the stereoscopic image display device 11, thereby unable to obtain the feeling of the experience as if the user is directly operating the stereoscopically displayed object. However, since the respective display modes of the objects displayed on the planar image display device 12 are different from one another, the user can easily distinguish among the objects at a glance. Therefore, the user can perform operation while seeing the stereoscopic objects displayed on the stereoscopic image display device 11, and thus obtain the feeling of the experience as if the user is directly operating the stereoscopically displayed object.

As described above, in the game according to the third embodiment, stroking the child object with a hand or by using an item to make the child object joyous gives the user the feeling of the experience as if the user is raising a child, or playing with a child.

(Detail of Game Process)

Figure 30:
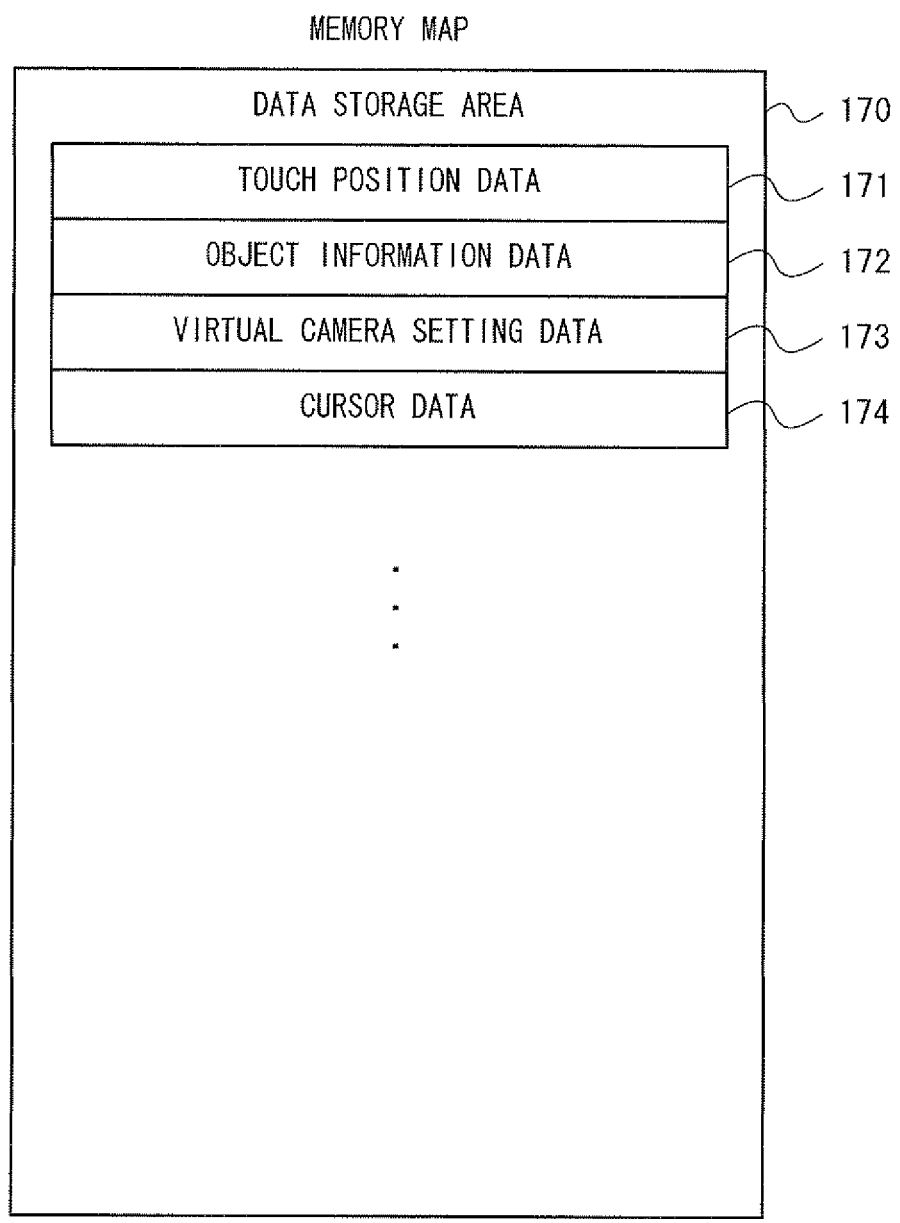
FIG. 30 is a diagram illustrating a memory map of a main memory 31 of a game apparatus 10.

Next, the game process according to the third embodiment will be described in detail, with reference to FIG. 30 to FIG. 33. Initially, main data stored in main memory 31 during the game process will be described. FIG. 30 is a diagram illustrating a memory map of the main memory 31 of the game apparatus 10. As shown in FIG. 30, touch position data 171, object information data 172, virtual camera setting data 173, cursor data 174, and the like are stored in the main memory 31. Other data stored in the main memory 31 are a predetermined program for executing the above-described game process, image data of each object, and the like.

A touch position detected by the touch panel 15 is stored in the touch position data 171. Specifically, the touch position data 171 is an array having a given length, and a coordinate value (XY coordinate system) representing a position on the touch panel 15 (on the screen of the planar image display device 12) is stored in each element of the array. In the touch position data 171, coordinate values, which represent respective touch positions detected by the touch panel 15, are stored in chronological order.

Information on each object is stored in the object information data 172. Specifically, the object information data 172 is an array having a given length, and information on one object is stored in each element of the array. The object information includes a position (xyz coordinate system) of the object in the virtual space, data indicative of whether or not the object is operable, data regarding a shape of the object, and the like. For example, a position of the child object 101 in the virtual space, data which indicates that the child object 101 is operable, and shape data of each part (head, body, and the like) of the child object 101 are stored in one element of the array. The each part of the child object 101 is represented by, for example, a plurality of spheres, and the position and the diameter of each sphere are stored in the element of the array as the shape data.

Setting information on the virtual stereo camera 100 and the virtual camera 108 are stored in the virtual camera setting data 173. Specifically, the respective positions in the virtual space, the respective imaging directions, and the respective imaging ranges (the respective angles of view), and the like, of the virtual stereo camera 100 and the virtual camera 108 are stored. The imaging directions of the virtual stereo camera 100 and the imaging direction of the virtual camera 108 are set to be the same as one another. The imaging ranges of the virtual stereo camera 100 and the imaging range of the virtual camera 108 are also set to be the same as one another.

A position in the virtual space and an orientation of the cursor 160 are stored in the cursor data 174. The cursor position is a position in three-dimensional virtual space, which corresponds to the position touched by the user on the touch panel 15. The orientation of the cursor 160 is an orientation of the cursor 160 in the virtual space, and which is the orientation of the cursor 160 when displayed on the surface of the child object 101 or the like.

Figure 31:
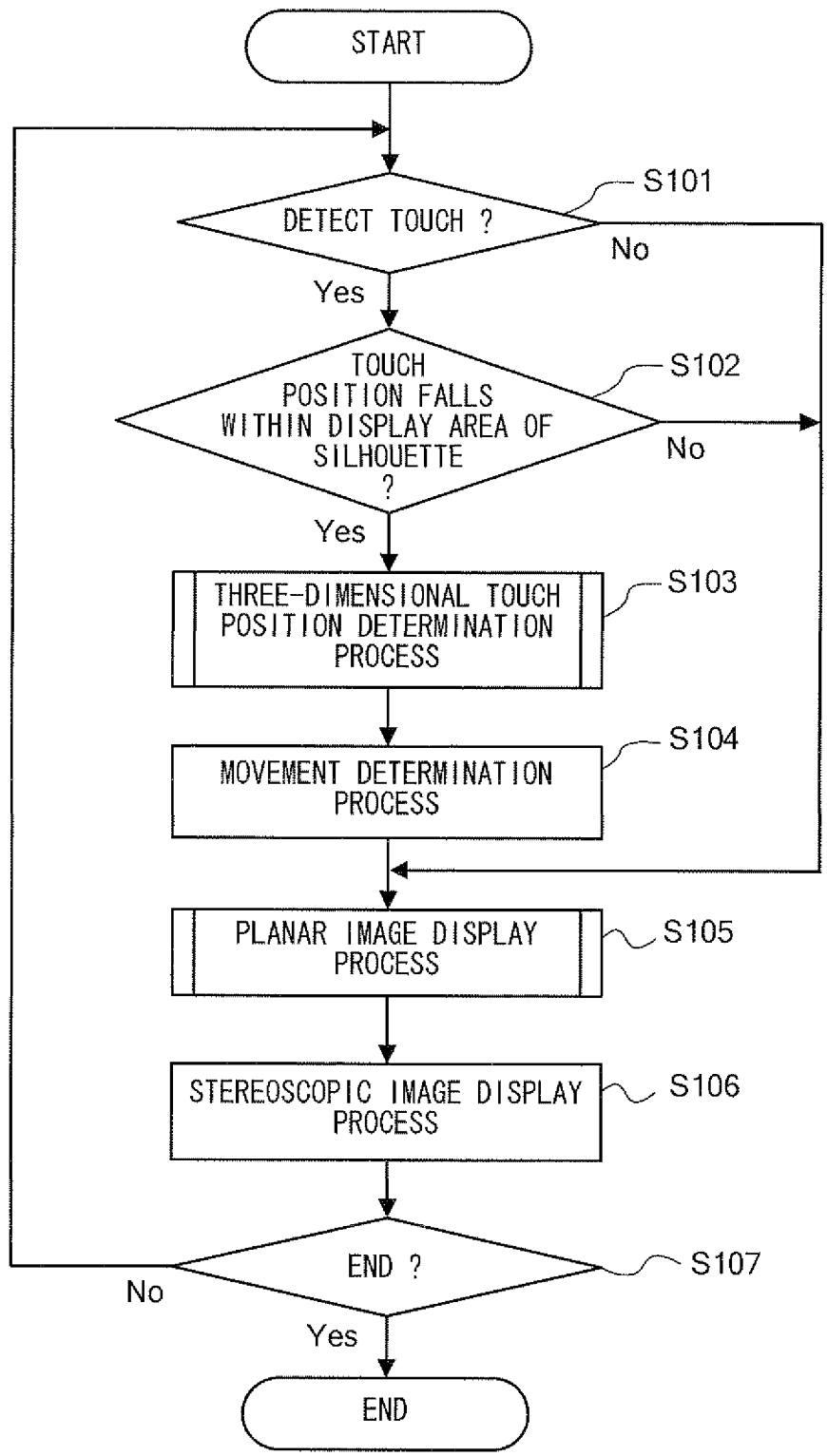
FIG. 31 is a main flowchart showing in detail the game process according to the third embodiment.
Figure 32:
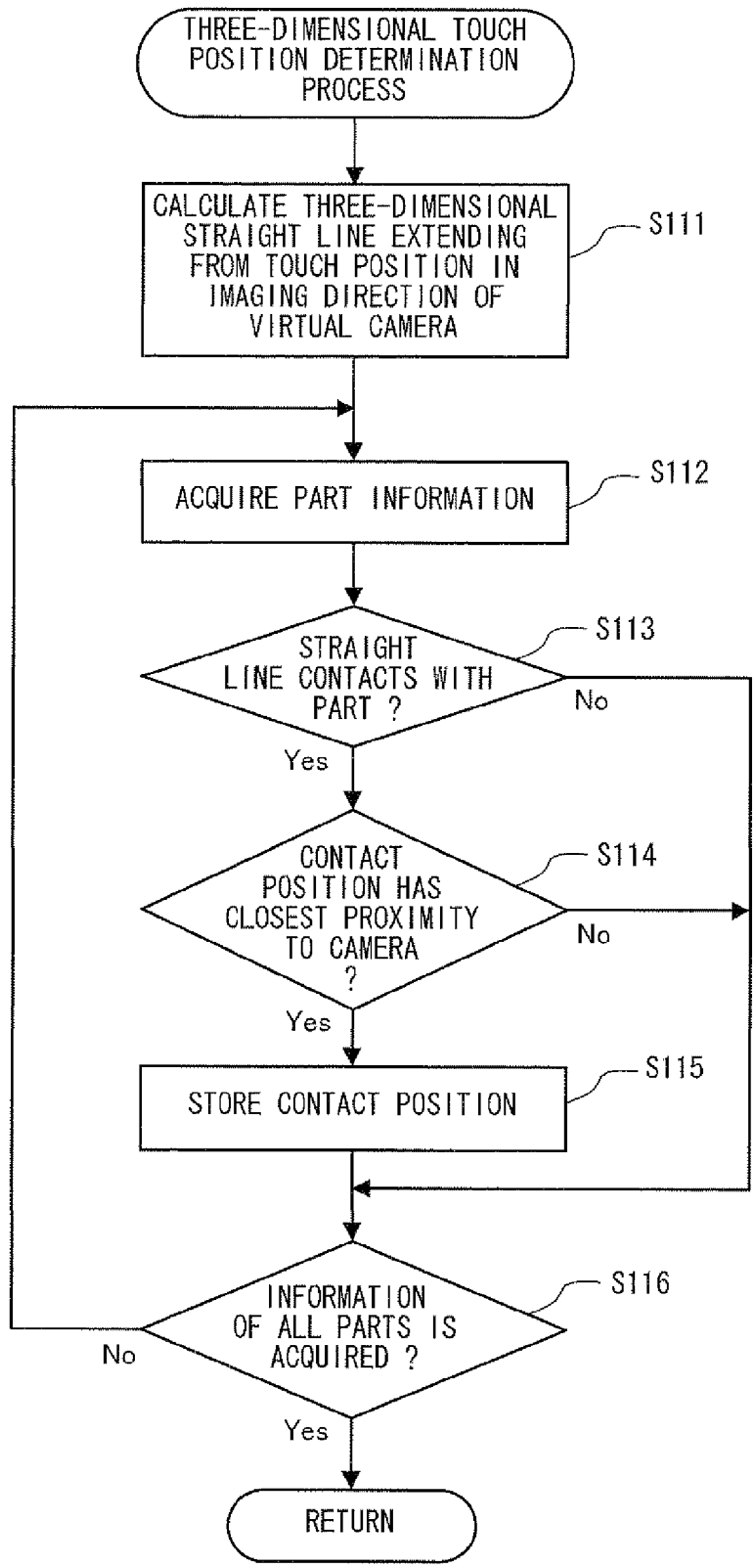
FIG. 32 is a flowchart showing in detail a three-dimensional touch position determination process (step S103)
Figure 33:
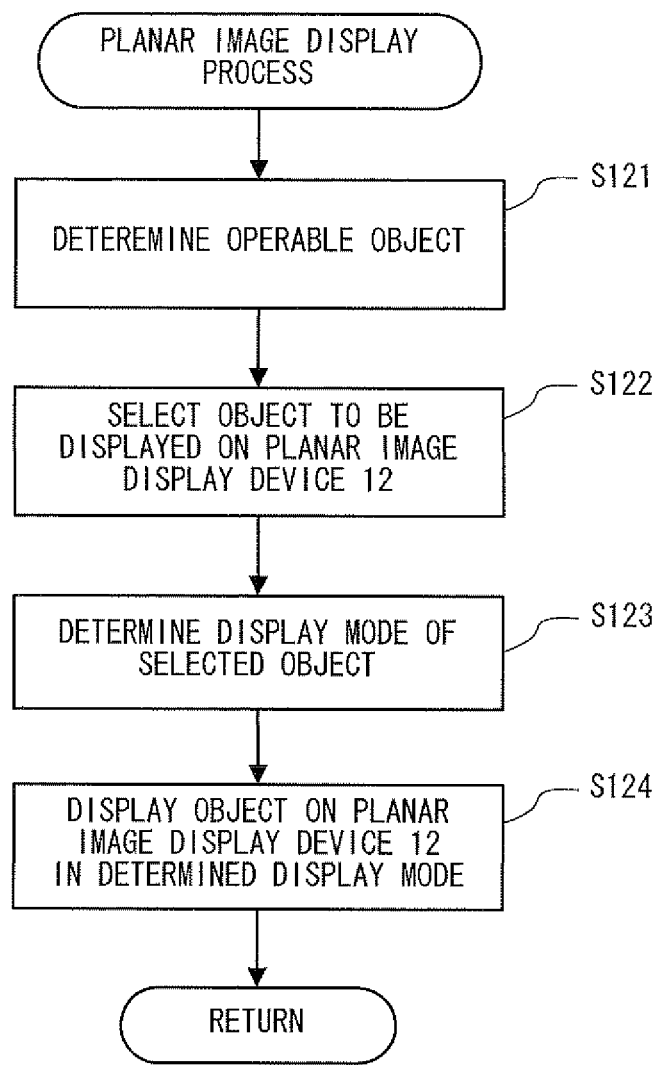
FIG. 33 is a flowchart showing in detail a planar image display process (step S105)

Next, the game process will be described in detail, with reference to FIG. 31 to FIG. 33. FIG. 31 is a main flowchart showing in detail the game process according to the third embodiment. When the game apparatus 10 is powered on, the CPU 30 of the game apparatus 10 executes a boot program stored in the ROM 32 to initialize each unit, such as the main memory 31. Next, the predetermined program stored in the ROM 32 is loaded into the main memory 31 and the CPU 30 starts executing the program. The flowchart shown in FIG. 31 shows a process performed after the above-described process is completed. In FIG. 31, the description of processes which do not directly relate to the particular aspect of the exemplary embodiment is omitted. A processing loop of step S101 through step S107 shown in FIG. 31 is repeatedly executed for each frame (for example, 1/30 second, which is referred to as frame time).

Initially, in step S101, the CPU 30 determines whether or not the touch panel 15 has detected a touch. If the touch panel 15 has detected the touch, the CPU 30 stores the touch position in the touch position data 171 as the latest touch position. The CPU 30 next executes a process of step S102. On the other hand, if the touch panel 15 does not detect the touch, the CPU 30 next executes a process of step S105.

In step S102, the CPU 30 determines whether or not the touch position detected in step S101 falls within a display area of the silhouette (the object). Specifically, the CPU 30 determines whether or not the latest touch position falls within the respective display areas of the object images (121, 122, 123, 125, or the like) displayed on the screen of the planar image display device 12 in an immediately preceding frame in step S105 (described below). If the determination result is affirmative, the CPU 30 next executes a process of step S103. On the other hand, if the determination result is negative, the CPU 30 next executes the process of step S105.

In step S103, the CPU 30 executes a three-dimensional touch position determination process. The process of step S103 determines a position of the cursor 160 in the virtual space, which corresponds to the latest touch position detected in step S101. The process of step S103 will be described in detail, with reference to FIG. 32. FIG. 32 is a flowchart showing in detail the three-dimensional touch position determination process (step S103).

In step S111, the CPU 30 calculates a three-dimensional straight line extending from the latest touch position in the imaging direction of the virtual camera. The CPU 30 calculates the three-dimensional straight line, based on the latest touch position (the touch position detected in step S101) and the imaging direction of the virtual camera 108, which is stored in the virtual camera setting data 173. For example, the CPU 30 performs a coordinate transform to calculate a position (x, y, z) on a virtual plane in the three-dimensional virtual space, which corresponds to the latest touch position (X, Y) being represented two-dimensionally. The virtual plane is a plane representing the touch panel 15 in the virtual space. The virtual plane passes through the point of view of the user (the position of the virtual camera 108), and is perpendicular to the imaging direction of the virtual camera 108. The CPU 30 then calculates a straight line passing through the three-dimensional position (x, y, z) and extending in the imaging direction of the virtual camera. Next, the CPU 30 executes a process of step S112.

In step S112, the CPU 30 acquires part information on each object. Specifically, the CPU 30 refers to the object information data 172 to acquire the shape data of one part, among the plurality of parts, of the object touched in step S102. Next, the CPU 30 executes a process of step S113.

In step S113, the CPU 30 determines whether or not the straight line calculated in step S111 contacts with the part acquired in step S112. If the determination result is affirmative, the CPU 30 next executes a process of step S114. On the other hand, if the determination result is negative, the CPU 30 next executes a process of step S116.

In step S114, the CPU 30 determines whether or not the contact position has the closest proximity to the virtual camera. Specifically, the CPU 30 calculates a contact position (a coordinate of a point of intersection of the calculated straight line with a sphere representing the acquired part) of the straight line calculated in step S111 with the part acquired in step S112. Next, the CPU 30 calculates a distance between the calculated contact position and the virtual camera 108. The CPU 30 then compares the calculated distance with the closest proximity stored in the main memory 31 (which is stored in step S115 described below). If the contact position has the closest proximity to the virtual camera 108, the CPU 30 next executes a process of step S115. On the other hand, if the contact position does not have the closest proximity to the virtual camera 108, the CPU 30 next executes a process of step S116.

In step S115, the CPU 30 stores in the cursor data 174 the contact position (the point of intersection of the straight line with the part) calculated in step S114. Also, the CPU 30 stores in the main memory 31 the distance (the distance between the contact position and the virtual camera 108) calculated in step S114 as the closest proximity. Next, the CPU 30 executes the process of step S116.

In step S116, the CPU 30 determines whether or not information of all parts has been acquired. If the information of all parts has not been acquired, the CPU 30 executes again the process of step S112. By the processes of step S112 through step S116 being repeatedly executed, the positions of all touched parts of the object, which contact with the straight line calculated in step S111, are calculated. Then, among the calculated contact positions, the position closest to the virtual camera 108 (a position closest to the user) is calculated as the cursor position. On the other hand, when the information of all parts has been acquired, the CPU 30 ends the three-dimensional touch position determination process.

Returning to FIG. 31, the CPU 30 next executes a process of step S104. In step S104, the CPU 30 executes a movement determination process. In step S104, operation performed on the touched object is determined, and the movement of the object is determined according to the operation. Specifically, the CPU 30 refers to the touch position data 171 to determine the operation performed on the touched object. More specifically, the CPU 30 determines the operation performed by the user, based on the touch positions in the past several frames stored in the touch position data 171 in chronological order. In step S104, for example, it is determined whether or not the operation performed by the user is the operation that the user strokes the chest of the child object 101 in the up-down directions as shown in FIG. 25. Or, in step S104, for example, it is determined whether or not the operation performed by the user is the operation that the user holds and moves the item 105 shown in FIG. 28. As described above, in step S104, based on the touch positions in the past several frames, a type of operation performed by the user is determined. Then, according to the determined type of operation, the movement of the touched object is determined. For example, if the operation performed by the user is the operation that the user strokes the chest of the child object 101 in the up-down directions as shown in FIG. 25, the CPU 30 determines a movement of the child object 101 so that the child object 101 changes the facial expression and raises both hands. The CPU 30 next executes the process of step S105.

In step S105, the CPU 30 executes a planar image display process. The process of step S105 displays the silhouette of the object on the screen of the planar image display device 12, or the like. The process in step S105 will be described in detail, with reference to FIG. 33. FIG. 33 is a flowchart showing in detail the planar image display process (step S105).

In step S121, the CPU 30 determines an operable object. Specifically, the CPU 30 determines the object to display on the screen, based on a first determination and a second determination. That is, the CPU 30 determines, as the first determination, whether or not the type of the object applies to the user-operable-object. Also, the CPU 30 determines, as the second determination, whether or not a distance between the object and the user is equal to or less than a predetermined distance.

Specifically, at the first determination in step S121, the CPU 30 determines whether or not each object applies to the user-operable-object. For example, the child objects 101 through 103 and the item 105 are previously set as the user-operable-objects. On the other hand, the furniture object 104 is previously set as user-inoperable-object. In the first determination, the CPU 30 determines whether or not each object applies to the user-operable-object, based on the type of the each object.

Next, in the second determination of step S121, the CPU 30 determines whether or not the distance between the object and the user (the virtual stereo camera 100 or the virtual camera 108) is equal to or less than the predetermined distance. The CPU 30 determines the operable object, based on the first determination and the second determination. That is, the CPU 30 conducts the first determination and the second determination on each object. If the object whose result of both the first determination and the second determination are affirmative is set as the operable object. The CPU 30 then stores data indicative of whether or not the object is operable in the main memory 31 (updates the object information data 172).

As described above, the operable object is defined not only depending on the type thereof, but also depending on the distance between the object and the user (the virtual stereo camera 100 or the virtual camera 108). For example, if the child object 102 is present at a position being farther than the predetermined distance away from the user, the child object 102 is not set as the operable object. As described above, in the game according to the third embodiment, by performing the predetermined operation while seeing the child object displayed on the stereoscopic image display device 11, the user can obtain the feeling of the experience as if the user is actually touching a child. However, if the user is allowed to operate a child object present out of user's reach, it causes the user to feel a sense of discomfort. Therefore, although the object is of the operable type, if the object is farther than the predetermined distance away from the user, the object is set as an inoperable object.

After step S121, the CPU 30 next executes a process of step S122.

In step S122, the CPU 30 selects an object to be displayed on the screen of the planar image display device 12. Specifically, the CPU 30 refers to the object information data 172 to select an operable object. As described above, the data indicative of whether or not each object is operable is stored in the object information data 172 by the process of step S121. The CPU 30 selects an operable object as the object to be displayed on the screen of the planar image display device 12. Next, the CPU 30 executes a process of step S123.

In step S123, the CPU 30 determines a display mode of the object selected in step S122. Specifically, if there is a plurality of objects which have been selected in step S122, the CPU 30 determines the respective display modes of the objects so that the respective display modes are different from one another. For example, if the child object 101, the child object 103, and the item 105 are the selected, the CPU 30 determines gray, blue, and red as the respective display modes of the child object 101, the child object 103, and the item 105. Next, the CPU 30 executes a process of step S124.

In step S124, the CPU 30 displays each object on the screen of the planar image display device 12 in the respective display mode determined in step S123. Specifically, in step S124, the CPU 30 hides the objects other than the objects selected in step S122, displays the respective silhouettes of the objects selected in step S122, and takes an image of the virtual space by using the virtual camera 108. This allows the CPU 30 to display the selected objects on the screen of the planar image display device 12 in the respective display modes determined in step S123 (displays the respective silhouettes of the selected objects).

In step S124, a state in which the silhouette (the object) moves according to the movement of the object determined in step S104. Moreover, the CPU 30 displays an operation button 162 and an item selection button 163 on the upper left and the lower right of the screen, respectively. The CPU 30 then ends the planar image display process.

Returning to FIG. 31, the CPU 30 next executes a process of step S106. In step S106, the CPU 30 executes a stereoscopic image display process. In step S106, the CPU 30 arranges the cursor 160 in the virtual space, takes an image of the virtual space by using the virtual stereo camera 100, and displays the stereoscopic image on the screen of the stereoscopic image display device 11. Specifically, the CPU 30 determines the orientation of the cursor 160, and arranges the cursor 160 having the shape of the human hand at the position of the cursor 160, which is determined in step S103 (that is, arranges the cursor 160 on a surface of the touched object). Specifically, the CPU 30 determines the orientation of the cursor 160, based on a plane, in the virtual space, tangential to the part of the object at the position of the cursor 160 determined in step S103, and arranges the cursor 160 in the virtual space. On the other hand, if the determination result in step S102 is negative, the CPU 30 arranges the cursor 160 having the arrow shape in the virtual space at a predetermined position corresponding to the latest touch position. Next, the CPU 30 takes the left-eye image and the right-eye image by using the virtual stereo camera 100. Next, the CPU 30 longitudinally divides each of the left-eye image and the right-eye image into rectangle-shaped images and synthesizes resulting images. For example, the CPU 30 divides each of the left-eye image and the right-eye image into rectangle-shaped images each having one line of pixels aligned in the vertical direction, and alternately aligns the rectangle-shaped images of each image, thereby synthesizing the two images. The CPU 30 then outputs the synthesized image to the stereoscopic image display device 11. By seeing the synthesized image through the parallax barrier in the stereoscopic image display device 11, the user can view the left-eye image with the user's left eye and view the right-eye image with the user's right eye. This allows the user to see an image having the stereoscopic effect. Similar to the screen of the planar image display device 12, the state, in which the object moves according to the movement of the object determined in step S104, is displayed on the screen of the stereoscopic image display device 11.

Figure 34:
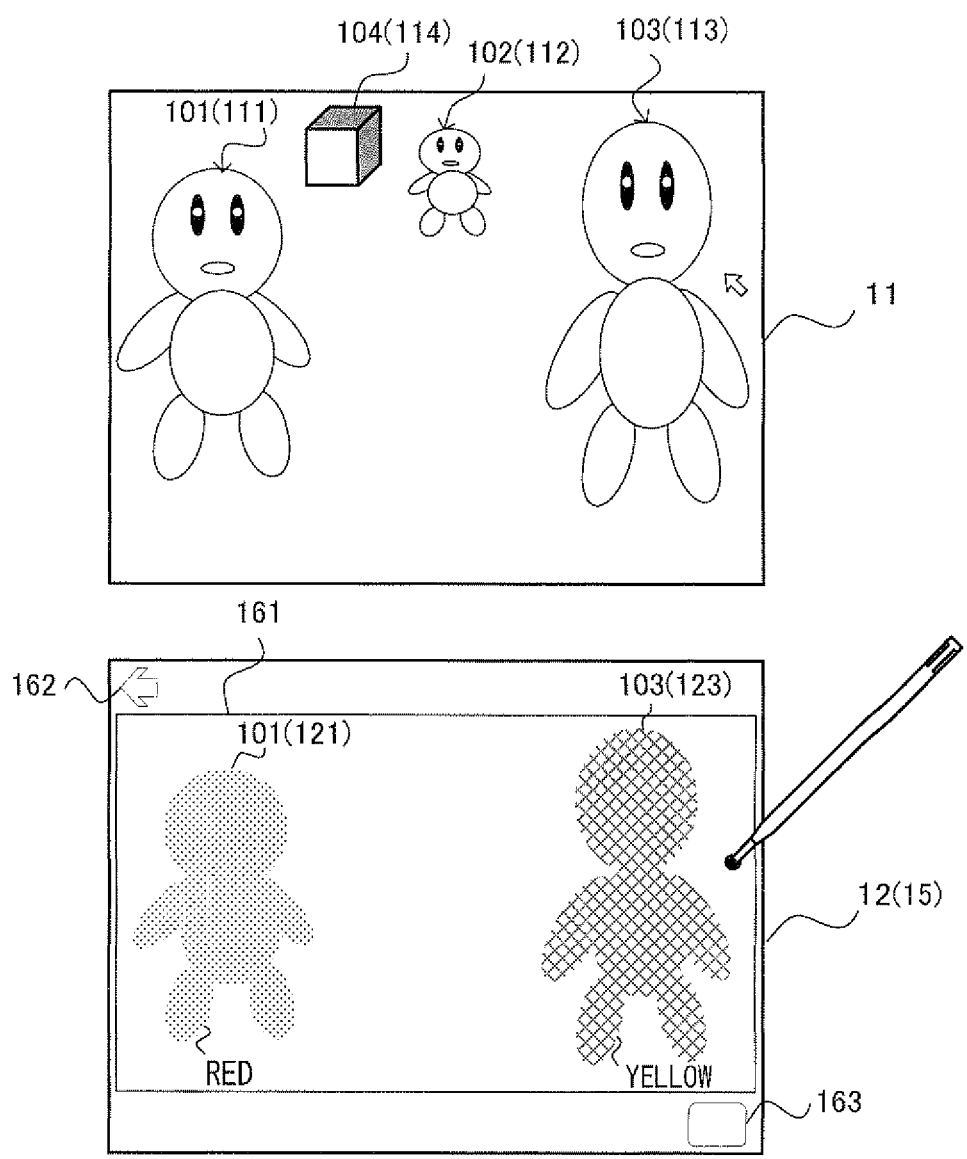
FIG. 34 is a diagram illustrating an example of images displayed on the respective screens of the planar image display device 12 and the stereoscopic image display device 11.

FIG. 34 is a diagram illustrating an example of images displayed on the respective screens of the planar image display device 12 and the stereoscopic image display device 11. As shown in FIG. 34, since the child object 102 is farther than the predetermined distance away from the user, the child object 102 is not determined to be the operable object in step S121. Moreover, since the furniture object 104 is not previously set as the user-operable-object, thus inoperable object. Because of this, the child object 102 and the furniture object 104 are not displayed on the screen of the planar image display device 12. The child object 101 and the child object 103 are previously set as the user-operable-objects, and the respective distances thereof from the user is equal to or less than the predetermined distance. Therefore, the child object 101 and the child object 103 are displayed on the screen of the planar image display device 12. In this case, the child object 101 and the child object 103 are displayed on the screen of the planar image display device 12 in different display modes. For example, on the screen of the planar image display device 12, the child object 101 is displayed in red and the child object 103 is displayed in yellow, both in the planar manner. If the child object 102 moves and the distance thereof from the user becomes equal to or less than the predetermined distance, the child object 102 is displayed on the screen of the planar image display device 12. Each child object moves in the virtual space, according to a predetermined rule. The CPU 30, for example, changes the position of each child object over time, or changes the position of each child object, according to the operation by the user. When the child object 102 moves from the position farther than the predetermined distance away from the user, as shown in FIG. 34, to the position having the distance equal to or less than the predetermined distance from the user as shown in FIG. 27, that is, when the child object 102 approaches and enters within a range in which the user can touch the child object 102, the child object 102 is displayed on the screen of the planar image display device 12.

Next, the CPU 30 executes a process of step S107.

In step S107, the CPU 30 determines whether or not to end the game process. For example, if the operation button 162 is pressed by the user, the CPU 30 ends the game process. If the game process is not ended, the CPU 30 executes again the process of step S101. This is the end of the description of the flowchart shown in FIG. 31.

As described above, in the game according to the third embodiment, each object in the virtual space is stereoscopically displayed on the screen of the stereoscopic image display device 11, and the planar image taken of the same virtual space region is displayed on the screen of the planar image display device 12.

For example, a game apparatus disclosed in Patent Literature 1 (Japanese Laid-Open Patent Publication No. 2005-218779) displays on an upper screen thereof a result obtained by performing an operation on a lower screen, which may not be sufficient for giving the user a feeling of an experience as if the user is directly operating the object displayed on the upper screen. That is, in the apparatus disclosed in Patent Literature 1, the user operates an operation screen displayed on the lower screen while seeing the operation screen, and on the upper screen, a state in which the object moves is displayed as the result of the user's operation. Therefore, it is difficult for the user to obtain the feeling of the experience as if the user is directly operating the object displayed on the upper screen.

However, in the present embodiment, the respective silhouettes of only operable objects are displayed on the screen of the planar image display device 12, and inoperable objects are not displayed. The operation on each object displayed on the stereoscopic image display device 11 is performed by touching the screen of the planar image display device 12. This allows the user to obtain the feeling of the experience as if the user is directly operating the object included in the stereoscopically visible image, while seeing the stereoscopically visible image displayed on the screen of the stereoscopic image display device 11.

The content and the order of the above-described processes shown in the flowcharts are merely illustrative. For example, the process of step S103 may be substituted by the following process. That is, the information on the imaging direction (position information in the imaging direction) of the virtual camera 108 may be embedded in the displayed result (the result of the process of step S105), and the position in the three-dimensional virtual space, which corresponds to the position designated by the user on the touch panel 15, may be obtained from the information.

Moreover, in the third embodiment, only the user-operable-objects (the child objects 101 through 103), which are previously set to be so, and which are equal to or less than the predetermined distance from the virtual camera, are displayed on the planar image display device 12. In another embodiment, the objects including the user-operable objects and the user-inoperable object (the furniture object 104), which satisfy predetermined conditions, may be displayed on the planar image display device 12. Here, as described above, the predetermined conditions may be determined based on the distance from the virtual camera (the user), or may be various conditions during the advance of the game. For example, in a first game scene, a first object is set to be the operable object, and the silhouette thereof may be displayed on the screen of the planar image display device 12. In this case, if the game transits to a second game scene, which is different from the first game scene, the first object may be set to be inoperable object, and may not be displayed on the screen of the planar image display device 12. For example, a weapon object may be set to be operable only in a fight scene so that the weapon object may be operated by the user.

Moreover, in the third embodiment, if there are is a plurality of operable objects, the plurality of operable objects is displayed on the planar image display device 12 in different colors (the child object 101 is displayed in red, the child object 102 is displayed in blue, and the child object 103 is displayed in yellow). In another embodiment, each object may be displayed in any mode if the object is distinguishable at a glance when the user sees the screen of the planar image display device 12. For example, if objects having the same color are adjacent to each other (close to each other), it is difficult for the user to distinguish, at a glance, that these objects are different from one other. Therefore, by displaying the adjacent objects in different display modes on the planar image display device 12, the user is able to distinguish the objects from one another at a glance. For example, in FIG. 27, the child object 102 (the child object image 122) may be displayed in blue, and the child objects 101 (the child object image 121) and 103 (the child object image 123) may be displayed in gray.

Moreover, in the third embodiment, only the object selected in step S122 are displayed on the screen of the planar image display device 12, and if there is a plurality of such objects, they are displayed in different colors. In another embodiment, the selected objects may be displayed in the display mode different (in color, fill pattern, or the like) from that of the other objects. For example, in the case where the child objects 101 through 103 and the furniture object 104 are displayed on the screen of the stereoscopic image display device 11, and if merely the child object 101 is operable (selected), the child object 101 may be displayed in red, and the other objects (102, 103, and 104) may be displayed in gray on the screen of the planar image display device 12.

Moreover, while, in the third embodiment, the silhouette of each object is displayed (one-color display) on the planar image display device 12, each object displayed on the planar image display device 12 may be displayed in any display mode, if the object displayed on the planar image display device 12 is not prominent in the display mode, as compared to the image displayed on the stereoscopic image display device 11. For example, in another embodiment, the object having fewer colors may be displayed on the planar image display device 12. For example, if each part of the object displayed on the stereoscopic image display device 11 is displayed in 32-bit color, each part of the object displayed on the planar image display device 12 may be displayed in 8-bit color. Also, in another embodiment, merely the contour of the object may be displayed on the planar image display device 12. Moreover, in another embodiment, the object may be filled with a pattern, such as lines or dots, and displayed on the planar image display device 12. Moreover, in another embodiment, each object may be distinguishably displayed on the planar image display device 12 by changing the color intensity (brightness) of each object. Also, in another embodiment, by changing the color intensity (brightness) of each part of the object, each part of the object may be distinguishably displayed on the planar image display device 12.

As described above, in another embodiment, the object may be displayed on the planar image display device 12 in a simplified manner. Here, examples of the simplified display are various display modes in which the shape of the outline (contour) of the displayed object remains unchanged, such as a display mode including the silhouette display described above, in which the object whose color is reduced is displayed or the contour-only display; a display mode in which the area surrounded by the outline (contour) of the displayed object is filled with a pattern of lines or dots; and a display mode in which the brightness of the displayed object is changed. That is, the object displayed on the planar image display device 12 may be displayed in any display mode if the object is simplified as compared to the object displayed on the stereoscopic image display device 11.

Furthermore, in another embodiment, the object displayed on the stereoscopic image display device 11 and the object displayed on the planar image display device 12 may be displayed in the same display mode (the same color, the same contour, the same filling pattern, or the like), except for that the former is a stereoscopic image and the latter is a planar image. That is, the object is stereoscopically displayed on the stereoscopic image display device 11, and the object, not the silhouette thereof (without being simplified), may be displayed in the planar manner on the planar image display device 12. As described above, a stereoscopically visible image of the object may be displayed on the stereoscopic image display device 11, while the same object may be displayed on the planar image display device 12, which is different from the stereoscopic image display device 11, in the same display mode but in the planar manner. Then, designation may be made on the screen of the planar image display device 12 and thereby the object may be operated. This allows the user to easily operate the object, while seeing the object displayed on the stereoscopic image display device 11. That is, if the object is displayed on the stereoscopic image display device 11 in the stereoscopically visible manner and if the user attempts to directly designate on the screen of the stereoscopic image display device 11, a difference occurs between the designated position and the position of the object in the depth direction of the screen, of which the user feels an experience, as described above. Therefore, it is difficult for the user to designate the object. Also, as described above, if the user attempts to directly designate on the screen of the stereoscopic image display device 11, the user is unable to obtain the feeling of the experience as if the user is directly operating the object. However, stereoscopically displaying the object on the stereoscopic image display device 11 while displaying the same object on the planar image display device 12 in the planar manner, which is different from the stereoscopic image display device 11, allows the user to easily designate the object for operation, also obtain the feeling of the experience as if the user is directly operating the object.

Furthermore, in the third embodiment, the image (a first image) taken by the virtual stereo camera 100 is displayed on the stereoscopic image display device 11, the image (a second image) taken by the virtual camera 108, which is set at the middle of the virtual cameras 100a at the left and the virtual camera 100b at the right which are the components of the virtual stereo camera 100, is displayed on the planar image display device 12. In another embodiment, the second image may be taken by either one of the virtual cameras 100a at the left and the virtual camera 100b at the right which are the components of the virtual stereo camera 100. Also, the second image may be taken by a virtual camera, which is set at any position between the virtual cameras 100a at the left and the virtual camera 100b at the right. That is, the second image may be taken by a virtual camera set at substantially the same position as that of the virtual camera which takes the first image.

Furthermore, in the third embodiment, the image (including the object) displayed on the stereoscopic image display device 11 and the image displayed on the planar image display device 12 (in the planar image display area 161) are substantially the same image. Here, the "substantially the same image" may be images in which one of the images is enlarged in a predetermined ratio to the other of the images. For example, the length in the vertical direction (or/and the horizontal direction) of the image displayed on the planar image display device 12 may be set to be 70% of the length in the vertical direction (or/and the horizontal direction) of the image displayed on the stereoscopic image display device 11.

Furthermore, in the third embodiment, the image displayed on the stereoscopic image display device 11 and the image displayed on the planar image display device 12 are the images taken of substantially the same virtual space region. Here, the "images taken of substantially the same virtual space region" indicates images having substantially the same imaging range. The imaging range of one of the images may be wide in a predetermined ratio to the imaging range of the other of the images. For example, the imaging range of the image (the virtual space region displayed in the image) displayed on the planar image display device 12 may be set to be 70% of the imaging range (with respect to the vertical direction and/or the horizontal direction) of the image displayed on the stereoscopic image display device 11. As described above, in the third embodiment, since the imaging range of the image displayed on the planar image display device 12 is substantially the same as the imaging range of the image displayed on the stereoscopic image display device 11, the user can operate the object while seeing the screen of the stereoscopic image display device 11, and without the necessity of seeing the screen of the planar image display device 12. That is, since the respective imaging ranges of the two images are the same as each other, for example, if the child object is displayed on the right side of the screen of the stereoscopic image display device 11, the same object is displayed also on the right side of the screen of the planar image display device 12. Therefore, the user can operate the object on the screen of the planar image display device 12, while seeing the screen of the stereoscopic image display device 11 and without the necessity of verifying on the screen of the planar image display device 12.

Also, the size or the imaging range of the image displayed on the planar image display device 12 may be adjusted so that the object included in the two images has substantially the same size as each other (the object in one of the two images may be larger by about 30% than the object in the other of the two images (with respect to the vertical direction and/or the horizontal direction). For example, if the imaging range of the image displayed on the planar image display device 12 is set to be narrow, the object included in the image is displayed in an enlarged manner (zoomed). The object included in the image displayed on the planar image display device 12 is determined by the size or also the imaging range of the image itself (screen itself). Therefore, the size or the imaging range of the image displayed on the planar image display device 12 may be adjusted to an extent which does not make the user feel the sense of discomfort when performing the touch operation on the screen of the planar image display device 12, while seeing the object on the screen of the stereoscopic image display device 11.

Furthermore, the sizes of the object displayed on the two screens are not necessarily substantially the same as each other. For example, even in a case where the screen of the stereoscopic image display device 11 is several times larger than the screen of the planar image display device 12, the user can perform, without feeling the sense of discomfort, the operation on the screen of the planar image display device 12, while seeing the screen of the stereoscopic image display device 11. That is, the object included in the respective images displayed on the two screens is taken from the same direction, and thereby the appearance of the object may be the same (the same direction in which the object is seen). This allows the user to easily operate the object, while seeing one screen and designating on the other screen, regardless of the difference in size of the respective screens.

Furthermore, in the third embodiment, the one screen is configured to display a stereoscopically visible image (the stereoscopic image display device 11) and the other screen is configured to display a planar image (the planar image display device 12). In another embodiment, for example, the one screen may have high resolutions and the other screen may have with low resolutions. That is, the one screen may have a different display type from the other screen (the one screen configured to display a stereoscopically visible image and the other screen configured to display a planar image, the one screen having high resolutions and the other screen having low resolutions, or the like).

Furthermore, in the third embodiment, the respective imaging directions of the virtual cameras at the left and the right, which are the components of the virtual stereo camera 100, are the same as each other, and the imaging direction of the virtual camera 108 is also the same. In another embodiment, these imaging directions are not necessarily made coincide with one another exactly, and may be substantially the same as one another. For example, in FIG. 24, the imaging direction A of the left-eye virtual camera 100a may be a direction of a straight line which connects the child object 101 with the left-eye virtual camera 100a, and the imaging direction B of the right-eye virtual camera 100b may be a direction of a straight line which connects the child object 101 with the right-eye virtual camera 100b. When the respective imaging directions of the virtual cameras at the left and the right are thus set, the stereoscopic effects of the objects (the child object 101 and the furniture object 104) displayed on the stereoscopic image display device 11 change. Moreover, the imaging direction of the virtual camera 108 may also be different by a predetermined angle (several degrees to the low 10's of degrees) from the imaging direction of the left-eye virtual camera 100a or the right-eye virtual camera 100b. Even though the imaging direction of the virtual camera 108 is thus set so as to be different from the imaging directions of the virtual stereo camera 100 by the predetermined angle, a planar image, which is viewed from substantially the same direction in which the object stereoscopically displayed on the stereoscopic image display device 11 is viewed, is displayed on the screen of the planar image display device 12. Therefore, the user can designate the object displayed on the planar image display device 12 for operation, while seeing the stereoscopic object displayed on the stereoscopic image display device 11.

Furthermore, in the third embodiment, the stereoscopic image (the stereoscopically visible image) is displayed on the stereoscopic image display device 11, and the planar image is displayed on the planar image display device 12. In another embodiment, images viewed from substantially the same direction may be simultaneously displayed in two display areas having the same display type, respectively. For example, in another embodiment, the first image including the object may be displayed in the first display area, and the second image, which is the same as the first image, may be displayed in the planar manner in the second display area.

As described above, the first image displayed in the first display area may be an image of a predetermined display object viewed from a predetermined direction. The second image displayed in the second display area may be an image of the predetermined display object viewed from substantially the same direction as the predetermined direction. Then, the user designates a position on the second display area, thereby operating the predetermined display object in the first display area and the second display area. The images of the predetermined display object viewed from substantially the same direction are thus displayed in two display areas, and thereby the user can designate the display object included in the image displayed in the second display area, while seeing the predetermined display object, which is displayed in the first display area. This allows the user to operate the predetermined display object.

Further, while the display capable of displaying the stereoscopic image which can be viewed by the naked eye is employed in the third embodiment, the present invention is applicable to viewing the stereoscopic images by means of glasses having the time division scheme or the deflecting scheme, the anaglyphic format (the red-blue glasses format), or the like.

Furthermore, in the third embodiment, the user operates the object present in the virtual space in the game. In another embodiment, an image of an actual space taken by a stereo camera may be displayed on the stereoscopic image display device 11, and the same image may be displayed on the planar image display device 12. Then, the image displayed on the planar image display device 12 may be operated, thereby changing the image displayed on the stereoscopic image display device 11. For example, the image displayed on the planar image display device 12 may be operated, thereby enlarging or correcting the image displayed on the stereoscopic image display device 11.

Furthermore, in the above-described embodiments, the handheld game apparatus 10, which includes both the stereoscopic image display device 11 and the planar image display device 12, is assumed. In another embodiment, for example, a first display device capable of displaying a stereoscopically visible image, a second display device configured to display only a planar image, and a control apparatus which performs the above-described processes may be configured to be hardware independently of one another. Then, these components may function as the display control system by being connected with one another by wire or wirelessly. That is, the display control system may be configured of one device as the embodiment described above, or may be configured of a plurality of devices.

Further, in another embodiment, a display apparatus capable of setting, on one screen, a stereoscopic image display area, in which a stereoscopic image is displayed, and a planar image display area, in which a planer image is displayed, may be employed as the stereoscopic image display device 11 and the planar image display device 12, respectively. That is, the display apparatus capable of setting two different display areas on the same screen may be employed.

Further, in another embodiment, the display control method described above may be applied to any information processing apparatus, which includes a display device and a designated position detection device (for example, PDAs (Personal Digital Assistant), mobile phones, and the like).

Further, in the embodiment described above, the processes shown in the above-described flowcharts are performed by the CPU 30 of the game apparatus 10 executing the predetermined program. In another embodiment, a part or the entirety of the processes may be performed by a dedicated circuit included in the game apparatus 10. For example, a dedicated GPU (Graphics Processing Unit) or the like, which generates images to be displayed on the stereoscopic image display device 11 and the planar image display device 12, may be provided.

The configuration such as that represented by the embodiment described above will be shown below.

One configuration of the present invention is a handheld information processing apparatus which includes a stereoscopic image display section (the stereoscopic image display device 11) capable of displaying, by using a right-eye image and a left-eye image, stereoscopic images which can be viewed by the naked eye, a planar image display section (the planar image display device 12) configured to display a planar image with which the user performs an input operation on the information processing apparatus, a touch panel (the touch panel 15) provided on the screen of the planar image display section, and control means (the CPU 30) which executes a predetermined process, based on a touch position detected by the touch panel.

In the embodiment described above, for example, images for a user interface, such as the adjustment bars (54 and 56) and the button images (162 and 163), may be displayed on the planar image display section, and the operation on the information processing apparatus may be performed by the user touching the images. Alternatively, a silhouette image (121, or the like) of a virtual object may be displayed on the planar image display section, and the operation on the virtual object may be performed by the user touching the silhouette image.

Furthermore, in another configuration, the control means changes the stereoscopic image displayed on the stereoscopic image display section, based on the touch position detected by the touch panel.

In the above-described configuration, for example, the respective positions of the right-eye image and the left-eye image may be adjusted by touching the image displayed on the planar image display section, and the adjusted image is displayed on the stereoscopic image display section, thereby changing the stereoscopic image. Moreover, for example, the position or the orientation of the object displayed on the stereoscopic image display section may be changed by the touch operation performed on the planar image display section.

Furthermore, in another configuration, the planar images, in which the virtual object in the virtual space is operated, are displayed on the planar image display section. The control means changes the virtual object, based on the touch position detected by the touch panel. The stereoscopic image is displayed on the stereoscopic image display section by using the right-eye image and the left-eye image which are obtained by taking by the virtual stereo camera images of the virtual object changed by the control means.

Furthermore, in another configuration, a touch panel is not provided on the screen of the stereoscopic image display section on.

Furthermore, in another configuration, the information processing apparatus further includes a switch which switches ON/OFF of the stereoscopic presentation of the stereoscopic image display section. The stereoscopic image is displayed on the stereoscopic image display section only when the stereoscopic presentation is switched ON by the switch.

Furthermore, in another configuration, the switch is a slider the position of which is adjustable. The information processing apparatus further includes virtual camera setting means which sets a distance between two virtual cameras, which are the components of the virtual stereo camera, and which are set in the virtual space, according to the position of the slider. The stereoscopic image is displayed on the stereoscopic image display section by using the right-eye image and the left-eye image of the virtual space taken by the virtual stereo camera set by the virtual camera setting means.

Furthermore, in another configuration, the information processing apparatus further includes mode selection means for selecting either of a first mode, in which a real right-eye image and a real left-eye image taken of the actual space are used, and a second mode, in which the right-eye image and the left-eye image taken of the virtual space by the virtual stereo camera are used. When the first mode is selected by the mode selection means, the stereoscopic image is displayed on the stereoscopic image display section by using the real right-eye image and the real left-eye image taken of the actual space, and when the second mode is selected by the mode selection means, the stereoscopic image is displayed on the stereoscopic image display section by using the right-eye image and the left-eye image taken of the virtual space by the virtual stereo camera.

Furthermore, in another configuration, the information processing apparatus further includes a stereo camera which takes images of the actual space. The stereoscopic image is displayed on the stereoscopic image display section by using the real right-eye image and the real left-eye image taken by the stereo camera.

Furthermore, in another configuration, the adjustment bar for adjusting the relative positions of the real right-eye image and the real left-eye image is displayed on the planar image display section. The control means sets a position of a slider of the adjustment bar, based on the touch position detected by the touch panel. The control means also adjusts the relative positions of the real right-eye image and the real left-eye image, according to the position of the slider. The stereoscopic image is displayed on the stereoscopic image display section by using the real right-eye image and the real left-eye image adjusted by the control means.

Furthermore, in another configuration, the information processing apparatus is configured of a first housing and a second housing joined together so as to be foldable. The stereoscopic image display section is provided in the first housing. The planar image display section is provided in the second housing.

Furthermore, in another configuration, the first housing is arranged above the second housing in a state where the information processing apparatus is open.

While the present invention has been described in detail, the foregoing description is in all aspects illustrative and not restrictive. It is understood that numerous other adjustments and variations can be devised without departing from the scope of the invention.

What is claimed is:

1. A handheld information processing apparatus comprising:
   a stereoscopic image display section for displaying a stereoscopic image, which is stereoscopically visible by the naked eye, by using a right-eye image and a left-eye image such that the right-eye image and the left-eye image are displayed on one screen that is planar;
   a planar image display section for displaying a planar image with which a user performs an input operation on the handheld information processing apparatus;
   a touch panel provided on a screen of the planar image display section; and
   a controller for executing a predetermined process, based on a touch position detected by the touch panel.

2. The handheld information processing apparatus according to claim 1, wherein the controller is configured to change the stereoscopic image displayed on the stereoscopic image display section, based on the touch position detected by the touch panel.

3. The handheld information processing apparatus according to claim 2, wherein
   the planar image display section displays a planar image for operating a virtual object in a virtual space,
   the controller changes the virtual object, based on the touch position detected by the touch panel, and
   the stereoscopic image display section displays the stereoscopic image by using the right-eye image and the left-eye image which are obtained by taking images, by using a virtual stereo camera, of the virtual object changed by the controller.

4. The handheld information processing apparatus according to claim 1, wherein the touch panel is not provided on a screen of the stereoscopic image display section.

5. The handheld information processing apparatus according to claim 1, wherein
   the handheld information processing apparatus further includes a switch for switching ON/OFF of stereoscopic presentation of the stereoscopic image display section, and
   the stereoscopic image display section displays the stereoscopic image only when the stereoscopic presentation is switched ON by the switch.

6. A handheld information processing apparatus comprising:
   a stereoscopic image display section for displaying a stereoscopic image, which is stereoscopically visible by the naked eye, by using a right-eye image and a left-eye image;
   a planar image display section for displaying a planar image with which a user performs an input operation on the handheld information processing apparatus;
   a touch panel provided on a screen of the planar image display section; and
   a controller for executing a predetermined process, based on a touch position detected by the touch panel, wherein:
   the handheld information processing apparatus further includes a switch for switching ON/OFF of stereoscopic presentation of the stereoscopic image display section,
   the stereoscopic image display section displays the stereoscopic image only when the stereoscopic presentation is switched ON by the switch,
   the switch is a slider the position of which is adjustable,
   the handheld information processing apparatus further includes a virtual camera setter for setting, according to the position of the slider, a distance between two virtual cameras, which are components of the virtual stereo camera and which are set in the virtual space, and
   the stereoscopic image display section displays the stereoscopic image by using the right-eye image and the left-eye image taken, of the virtual space, by using the virtual stereo camera set by the virtual camera setter.

7. The handheld information processing apparatus according to claim 1, wherein
   the handheld information processing apparatus further includes a mode selector configured to enable the selection of either of
   a first mode in which a real right-eye image and a real left-eye image taken of an actual space are used; and
   a second mode in which the right-eye image and the left-eye image taken, of the virtual space, by the virtual stereo camera are used,
   in a case where the first mode is selected by the mode selector, the stereoscopic image display section displays the stereoscopic image by using the real right-eye image and the real left-eye image taken of the actual space, and
   in a case where the second mode is selected by the mode selector, the stereoscopic image display section displays the stereoscopic image by using the right-eye image and the left-eye image taken, of the virtual space, by the virtual stereo camera.

8. The handheld information processing apparatus according to claim 7, wherein
the handheld information processing apparatus further includes a stereo camera for taking images of the actual space,
the stereoscopic image display section displays the stereoscopic image by using the real right-eye image and the real left-eye image taken by the stereo camera.

9. A handheld information processing apparatus comprising:
a stereoscopic image display section for displaying a stereoscopic image, which is stereoscopically visible by the naked eye, by using a right-eye image and a left-eye image;
a planar image display section for displaying a planar image with which a user performs an input operation on the handheld information processing apparatus;
a touch panel provided on a screen of the planar image display section; and
a controller for executing a predetermined process, based on a touch position detected by the touch panel, wherein:
the handheld information processing apparatus further includes a mode selector configured to enable the selection of either of
a first mode in which a real right-eye image and a real left-eye image taken of an actual space are used; and
a second mode in which the right-eye image and the left-eye image taken, of the virtual space, by the virtual stereo camera are used,
in a case where the first mode is selected by the mode selector, the stereoscopic image display section displays the stereoscopic image by using the real right-eye image and the real left-eye image taken of the actual space,
in a case where the second mode is selected by the mode selector, the stereoscopic image display section displays the stereoscopic image by using the right-eye image and the left-eye image taken, of the virtual space, by the virtual stereo camera,
the planar image display section displays an adjustment bar for adjusting relative positions of the real right-eye image and the real left-eye image,
the controller sets a position of a slider of the adjustment bar, based on the touch position detected by the touch panel, and adjusts the relative positions of the real right-eye image and the real left-eye image, according to the position of the slider, and
the stereoscopic image display section displays the stereoscopic image by using the real right-eye image and the real left-eye image which are adjusted by the controller.

10. The handheld information processing apparatus according to claim 1, wherein
the handheld information processing apparatus is configured of a first housing and a second housing joined together so as to be foldable,
the stereoscopic image display section is provided in the first housing, and
the planar image display section is provided in the second housing.

11. The handheld information processing apparatus according to claim 10, wherein the first housing is arranged above the second housing in a state where the handheld information processing apparatus is open.

12. A handheld game apparatus comprising:
a stereoscopic image display section for displaying a stereoscopic image, which is stereoscopically visible by the naked eye, by using a right-eye image and a left-eye image such that the right-eye image and the left-eye image are displayed on one screen that is planar;
a planar image display section for displaying a planar image with which the user performs an input operation on the handheld game apparatus;
a touch panel provided on a screen of the planar image display section; and
a controller for executing a predetermined process, based on a touch position detected by the touch panel.

13. The handheld information processing apparatus according to claim 1, wherein the right-eye image and the left-eye image are displayed with respect to each other on the stereoscopic image display section in a manner to effect superimposition, as perceived by the user, of the right-eye image and the left-eye image.

14. The handheld information processing apparatus according to claim 1, wherein the stereoscopic image display section is provided in the first housing on a planar surface thereof.

15. The handheld information processing apparatus according to claim 14, further comprising an adjustment mechanism configured to receive user input and, in response thereto, to adjust respective positions of the left- and right-eye images in order to adjust a stereoscopic effect of the stereoscopic image being displayed.

16. The handheld information processing apparatus according to claim 14, wherein the stereoscopic image is displayed such that areas where the left- and right-eye images do not overlap, as perceived by the user, are not displayed via the stereoscopic image display section.

17. The handheld information processing apparatus according to claim 16, wherein the planar image display section displays a planar image that includes portions of the left- and right-eye images that do not overlap, as perceived by the user, via the stereoscopic image display section.

18. The handheld information processing apparatus according to claim 1, wherein the stereoscopic image display section and the planar image display section both display the same left- and right-eye images, but in different ways.

19. An information processing system comprising:
at least one processor and a memory;
a stereoscopic image display section for displaying a stereoscopic image, which is stereoscopically visible by the naked eye, by using a right-eye image and a left-eye image such that the right-eye image and the left-eye image are displayed on one screen that is planar;
a planar image display section for displaying a planar image with which a user performs an input operation on the handheld information processing system;
a touch panel provided on a screen of the planar image display section; and
a controller, configured to cooperate with the at least one processor, to execute a predetermined process, based on a touch position detected by the touch panel.

20. A method of operating a handheld information processing apparatus comprising stereoscopic and planar image display sections and a touch panel provided on a screen of the planar image display section;
displaying, in connection with the stereoscopic image display section, a stereoscopic image, which is stereoscopically visible by the naked eye, by using a right-eye image and a left-eye image such that the right-eye image and the left-eye image are displayed on one screen that is planar;

displaying, in connection with the planar image display section, a planar image with which a user performs an input operation on the handheld information processing apparatus; and executing a predetermined process, in connection with at least one processor and a memory of the handheld information processing apparatus, based on a touch position detected by the touch panel.

21. A non-transitory computer readable storage medium tangibly storing a program comprising instructions that, when executed by at least one processor of a handheld information processing apparatus comprising stereoscopic and planar image display sections and a touch panel provided on a screen of the planar image display section, at least:

display, in connection with the stereoscopic image display section, a stereoscopic image, which is stereoscopically visible by the naked eye, by using a right-eye image and a left-eye image such that the right-eye image and the left-eye image are displayed on one screen that is planar;

display, in connection with the planar image display section, a planar image with which a user performs an input operation on the handheld information processing apparatus; and execute a predetermined process, in connection with the at least one processor, based on a touch position detected by the touch panel.

22. The handheld information processing apparatus according to claim 1, wherein the stereoscopic image display section is planar and the entirety of the stereoscopic image display section is provided in the first housing on one planar surface thereof.

23. A handheld information processing apparatus comprising:

a stereoscopic image display section for displaying a stereoscopic image, which is stereoscopically visible by the naked eye, by using a right-eye image and a left-eye image such that the right-eye image and the left-eye image are displayed on one screen;

a planar image display section for displaying a planar image with which a user performs an input operation on the handheld information processing apparatus;

a touch panel provided on a screen of the planar image display section; and a controller for executing a predetermined process, based on a touch position detected by the touch panel, wherein the stereoscopic image display section is placed on an upper side, and the planar image display section is placed on a lower side.

24. The handheld information processing apparatus according to claim 23, wherein the information processing apparatus is a game apparatus.

25. A handheld information processing apparatus comprising:

a stereoscopic image display section for displaying a stereoscopic image, which is stereoscopically visible by the naked eye, by using a right-eye image and a left-eye image such that the right-eye image and the left-eye image are displayed on one screen;

a planar image display section for displaying a planar image with which a user performs an input operation on the handheld information processing apparatus;

a touch panel provided on a screen of the planar image display section; and a controller for executing a predetermined process, based on a touch position detected by the touch panel, wherein:

the controller is configured to change the stereoscopic image displayed on the stereoscopic image display section, based on the touch position detected by the touch panel, the planar image display section is configured to display a planar image for operating a virtual object in a virtual space, the controller is configured to change the virtual object, based on the touch position detected by the touch panel, the stereoscopic image display section is configured to display the stereoscopic image by using the right-eye image and the left-eye image which are obtained by taking images, by using a virtual stereo camera, of the virtual object changed by the controller, and the planar image display section also is configured to display an image obtained by taking an image of the virtual space by using a virtual camera.

26. The handheld information processing apparatus according to claim 25, wherein the information processing apparatus is a game apparatus.

27. A handheld information processing apparatus comprising:

a stereoscopic image display section for displaying a stereoscopic image, which is stereoscopically visible by the naked eye, by using a right-eye image and a left-eye image such that the right-eye image and the left-eye image are displayed on one screen;

a planar image display section for displaying a planar image with which a user performs an input operation on the handheld information processing apparatus;

a touch panel provided on a screen of the planar image display section;

a controller for executing a predetermined process, based on a touch position detected by the touch panel; and a mode selector configured to enable the selection of one of a first mode in which a real right-eye image and a real left-eye image taken of an actual space are used; and a second mode in which the right-eye image and the left-eye image taken, of the virtual space, by the virtual stereo camera are used, wherein:

in a case where the first mode is selected by the mode selector, the stereoscopic image display section is configured to display the stereoscopic image by using the real right-eye image and the real left-eye image taken of the actual space, and in a case where the second mode is selected by the mode selector, the stereoscopic image display section is configured to display the stereoscopic image by using the right-eye image and the left-eye image taken, of the virtual space, by the virtual stereo camera.

28. The handheld information processing apparatus according to claim 27, wherein the information processing apparatus is a game apparatus.

* * * * *